(12) United States Patent
Yamada et al.

(10) Patent No.: US 9,502,929 B2
(45) Date of Patent: Nov. 22, 2016

(54) ROTOR AND MOTOR

(75) Inventors: Yoji Yamada, Hamamatsu (JP); Chie Morita, Kosai (JP); Yuuki Fujii, Kosai (JP); Shigemasa Kato, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 694 days.

(21) Appl. No.: 13/805,618

(22) PCT Filed: Nov. 18, 2011

(86) PCT No.: PCT/JP2011/076642
§ 371 (c)(1),
(2), (4) Date: Dec. 19, 2012

(87) PCT Pub. No.: WO2012/067223
PCT Pub. Date: May 24, 2012

(65) Prior Publication Data
US 2013/0300242 A1 Nov. 14, 2013

(30) Foreign Application Priority Data

Nov. 19, 2010 (JP) .................... 2010-258671
Nov. 26, 2010 (JP) .................... 2010-263535
(Continued)

(51) Int. Cl.
*H02K 1/27* (2006.01)
*H02K 1/22* (2006.01)
*H02K 21/04* (2006.01)

(52) U.S. Cl.
CPC ............. *H02K 1/27* (2013.01); *H02K 21/044* (2013.01); *H02K 1/22* (2013.01); *H02K 1/272* (2013.01);
(Continued)

(58) Field of Classification Search
CPC ............. H02K 21/04; H02K 21/042; H02K 21/044; H02K 1/22; H02K 1/223;
(Continued)

(56) References Cited

U.S. PATENT DOCUMENTS 2,802,959 A * 8/1957 Powers .................... 310/156.66
5,382,862 A * 1/1995 Ward et al. ................... 310/263
(Continued)

FOREIGN PATENT DOCUMENTS

| JP | 55-69885 U | 5/1980 |
| JP | 61-085045 A | 4/1986 |

(Continued)

OTHER PUBLICATIONS

Ichiyama (JP 2010172046 A) English Translation.*
(Continued)

*Primary Examiner* — Quyen Leung
*Assistant Examiner* — Robert E Mates
(74) *Attorney, Agent, or Firm* — Christensen Fonder P.A.

(57) ABSTRACT

A rotor with a first rotor core, a second rotor core, a field magnet, and an interpole magnet is provided. The first rotor core has a first core base and a plurality of first nail-shaped magnetic pole parts that extend in the axis direction from the outer circumference section of the first core base. The second rotor core has a second core base and a plurality of second nail-shaped magnetic pole parts that extend in the axis direction from the outer circumference section of the second core base. The field magnet is magnetized along the axis direction and makes the first nail-shaped magnetic parts function as first magnetic poles and the second nail-shaped magnetic parts function as second magnetic poles. The interpole magnet is arranged between the first nail-shaped magnetic parts and the second nail-shaped magnetic parts. The interpole magnet has the same polarity as the first and
(Continued)

second nail-shaped magnetic pole parts, in the sections where same face the first and second nail-shaped magnetic pole parts.

30 Claims, 30 Drawing Sheets

(30) Foreign Application Priority Data

Oct. 31, 2011 (JP) ................. 2011-239507
Oct. 31, 2011 (JP) ................. 2011-239509
Oct. 31, 2011 (JP) ................. 2011-239515

(52) U.S. Cl.
CPC ........... *H02K 1/2713* (2013.01); *H02K 1/2766* (2013.01); *H02K 1/2773* (2013.01)

(58) Field of Classification Search
CPC ............ H02K 1/226; H02K 1/27; H02K 1/2706; H02K 1/2713; H02K 1/272; H02K 1/2726; H02K 1/2733; H02K 1/274; H02K 1/2746; H02K 1/2753; H02K 1/276; H02K 1/2766; H02K 1/278; H02K 1/2773
USPC ............ 310/156.66, 156.67, 156.68, 156.69, 310/156.71, 156.82, 156.48
See application file for complete search history.

(56) References Cited

U.S. PATENT DOCUMENTS

| | | | |
|---|---|---|---|
| 5,502,368 A * | 3/1996 | Syverson et al. | 322/28 |
| 5,682,073 A | 10/1997 | Mizuno | |
| 6,013,967 A | 1/2000 | Ragaly et al. | |
| 6,307,297 B1 * | 10/2001 | Bramson et al. | 310/263 |
| 6,426,581 B1 * | 7/2002 | York et al. | 310/263 |
| 6,462,449 B1 * | 10/2002 | Lucidarme | H02K 1/2706 310/156.56 |
| 6,794,790 B2 | 9/2004 | Kusase et al. | |
| 2002/0011757 A1 | 1/2002 | Tanaka et al. | |
| 2003/0178909 A1 | 9/2003 | Kusase et al. | |
| 2004/0150272 A1 * | 8/2004 | Gordon et al. | 310/67 A |
| 2004/0195925 A1 | 10/2004 | Kusase et al. | |
| 2005/0121990 A1 * | 6/2005 | Kaneko | 310/156.47 |
| 2005/0156479 A1 * | 7/2005 | Fujita et al. | 310/263 |
| 2006/0055266 A1 * | 3/2006 | Iwami et al. | 310/156.47 |
| 2009/0072647 A1 * | 3/2009 | Hino et al. | 310/156.15 |
| 2009/0200885 A1 * | 8/2009 | Kikuchi et al. | 310/156.78 |
| 2009/0289512 A1 * | 11/2009 | Prucher | 310/54 |
| 2010/0096941 A1 * | 4/2010 | Inoue et al. | 310/181 |
| 2010/0109466 A1 * | 5/2010 | Kondo et al. | 310/156.12 |
| 2010/0327787 A1 | 12/2010 | Sakai et al. | |
| 2011/0043068 A1 * | 2/2011 | Yoshizawa et al. | 310/181 |

FOREIGN PATENT DOCUMENTS

| | | | |
|---|---|---|---|
| JP | 04-049836 A | | 2/1992 |
| JP | 5-43749 U | | 6/1993 |
| JP | 6-351206 A | | 12/1994 |
| JP | 07-298585 A | | 11/1995 |
| JP | 07298585 A | * | 11/1995 |
| JP | 08-163802 A | | 6/1996 |
| JP | 09-327139 A | | 12/1997 |
| JP | 11-136913 A | | 5/1999 |
| JP | H11275831 A | | 10/1999 |
| JP | 2000-209825 A | | 7/2000 |
| JP | 2002-44921 A | | 2/2002 |
| JP | 2003-284303 A | | 10/2003 |
| JP | 2005-094978 A | | 4/2005 |
| JP | 2006-333642 A | | 12/2006 |
| JP | 2007-221877 A | | 8/2007 |
| JP | 2007-228677 A | | 9/2007 |
| JP | 2007228677 A | * | 9/2007 |
| JP | 2007-267514 A | | 10/2007 |
| JP | 2007-330038 A | | 12/2007 |
| JP | 2008-148398 A | | 6/2008 |
| JP | 2008-187826 A | | 8/2008 |
| JP | 2008-289300 A | | 11/2008 |
| JP | 2009-194985 A | | 8/2009 |
| JP | 2009-201300 A | | 9/2009 |
| JP | 2009-284757 A | | 12/2009 |
| JP | 2010-136549 A | | 6/2010 |
| JP | 2010-172046 A | | 8/2010 |
| JP | 2010172046 A | * | 8/2010 |
| JP | 2010-213455 A | | 9/2010 |
| WO | WO 2007/043161 A1 | | 4/2007 |
| WO | WO 2007043161 A1 | * | 4/2007 |
| WO | WO 2009101710 A1 | * | 8/2009 |

OTHER PUBLICATIONS

Kanazawa et al. (JP 2007228677 A) English Translation.*
Maki et al. (WO 2007043161 A1) English Translation.*
Kusase et al. (JP 07298585 A) English Translation.*
Japanese Office Action of JP 2011-239509 dated Mar. 1, 2016 with its English Translation.

* cited by examiner

ROTOR AND MOTOR

RELATED APPLICATIONS

The present application is a National Phase entry of PCT Application No. PCT/JP2011/076642, filed Nov. 18, 2011, which claims priority from Japanese Patent Application No. 2010-258671, filed Nov. 19, 2010, Japanese Patent Application No. 2010-263535, filed Nov. 26, 2010, Japanese Patent Application No. 2011-239515, filed Oct. 31, 2011, Japanese Patent Application No. 2011-239507, filed Oct. 31, 2011, and Japanese Patent Application No. 2011-239509, filed Oct. 31, 2011, the disclosures of which are hereby incorporated by reference herein in their entirety.

TECHNICAL FIELD

The present invention relates to a rotor and a motor.

BACKGROUND ART

As rotors for use in a motor, patent documents 1-4 disclose rotors having the so-called Lundell type structure. The rotor includes a rotor core having a plurality of hook-like magnetic poles in the circumferential direction and a field magnet coil wound within the rotor core, and electrical power is supplied to the field magnet coil to cause respective hook-like magnetic poles to function as the different magnetic poles alternatively.

In the rotor of patent document 1, an auxiliary magnet is arranged between poles, and a field magnet coil and magnetic flux are combined to enhance the output. Also, in the rotor of patent document 2, an auxiliary magnet is arranged between poles, and the magnetomotive force of the auxiliary magnet allows for the braking of a rotor that would continue to rotate due to inertial force. Further, in the rotor of patent document 3, a magnet that is shaped to eliminate leakage magnetic flux and enhance the output is arranged on a distal inner circumference of a hook-like magnetic pole.

Further, in the rotor of patent document 4, a hook-like magnetic pole projects outward in the radial direction from the peripheral part of a core base (a disk part in the document) and extends in the axial direction. An auxiliary magnet is arranged on the rear surface of the part (flange in the document) extending in the axial direction of the hook-like magnetic pole. A portion at the abutting side (outward in the radial direction) is magnetized to the same polarity as the corresponding hook-like magnetic pole. This allows for the reduction of leakage magnetic flux that would occur at the hook-like magnetic pole.

PRIOR ART DOCUMENTS

Patent Documents

Patent Document 1: Japanese Laid-Open Patent Publication No. 61-85045
Patent Document 2: Japanese Laid-Open Patent Publication No. 2007-267514
Patent Document 3: Japanese Laid-Open Patent Publication No. 2009-194985
Patent Document 4: Japanese Laid-Open Utility Model Publication No. 5-43749

SUMMARY OF THE INVENTION

Problems to be Solved by the Invention

Each rotor of patent documents 1-3 includes a field magnet coil wound within a rotor core. This results in the need for a separate power supply unit such as spring and increases the cost of the rotor. Moreover, when reducing the size of the motor, it becomes difficult to provide sufficient space for the field magnet coil and the power supply unit.

Further, in the rotor of patent document 2, there is a problem in that the tandem structure increases the number of magnets by twofold. Further, in the rotor of patent document 3, there is a problem in that, while the magnetic saturation of the hook-like magnetic poles can be reduced, the leakage magnetic flux cannot be effectively used as the magnetic flux transferred to the stator.

Further, in the rotor of patent document 4, the hook-like magnetic pole is narrower than other portions of the rotor core. Thus, the magnetic flux density of the magnetic field flux generated at the magnetic field magnet is increased at part of the hook-like magnetic pole thereby causing magnetic saturation to occur. As a result, the effective magnetic flux that contributes to the motor output may be reduced and the magnetic flux density of the magnetic field flux may be biased at the outer circumferential surface of the hook-like magnetic pole thereby reducing the motor output.

A first object of the present invention is to provide a rotor and a motor that allow for reduction in size with a simple structure and the reduction of leakage magnetic flux between the hook-like magnetic poles to increase the output.

A second object of the present invention is to provide a rotor that allows for further optimization while including a auxiliary magnet and to provide a motor including such a rotor.

A third object of the present invention is to provide a rotor that can suppress the occurrence of magnetic saturation and thus contribute to higher output of the motor and to provide a motor including such a rotor.

To achieve the first object, one aspect of the present invention provides a rotor including a first rotor core, a second rotor core, a field magnet, and an inter-pole magnet. The first rotor core includes a first core base and a plurality of first hook-like magnetic pole parts arranged at equal intervals on an outer circumferential portion of the first core base and extended from the outer circumferential portion in an axial direction. The second rotor core includes a second core base and a plurality of second hook-like magnetic pole parts arranged at equal intervals on an outer circumferential portion of the second core base and extended from the outer circumferential portion in the axial direction. Each of the second hook-like magnetic pole parts is arranged between adjacent ones of the first hook-like magnetic pole parts in a circumferential direction. The field magnet is magnetized along the axial direction and arranged between the first rotor core and the second rotor core. The field magnet causes the first hook-like magnetic pole parts to function as a first magnetic pole and causes the second hook-like magnetic pole parts to function as a second magnetic pole. The inter-pole magnet is arranged between the first hook-like magnetic pole part and the second hook-like magnetic pole part. The inter-pole magnet is magnetized so that portions facing the first and the second hook-like magnetic pole parts have the same polarity as the first and second hook-like magnetic pole parts, respectively.

To achieve the second object, another aspect of the present invention provides a rotor including a first rotor core, a second rotor core, a field magnet, and an auxiliary magnet. The first rotor core includes a generally disk-shaped first core base and a plurality of first hook-like magnetic pole parts arranged at equal intervals on an outer circumferential portion of the first core base and protruding from the outer circumferential portion outward in a radial direction and extending in an axial direction. The second rotor core includes a generally-disk shaped second core base and a plurality of second hook-like magnetic pole parts arranged at equal intervals on an outer circumferential portion of the second core base and protruding from the outer circumferential portion outward in the radial direction and extending in the axial direction. The first hook-like magnetic pole parts and the second hook-like magnetic pole parts are alternatively arranged in a circumferential direction in a state in which the first core base and the second core base are opposed in the axial direction. The field magnet is magnetized along the axial direction and arranged between the first core base and the second core base in the axial direction. The field magnet causes the first hook-like magnetic pole parts to function as a first magnetic pole and causes the second hook-like magnetic pole parts to function as a second magnetic pole. The auxiliary magnet is arranged in at least one of a location between the first hook-like magnetic pole parts and the second hook-like magnetic pole parts in the circumferential direction and a location inward in the radial direction from the first and the second hook-like magnetic pole parts. The auxiliary magnet and the field magnet are formed by magnets of different characteristics.

To achieve the third object, a further aspect of the present invention provides a rotor including a first rotor core, a second rotor core, a field magnet, and an auxiliary magnet. The first rotor core includes a generally disk-shaped first core base and a plurality of first hook-like magnetic pole parts arranged at equal intervals on an outer circumferential portion of the first core base and protruding from the outer circumferential portion outward in a radial direction and extending in an axial direction. The second rotor core includes a generally disk-shaped second core base and a plurality of first hook-like magnetic pole parts arranged at equal intervals on an outer circumferential portion of the second core base and protruding from the outer circumferential portion outward in the radial direction and extending in the axial direction. Each of the second hook-like magnetic pole parts is arranged between adjacent ones of the first hook-like magnetic pole parts in a circumferential direction. The field magnet is magnetized along the axial direction and arranged between the first core base and the second core base. The field magnet causes the first hook-like magnetic pole parts to function as a first magnetic pole and causes the second hook-like magnetic pole parts to function as a second magnetic pole. The auxiliary magnet is arranged on back surfaces of the first and second hook-like magnetic pole parts and magnetized so that a polarity of the auxiliary magnet at a part outward in the radial direction has the same polarity as a corresponding one of the first and the second hook-like magnetic pole parts. A magnetization direction of at least part of the auxiliary magnet in an axial cross-section is inclined relative to the radial direction thereby allowing for part of a magnetic flux flowing in each of the hook-like magnetic poles to obliquely bypass an interior of the auxiliary magnet.

DETAILED DESCRIPTION OF THE PREFERRED EMBODIMENTS

First Embodiment

A first embodiment of the present invention will now be described with reference to FIGS. 1 to 6.

Figure 1:
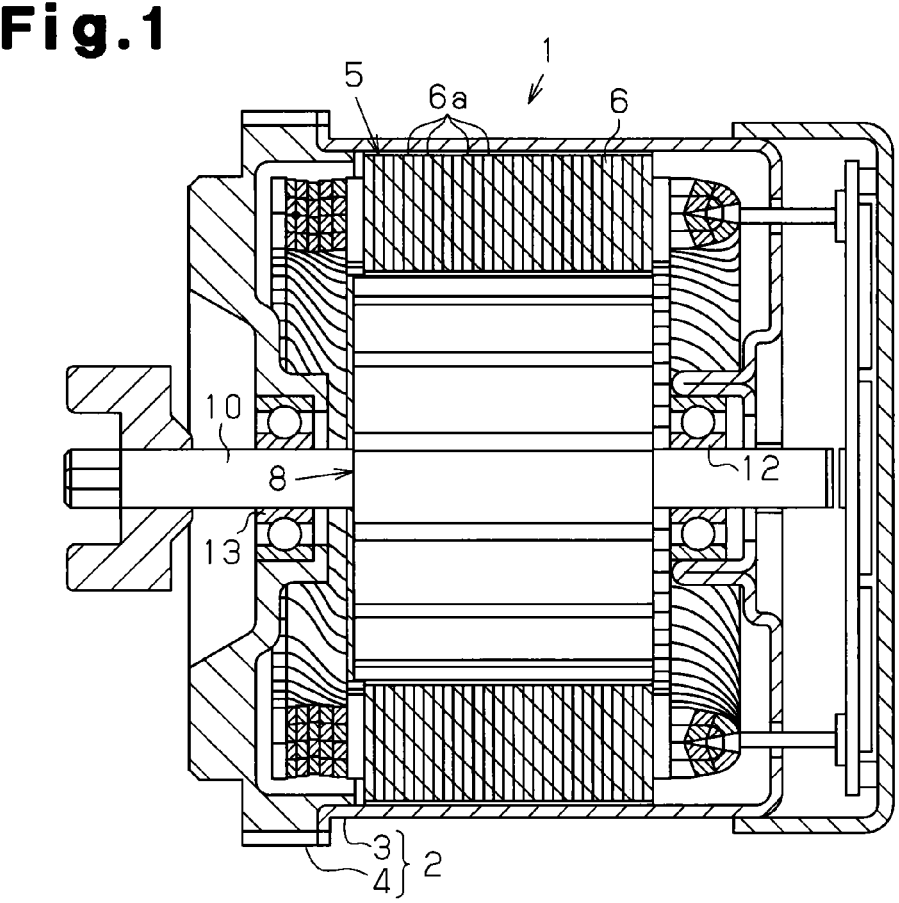
FIG. 1 is a cross-sectional view of a brushless motor according to a first embodiment.

As illustrated in FIG. 1, a motor case 2 of a brushless motor 1 includes a case housing 3, which is cylindrical and has a closed end, and a front cover 4, which closes a front opening of the case housing 3. A stator 5 is fixed to the inner peripheral surface of the case housing 3. A stator core 6 of the stator 5 includes a plurality of stacked stator core pieces 6*a* that are formed from steel plates.

As illustrated in FIG. 1, a rotor 8 is arranged in the stator 5. A rotation shaft 10 is extended through and fixed to the rotor 8. The rotation shaft 10 is a non-magnetic metal shaft in the present embodiment and is rotatably supported by bearings 12 and 13 arranged at the bottom part of the case housing 3 and the front cover 4. The rotor 8 fixed to the rotation shaft 10 is a rotor of a Lundell type structure.

Figure 2:
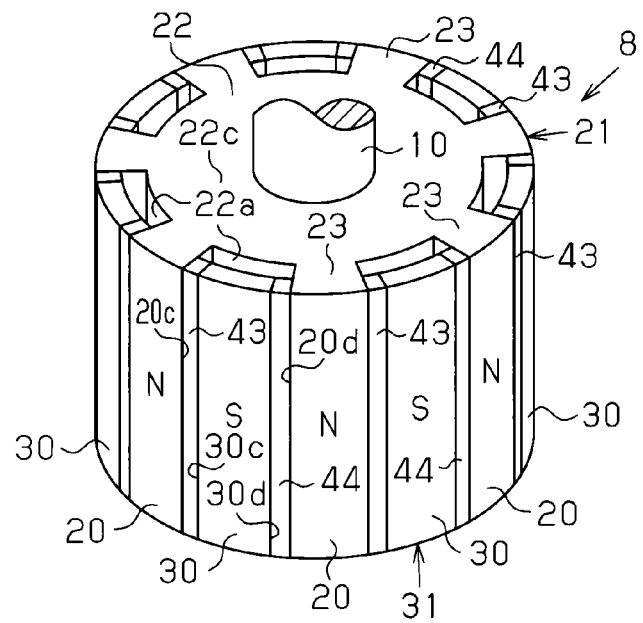
FIG. 2 is a perspective view of the rotor of FIG. 1.

As illustrated in FIG. 2, the rotor 8 includes a first rotor core 21, which has a plurality of first hook-like magnetic poles 20 arranged in the circumferential direction, a second rotor core 31, which is arranged facing the first rotor core 21 and has a plurality of hook-like magnetic poles 30 arranged in the circumferential direction between the first hook-like magnetic poles 20, and a field magnet 41 (see FIGS. 3 and 5), which is arranged between the first rotor core 21 and the second rotor core 31. The field magnet 41 is annular, for example.

First Rotor Core 21

Figure 3:
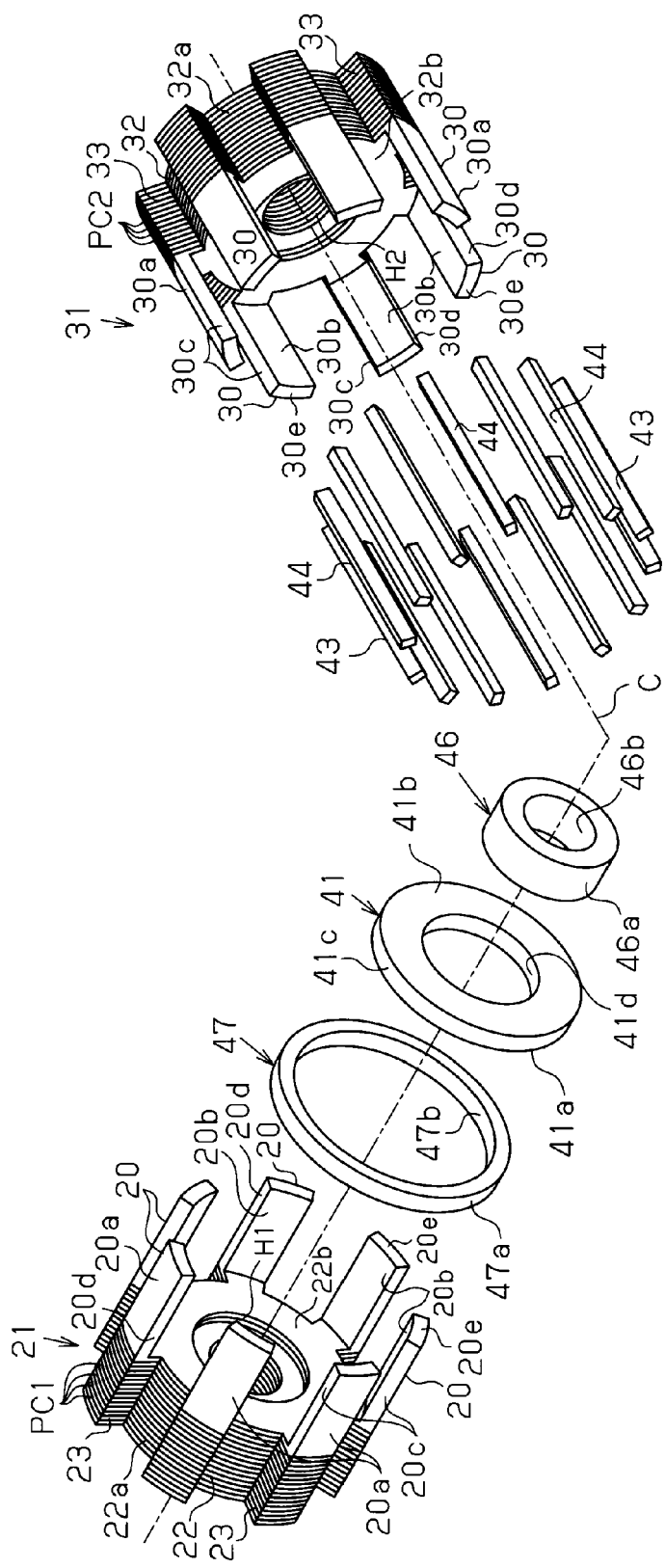
FIG. 3 is an exploded perspective view of the rotor core of FIG. 1.

As illustrated in FIG. 3, the first rotor core 21 includes a first core base 22 formed by a plurality of stacked rotor core pieces PC1, which serve as plate members formed by steel plates (not shown in FIGS. 1, 2, and 4) and which are fixed to the rotation shaft 10.

The first core base 22 includes seven first arms 23 extending in the radial direction at equal intervals from an outer circumferential surface 22*a*, which serves as an outer circumferential portion. The first hook-like magnetic pole 20 is formed at the distal end of each first arm 23 extending in the axial direction toward the second rotor core 31. Each first hook-like magnetic pole 20 is formed by changing the shape of just the one of the steel plate rotor core pieces PC1 located next to the second rotor core 31 so that portions corresponding to the first hook-like magnetic poles 20 extending from the first arms 23 are bent by a pressing machine or the like.

Each first hook-like magnetic pole 20 is formed so that the width in the circumferential direction is smaller than the gap between adjacent ones of the first hook-like magnetic poles 20. Thus, in the first core base 22, the first hook-like magnetic poles 20 are arranged in a comb-teeth shape in the circumferential direction and toward the axial direction.

Figure 4:
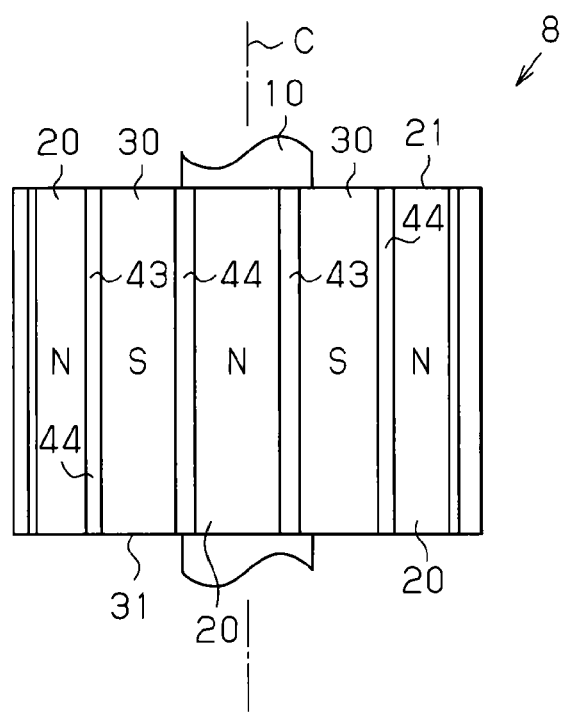
FIG. 4 is a front view of the rotor of FIG. 1.

Each first hook-like magnetic pole 20 is formed in a triangular shape when viewed from the axial direction and thus an outer circumferential surface 20*a* and an inner peripheral surface 20*b* of each first hook-like magnetic pole 20 form concentric circles with respect to the first core base 22. The inner diameter of the inner peripheral surface 20*b* of the first hook-like magnetic pole 20 is larger than the outer diameter of the first core base 22 by the length of the first arm 23. Further, in each first hook-like magnetic pole 20 in FIG. 3, a first side surface 20*c* directed clockwise in the circumferential direction and a second side surface 20*d* directed counterclockwise are the planes that intersect orthogonally to a center axis C of the rotation shaft 10. Accordingly, as illustrated in FIG. 4, each first hook-like magnetic pole 20 has a rectangular shape with the longer side in the axial direction when viewed from the radial direction.

Second Rotor Core 31

As illustrated in FIG. 3, the second rotor core 31 has the same shape as the first rotor core 21 and includes a second core base 32 formed by a plurality of stacked rotor core pieces PC2, which serve as plate members formed by steel plates (not shown in FIGS. 1, 2, and 4) and are fixed to the rotation shaft 10.

On an outer surface 32*a* as the outer circumferential portion of the second core base 32, seven second arms 33 are formed extended in the radial direction at equal intervals. On the distal end of each second arm 33, the second hook-like magnetic pole 30 is formed extended in the axial direction and toward the first rotor core 21. Each second hook-like magnetic pole 30 is formed by changing the shape of just the one of the steel plate rotor core pieces PC2 located next to the first rotor core 21 so that portions corresponding to the second hook-like magnetic poles 30 and extending from the second arms 33 are bent by a pressing machine or the like.

Each second hook-like magnetic pole 30 is formed so that the width in the circumferential direction is smaller than the gap between adjacent ones the second hook-like magnetic poles 30. Thus, in the second core base 32, the second hook-like magnetic poles 30 are arranged in a comb-teeth shape in the circumferential direction and toward the axial direction.

Further, each second hook-like magnetic pole 30 is formed in a triangular shape in the planer view from the axial direction and thus an outer circumferential surface 30*a* and an inner peripheral surface 30*b* of each second hook-like magnetic pole 30 form concentric circles with respect to the second core base 32. The inner diameter of the inner peripheral surface 30*b* of the second hook-like magnetic pole 30 is larger than the outer diameter of the second core base 32 by the length of the second arm 33. Further, in each second hook-like magnetic pole 30 in FIG. 3, a first side surface 30c directed clockwise in the circumferential direction and a second side surface 30d directed counterclockwise are the planes that intersect orthogonally to the center axis C of the rotation shaft 10. Accordingly, as illustrated in FIG. 4, each second hook-like magnetic pole 30 has a rectangular shape elongated in the axial direction when viewed from the radial direction.

Furthermore, the clockwise first side surface 30c of each second hook-like magnetic pole 30 is parallely opposed to the clockwise first side surface 20c of each opposing first hook-like magnetic pole 20. Similarly, the counterclockwise second side surface 30d of each second hook-like magnetic pole 30 is parallely opposed to the counterclockwise second side surface 20d of each opposing first hook-like magnetic pole 20.

Figure 5:
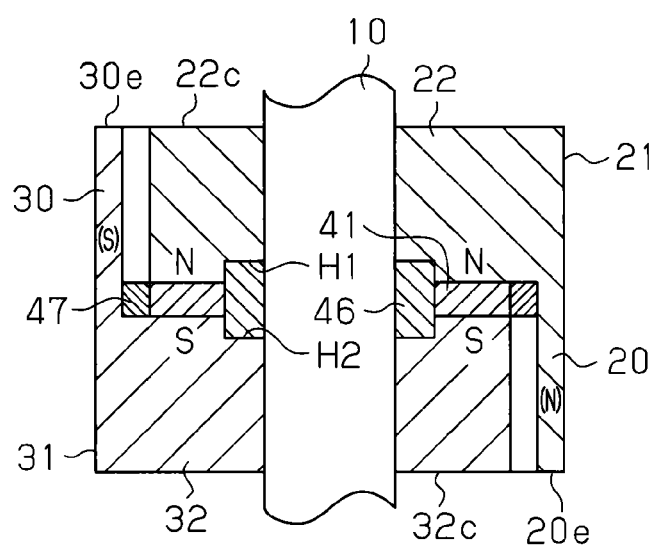
FIG. 5 is a cross-sectional view of the rotor of FIG. 1.

The second rotor core 31 is stacked on the first rotor core 21 interposing the field magnet 41 as illustrated in FIG. 5. In detail, the second rotor core 31 is stacked on the first rotor core 21 so that respective second hook-like magnetic poles 30 extended in the axial direction are fitted between respective first hook-like magnetic poles 20 of the first rotor core 21, respectively. Each width in the circumferential direction of the first and the second hook-like magnetic poles 20 and 30 is smaller than the gap in the circumferential direction between adjacent first and second hook-like magnetic poles 20 and 30 so that both sides of adjacent first hook-like magnetic pole 20 and second hook-like magnetic pole 30 in the circumferential direction are spaced apart from each other.

Further, with the first rotor core 21 and the second rotor core 31 being held and fixed interposing the field magnet 41, an end surface 20e of the first hook-like magnetic pole 20 is on the same plane as the opposing surface 32c of the second core base 32, and an end surface 30e of the second hook-like magnetic pole 30 is on the same plane as the opposing surface 22c of the first core base 22.

Field Magnet 41

As illustrated in FIGS. 3 and 5, in the field magnet 41 held between the first rotor core 21 and the second rotor core 31, both side surfaces 41a and 41b in the axial direction abut against the opposing surfaces 22b and 32b of the first and the second core bases 22 and 32. The outer circumferential surface 41c of the field magnet 41 is formed to be the concentric circle of the outer circumferential surfaces 22a and 32a of the first and the second core bases 22 and 32 with respect to the center axis C, and the field magnet 41 is formed to have the same outer diameter as the first and the second core bases 22 and 32.

The field magnet 41 is magnetized in the axial direction so that the first core base 22 side is the N pole and the second core base 32 side is the S pole. Accordingly, the field magnet 41 causes each first hook-like magnetic pole 20 of the first rotor core 21 to function as the N pole (first magnetic pole) and each second hook-like magnetic pole 30 of the second rotor core 31 to function as the S pole (second magnetic pole).

First and Second Inter-Pole Magnets 43 and 44

First inter-pole magnets 43, which are block shaped and elongated in the axial direction, are held and fixed between the first side surfaces 20c of the first hook-like magnetic poles 20 and the first side surfaces 30c of the second hook-like magnetic poles 30, respectively. Each first inter-pole magnet 43 is magnetized in the circumferential direction so that one side facing the first hook-like magnetic pole 20 functioning as the N pole is the N pole and the other side facing the second hook-like magnetic pole 30 functioning as the S pole is the S pole, respectively.

Second inter-pole magnets 44, which are block-shaped and elongated in the axial direction, are held and fixed between the second side surfaces 20d of the first hook-like magnetic poles 20 and the second side surfaces 30d of the second hook-like magnetic poles 30, respectively. Each second inter-pole magnet 44 is magnetized in the circumferential direction so that one side facing the first hook-like magnetic pole 20 functioning as the N pole is the N pole and the other side facing the second hook-like magnetic pole 30 functioning as the S pole is the S pole, respectively.

That is, the first inter-pole magnets 43 and the second inter-pole magnets 44 are magnetized so that their magnetization directions are the opposite direction in the circumferential direction Inner Auxiliary Magnet 46

As illustrated in FIGS. 3 and 5, a cylindrical inner auxiliary magnet 46 is arranged in the field magnet 41. For the inner auxiliary magnet 46, an outer circumferential surface 46a is fixed to an inner peripheral surface 41d of the field magnet 41 and an inner peripheral surface 46b is fixed to the rotation shaft 10. The inner auxiliary magnet 46 is longer than the field magnet 41 in the axial direction, and fitted and fixed to annular recess parts H1 and H2 formed in the axis side of the opposing surfaces 22b and 32b of the first and the second core bases 22 and 32. The inner auxiliary magnet 46 is magnetized in the axial direction so that the first rotor core 21 (the first core base 22) side is the N pole and the second rotor core 31 (the second core base 32) side is the S pole.

Outer Auxiliary Magnet 47

As illustrated in FIGS. 3 and 5, a ring-shaped outer auxiliary magnet 47 formed to have the same length as the field magnet 41 in the axial direction is arranged between the outer circumferential surface 41c of the field magnet 41 and basal end parts of the inner peripheral surfaces 20b and 30b of the first and the second hook-like magnetic poles 20 and 30. For the outer auxiliary magnet 47, an outer circumferential surface 47a is fixed to the inner peripheral surfaces 20b and 30b of the first and the second hook-like magnetic poles 20 and 30, and an inner peripheral surface 47b is fixed to the outer circumferential surface 41c of the field magnet 41.

The outer auxiliary magnet 47 is magnetized in the axial direction so that the first rotor core 21 (the first core base 22) side is the N pole and the second rotor core 31 (the second core base 32) side is the S pole. Further, the magnetomotive force of the outer auxiliary magnet 47 is greater than the magnetomotive force of the first and the second inter-pole magnets 43 and 44.

The advantages of the first embodiment will now be described.

(1) In the above embodiment, the second rotor core 31 is arranged to the first rotor core 21 so that each second hook-like magnetic pole 30 is arranged between corresponding first hook-like magnetic poles 20 with the field magnet 41 being arranged between the first rotor core 21 having a plurality of first hook-like magnetic poles 20 and the second rotor core 31 having a plurality of second hook-like magnetic poles 30. Further, the first and the second inter-pole magnets 43 and 44 magnetized to be the same polarity as the first and the second hook-like magnetic poles 20 and 30 are arrange between the first hook-like magnetic pole 20 and the second hook-like magnetic pole 30.

Accordingly, in the rotor 8, the field magnet coil can be eliminated by the field magnet 41 and it is thus not necessary to provide the power supply unit within the motor 1 for supplying power to the field magnet coil. As a result, the entire brushless motor 1 can be made compact and manufactured with decreased cost.

Furthermore, the first and the second inter-pole magnets 43 and 44 allow for the reduction of leakage magnetic flux between each first hook-like magnetic pole 20 of the first rotor core 21 and each second hook-like magnetic pole 30 of the second rotor core 31. Thus, the magnetic flux of the field magnet 41 can be effectively used for the output of the brushless motor 1.

Moreover, since the first and the second inter-pole magnets 43 and 44 are arranged between the first and the second hook-like magnetic poles 20 and 30, the first and the second hook-like magnetic poles 20 and 30 are firmly supported and fixed by the first and the second inter-pole magnets 43 and 44. Thus, the number of the first and the second hook-like magnetic poles 20 and 30 can be increased with a simple structure. This allows for multipolarization.

Figure 6:
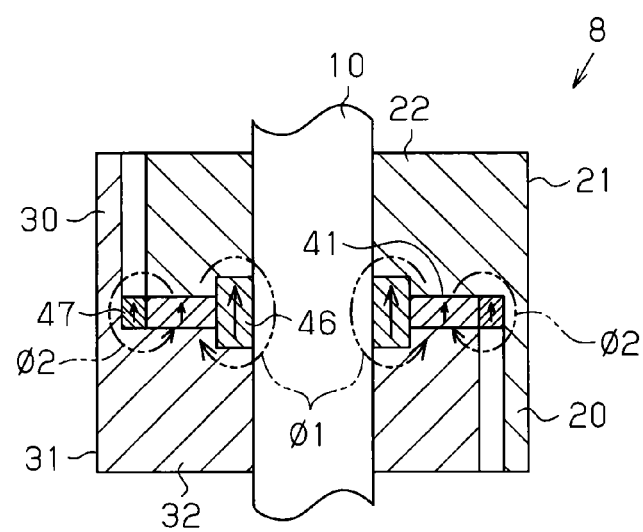
FIG. 6 is a cross-sectional view illustrating a short-circuit flux in the motor of FIG. 1.

(2) In the above embodiment, the inner auxiliary magnet 46 in which the first rotor core 21 (the first core base 22) side is magnetized to the N pole and the second rotor core 31 (the second core base 32) side is magnetized to the S pole is arranged in the field magnet 41. Accordingly, the short-circuit flux $\phi1$ as illustrated in FIG. 6 that extends from the first core base 22 on the inner diameter side of the field magnet 41 via the rotation shaft 10 to the second core base 32 is reduced by the inner auxiliary magnet 46. As a result, the magnetic flux of the field magnet 41 can be effectively used, and the output of the brushless motor 1 can be enhanced.

Further, the length in the axial direction of the inner auxiliary magnet 46 is longer than the field magnet 41, and the inner auxiliary magnet 46 is arranged inside the first and the second core bases 22 and 32. Accordingly, the short-circuit flux of the inner diameter side $\phi1$ (short-circuit flux in the axial direction that does not generate torque) can be further reduced so that the magnetic flux of the field magnet 41 can be effectively used for the output of the brushless motor 1.

Moreover, since the rotation shaft 10 includes a non-magnetic metal shaft, the short-circuit flux $\phi1$ of the inner diameter side can be further reduced.

(3) In the above embodiment, the outer auxiliary magnet 47, of which first rotor core 21 side is magnetized to the N pole and second rotor core 31 side is magnetized to the S pole, is arranged between the outer circumferential surface 41c of the field magnet 41 and the basal end inner peripheral surfaces 20b and 30b of the first and the second hook-like magnetic poles 20 and 30 so as to cover the first and the second arms 23 and 33. Accordingly, the outer auxiliary magnet 47 allows for the reduction of the short-circuit flux $\phi2$ (short-circuit flux in the axial direction that does not generate torque) as illustrated in FIG. 6 that extends from the first core base 22 on the outer diameter side of the field magnet 41 via second core base 32. As a result, the magnetic flux can be effectively used and thus the output of the brushless motor 1 can be enhanced.

(4) In the above embodiment, the first and the second hook-like magnetic poles 20 and 30 each have a rectangular shape and is elongated in the axial direction when viewed from the radius direction and are formed so that the first side surface 20c of each hook-like magnetic pole 20 and the first side surface 30c of each hook-like magnetic pole 30 are opposed to each other in parallel and also the second side surface 20d of each first hook-like magnetic pole 20 and the second side surface 30d of each hook-like magnetic pole 30 are opposed to each other in parallel.

Accordingly, the block-shaped magnets, which are elongated in the axial direction and can decrease manufacturing costs, can be employed for the first and the second inter-pole magnets 43 and 44.

(5) Further, according to the above embodiment, the first and the second inter-pole magnets 43 and 44 may be formed by, for example, a ferrite magnet and the field magnet 41 may be formed by, for example, a neodymium magnet. Thus, the magnetomotive forces of the first and the second inter-pole magnets 43 and 44, which are made for merely reducing the leakage magnetic flux, are smaller than the magnetomotive force of the field magnet 41. This reduces costs.

(6) Further, according to the above embodiment, the first and the second hook-like magnetic poles 20 and 30 are formed by bending the portions of the rotor core pieces PC1 and PC2 each formed by a steel plate forming the first and the second rotor core 31.

This simplifies the manufacturing process of the first and the second hook-like magnetic poles 20 and 30, shortens the manufacturing time, and reduces costs.

Second Embodiment

Next, a second embodiment of the present invention will be described with reference to FIGS. 7 and 8.

The present embodiment differs from the first embodiment in the magnetization of the outer auxiliary magnet 47. Thus, for convenience of description, the part of the outer auxiliary magnet, which is different, will be described in detail, and the other parts common to the first embodiment are denoted by the same numeral references and the detailed descriptions thereof will be omitted.

Figure 7:
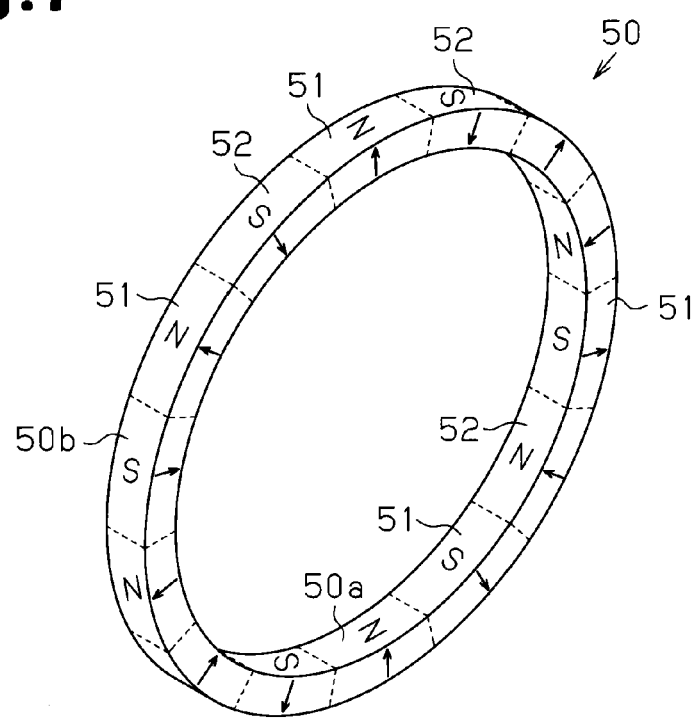
FIG. 7 is a perspective view of an outer auxiliary magnet arranged on a rotor according to a second embodiment.
Figure 8:
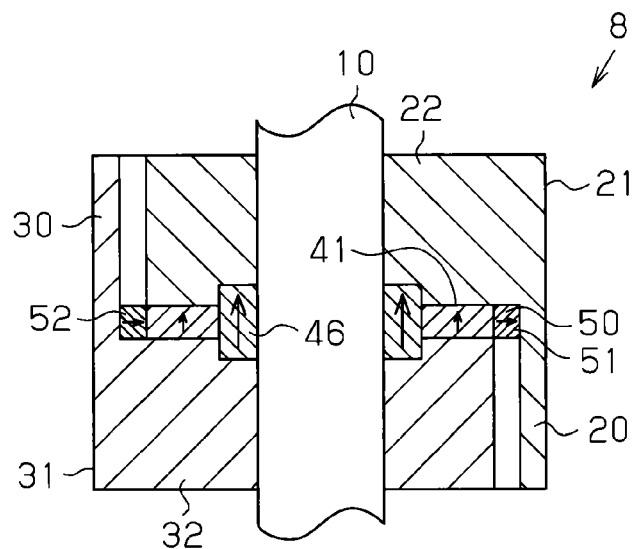
FIG. 8 is a cross-sectional view in the axial direction of the rotor of FIG. 7.

As illustrated in FIG. 7, the outer auxiliary magnet 50 is magnetized to the N pole and the S pole alternatively in the circumferential direction. Further, as illustrated in FIG. 8, the outer auxiliary magnet 50 has the same length in the axial direction as the field magnet 41, and its inner peripheral surface 50a is fixed to the outer circumferential surface 41c of the field magnet 41 and the outer circumferential surface 50b is fixed to the inner peripheral surfaces 20b and 30b of the first and the second hook-like magnetic poles 20 and 30.

Further, in the outer auxiliary magnet 50 magnetized to the N pole and the S pole alternatively in the circumferential direction, the N pole part 51 magnetized to the N pole on its outer circumferential surface is fixed to the basal end part of the inner peripheral surface 20b of the first hook-like magnetic pole 20 functioning as the N pole of the first rotor core 21, and the S pole part 52 magnetized to the S pole on its outer circumferential surface is fixed to the basal end part of the inner peripheral surface 30b of the second hook-like magnetic pole 30 functioning as the S pole of the second rotor core 31.

Next, the advantages of the second embodiment will be described below.

(7) In the above embodiment, the annular outer auxiliary magnet 50 magnetized to the N pole and the S pole alternatively in the circumferential direction is arranged at the outer circumferential side of the field magnet 41.

Further, the N pole part 51 magnetized to the N pole of the outer auxiliary magnet 50 is abut against the inner peripheral surface 20b of the first hook-like magnetic pole 20 of the same polarity, and the S pole part 52 magnetized to the S pole of the outer auxiliary magnet 50 is abut against the inner peripheral surface 30b of the second hook-like magnetic pole 30 of the same polarity.

Accordingly, the short-circuit flux of the field magnet 41 can be suppressed by the outer auxiliary magnet 50 and the magnetic flux of the outer auxiliary magnet 50 can be effectively used for the output of the brushless motor 1.

(8) Further, the above second embodiment has advantages (1), (2), and (4)-(6) of the first embodiment.

Third Embodiment

Next, a third embodiment of the present invention will now be described with reference to FIGS. 9 to 12.

The present embodiment differs from the first embodiment in the arrangement of the first and the second inter-pole magnets 43 and 44 and the outer auxiliary magnet 47. Thus, for convenience of description, the parts of the first and the second inter-pole magnets 43 and 44 and the outer auxiliary magnet 47, which are different, will be described in detail, and the other parts common to the first embodiment are denoted by the same numeral references and the detailed descriptions thereof will be omitted.

Figure 9:
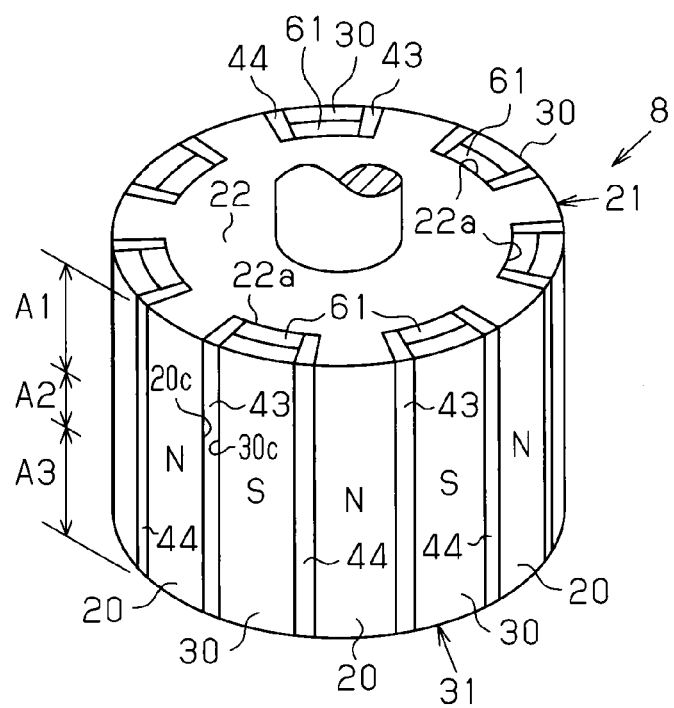
FIG. 9 is a perspective view taken from a first rotor core side of the rotor in a third embodiment.
Figure 10:
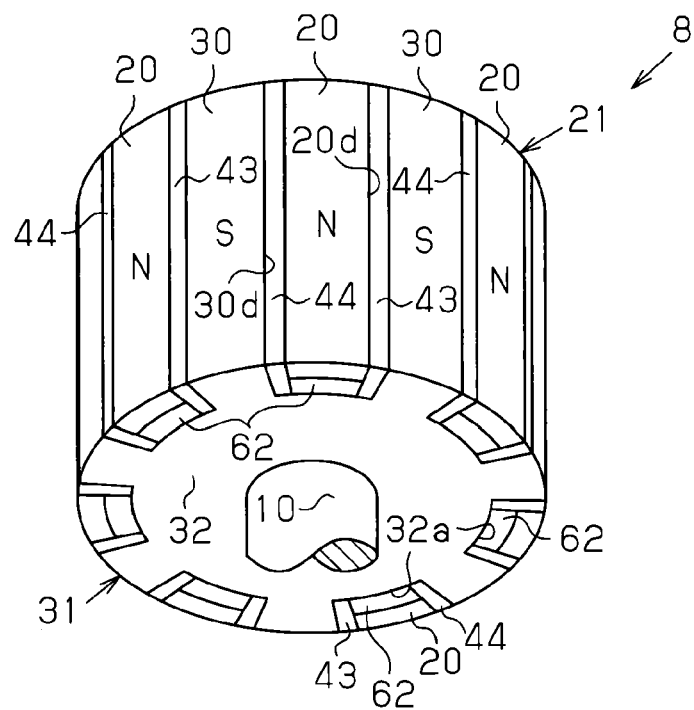
FIG. 10 is a perspective view taken from the second rotor core side of the rotor of FIG. 9.
Figure 11:
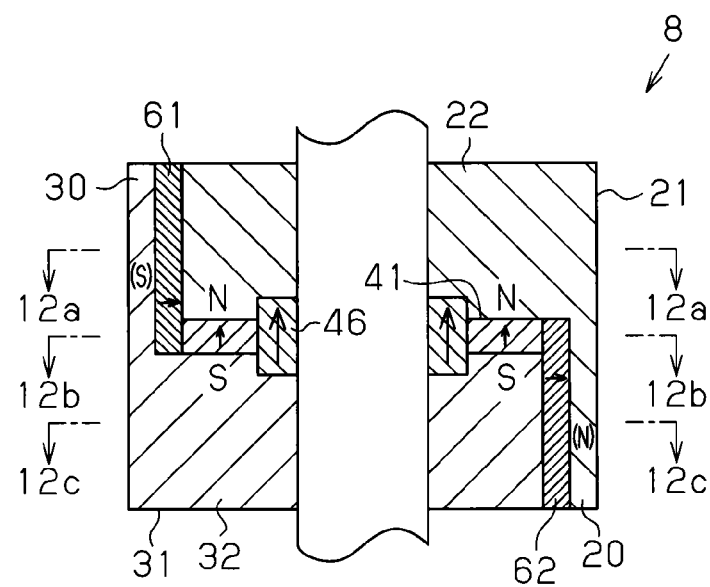
FIG. 11 is a cross-sectional view in the axial direction of the rotor of FIG. 9.

As illustrated in FIGS. 9 and 10, each first inter-pole magnet 43 held and fixed between the first side surface 20c of the first hook-like magnetic pole 20 and the first side surface 30c of the second hook-like magnetic pole 30 is formed extended in the radial direction to abut against the outer circumferential surfaces 22a and 32a of the first and the second core bases 22 and 32.

Further, each second inter-pole magnet 44 held and fixed between the second side surface 20d of the first hook-like magnetic pole 20 and the second side surface 30d of the second hook-like magnetic pole 30 is formed extended in the radial direction to abut against the outer circumferential surfaces 22a and 32a of the first and the second core bases 22 and 32.

The formation of the first and the second inter-pole magnets 43 and 44 provides space that opens toward the first rotor core 21 side between the second hook-like magnetic pole 30, the second arm 33 (see FIG. 11), the field magnet 41 (see FIG. 11), the first core base 22, and the first and the second inter-pole magnets 43 and 44. As illustrated in FIG. 9, a first back auxiliary magnet 61 is fitted and fixed in the space.

The first back auxiliary magnet 61 is magnetized in the radial direction so that the side abutting against the inner peripheral surface 30b of the second hook-like magnetic pole 30 is magnetized to the S pole that is the same pole as the second hook-like magnetic pole 30 and the side abutting against the first core base 22 is magnetized to the N pole that is the same pole as the first core base 22.

Similarly, space that opens toward the second rotor core 31 is provided between the first hook-like magnetic pole 20, the first arm 23 (see FIG. 11), the field magnet 41 (see FIG. 11), the second core base 32, and the first and the second inter-pole magnets 43 and 44. As illustrated in FIG. 10, a second back auxiliary magnet 62 is fitted and fixed into each space.

The second back auxiliary magnet 62 is magnetized in the radial direction so that the side abutting against the inner peripheral surface 20b of the first hook-like magnetic pole 20 is magnetized to the N pole that is the same pole as the first hook-like magnetic pole 20 and the side abutting against the second core base 32 is magnetized to the S pole that is the same pole as the second core base 32.

Figure 12A:
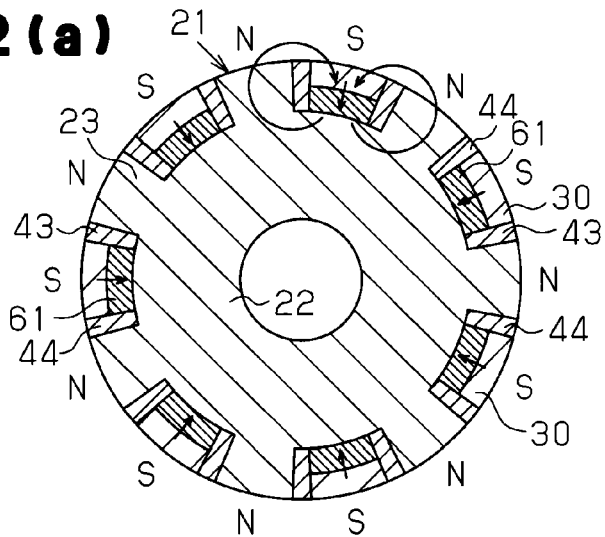
FIG. 12($a$) is a cross-sectional view taken along line 12$a$-12$a$ in FIG. 11, FIG. 12($b$) is a cross-sectional view taken along line 12$b$-12$b$ in FIG. 11, and FIG. 12($c$) is a cross-sectional view taken along line 12$c$-12$c$ in FIG. 11.

That is, as illustrated in FIG. 12(a), the part A1 of the first core base 22 (see FIG. 9) forms the rotor of the structure in which the second hook-like magnetic pole 30 of which stator 5 side functions as the first back auxiliary magnet 61 of the S pole and the first hook-like magnetic pole 20 that functions as the protruded N pole by the first back auxiliary magnet 61 are arranged alternatively in the circumferential direction.

Figure 12B:
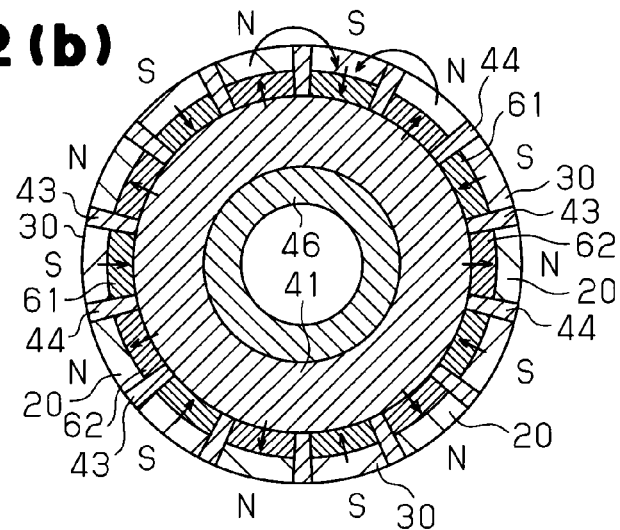
Figure 12C:
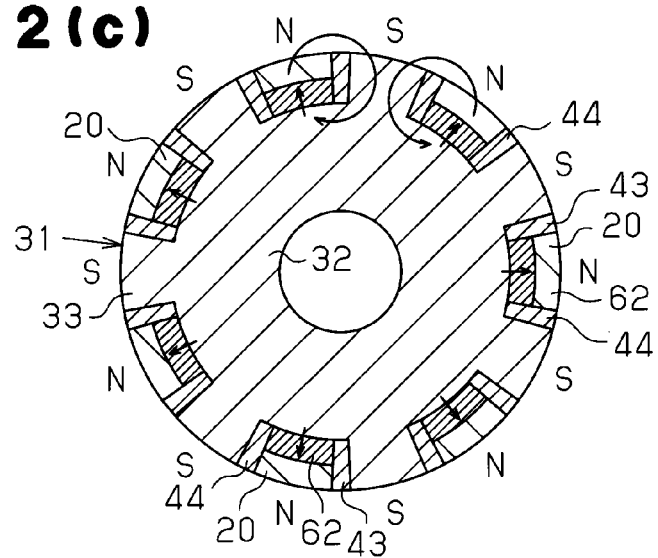

Further, as illustrated in FIG. 12(c), the part A3 of the second core base 32 (see FIG. 9) forms the rotor of the structure in which the first hook-like magnetic pole 20 of which stator 5 side functions as the second back auxiliary magnet 62 of the N pole and the second hook-like magnetic pole 30 that functions as the protruded S pole by the second back auxiliary magnet 62 are arranged alternatively in the circumferential direction.

Moreover, as illustrated in FIG. 12(b), the part A2 of the field magnet 41 (see FIG. 9) forming the Lundell type structure in which the first hook-like magnetic pole 20 of which stator 5 side functions as the N pole by the first back auxiliary magnet 61 and the second hook-like magnetic pole 30 of which stator 5 side functions as the S pole by the second back auxiliary magnet 62 are arranged alternatively in the circumferential direction.

The advantages of the third embodiment will now be described.

(9) In the above embodiment, a space that opens toward the first rotor core 21 is provided between the second hook-like magnetic pole 30, the second arm 33, the field magnet 41, the first core base 22, and the first and the second inter-pole magnets 43 and 44, and the first back auxiliary magnet 61 is fitted and fixed in the space. The first back auxiliary magnet 61 is magnetized in the radial direction so that the side abutting against the second hook-like magnetic pole 30 is the S pole that is the same pole as the second hook-like magnetic pole 30 and the side abutting against the first core base 22 is the N pole that is the same pole as the first core base 22.

Accordingly, the part A1 of the first core base 22 allows the first back auxiliary magnet 61 to suppress the short-circuit flux of the field magnet 41. In addition, the magnetic flux of the first back auxiliary magnet 61 can be more effectively used for the output of the brushless motor 1.

(10) In the above embodiment, a space that opens toward the second rotor core 31 is provided between the first hook-like magnetic pole 20, the first arm 23, the field magnet 41, the second core base 32, and the first and the second inter-pole magnets 43 and 44, and the second back auxiliary magnet 62 is fitted and fixed in the space. The second back auxiliary magnet 62 is magnetized in the radial direction so that the side abutting against the first hook-like magnetic pole 20 is the N pole that is the same pole as the first hook-like magnetic pole 20 and the side abutting against the second core base 32 is the S pole that is the same pole as the second core base 32.

Accordingly, the part A3 of the second core base 32 allows the second back auxiliary magnet 62 to suppress the short-circuit flux of the field magnet 41. Further, the magnetic flux of the second back auxiliary magnet 62 can be more effectively used for the output of the brushless motor 1.

(11) In the above embodiment, the first and the second back auxiliary magnets 61 and 62 are of the same shape as the first and the second hook-like magnetic poles 20 and 30 when viewed from the radial direction. Thus, their surface areas are far larger than those of the first and the second inter-pole magnets 43 and 44.

Accordingly, the magnetic flux of the first and the second back auxiliary magnets 61 and 62 can be more effectively used for the output of the brushless motor 1.

Further, the first and the second back auxiliary magnets 61 and 62 are including, for example, a neodymium magnet and the first and the second inter-pole magnets 43 and 44 are including, for example, a ferrite magnet so that the first and the second back auxiliary magnets 61 and 62 have greater magnetomotive force than the first and the second inter-pole magnets 43 and 44 and so that the amount of the magnetic flux, which effectively contributes to the output, can be increased to enhance the output while reducing costs.

(12) Further, the third embodiment has advantages (1), (2), and (4)-(6) described for the first embodiment.

Fourth Embodiment

Next, a fourth embodiment of the present invention will be described with reference to FIGS. 13 and 14.

The present embodiment differs from the third embodiment in the arrangement of the rotor 8. Thus, for convenience of description, the rotor core, which is different, will be described in detail, and the other parts common to the first embodiment are denoted by the same numeral references and the detailed descriptions thereof will be omitted.

Figure 14:
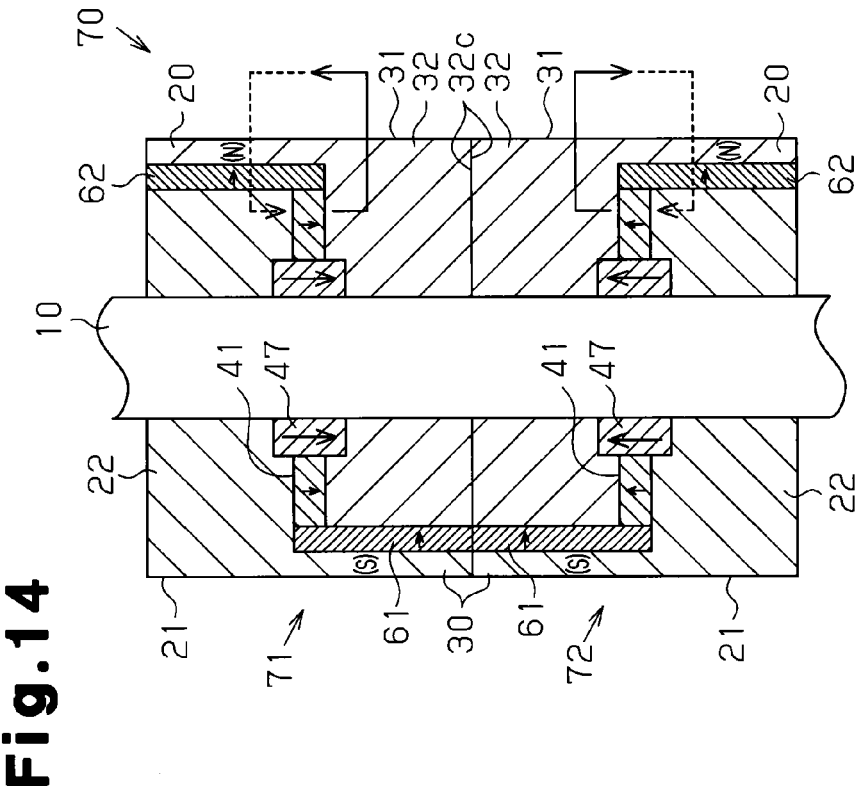
FIG. 14 is a cross-sectional view in the axial direction of the rotor of FIG. 13.
Figure 13:
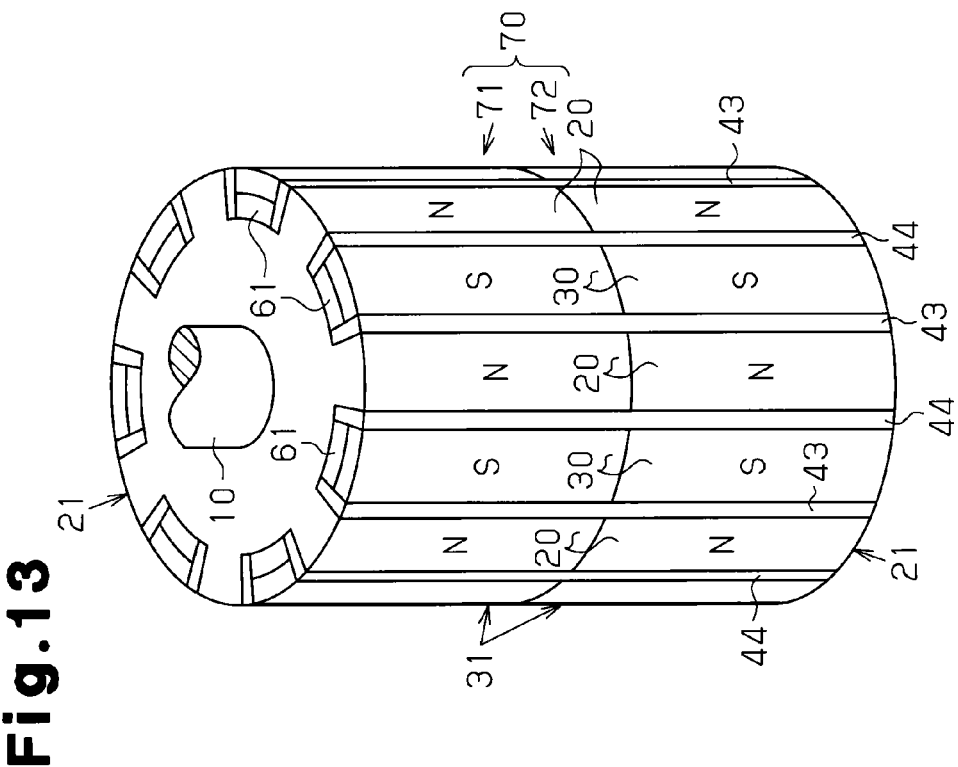
FIG. 13 is a perspective view of a rotor according to a fourth embodiment.

As illustrated in FIGS. 13 and 14, for the rotor 70 of the present embodiment, two sets of the rotors 8 of the third embodiment are provided, and a first layer rotor 71 and a second layer rotor 72 are fixed to the rotation shaft 10 in the stacked structure so as to overlap each other. In the present embodiment, the second rotor core 31 of the first layer rotor 71 (an opposing surface 32c of the second core base 32) and the second rotor core 31 of the second layer rotor 72 (an opposing surface 32c of the second core base 32) abut against each other and are arranged so that the first and the second hook-like magnetic poles 20 and 30 of the same polarity overlap in the axial direction.

Further, in the present embodiment, the first inter-pole magnet 43 of the rotor 71 side and the first inter-pole magnet 43 of the rotor 72 side are integrated into one piece of first inter-pole magnets 43, which is fitted into the rotor 71 and the rotor 72 in a continuous manner in the axial direction and, similarly, the second inter-pole magnet 44 of the rotor 71 side and the second inter-pole magnet 44 of the rotor 72 side are integrated into one of the second inter-pole magnets 44 and fitted in the axial direction so that the rotor 71 and the rotor 72 are continuous.

Accordingly, for the rotor 70 including the rotors 71 and 72, the first and the second inter-pole magnets 43 and 44 of the same polarity for each rotor 71 and rotor 72 are arranged in an integrated manner. This decreases the number of parts and reduces costs.

Next, the advantages of the fourth embodiment will be described below.

(13) In the above embodiment, the integration of two rotors 71 and 72 allows the rotor to generate a higher torque and eliminates an imbalanced state in the axial direction. Furthermore, since the rotors 71 and 72 have the same structure, the number of parts can be decreased. This simplifies manufacturing and reduces costs.

(14) In the above embodiment, the first and the second inter-pole magnets 43 and 44 of the same polarity for the overlapping rotors 71 and 72 can be integrated to share one permanent magnet. This decreases the number of parts and reduces costs.

(15) Further, the fourth embodiment has advantages (1), (2), and (4)-(6) of the first embodiment.

Fifth Embodiment

Next, a fifth embodiment of the present invention will be described with reference to FIGS. 15 to 17.

The present embodiment is a rotor that is one of the applications of the rotor 8 of the third embodiment. Thus, for convenience of description, the parts common to the third embodiment are denoted by the same numeral references and the detailed descriptions thereof will be omitted.

Figure 15:
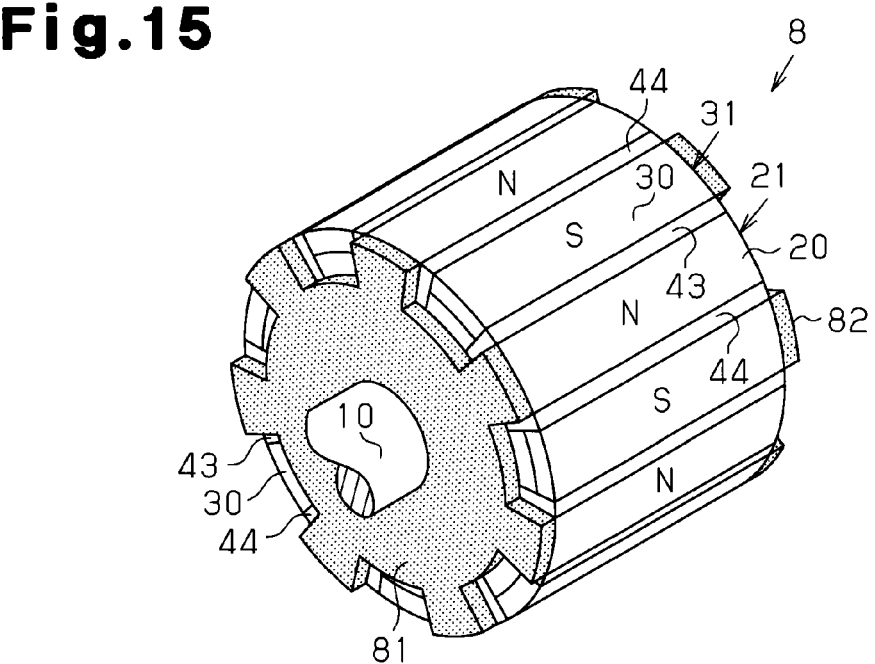
FIG. 15 is a cross-sectional view taken from a first rotor core side of a rotor according to a fifth embodiment.

As illustrated in FIG. 15, a first shaft side auxiliary magnet 81 is fixed to the first rotor core 21, in particular, the opposing surface 22c side of the first core base 22. The first shaft side auxiliary magnet 81 has the same external shape as that of the first rotor core 21 when viewed from the axial direction and covers the first rotor core 21. The first shaft side auxiliary magnet 81 is magnetized in the axial direction so that the side fixed to the first core base 22 is the same N pole as the first core base 22 and the other side is the S pole.

Figure 16:
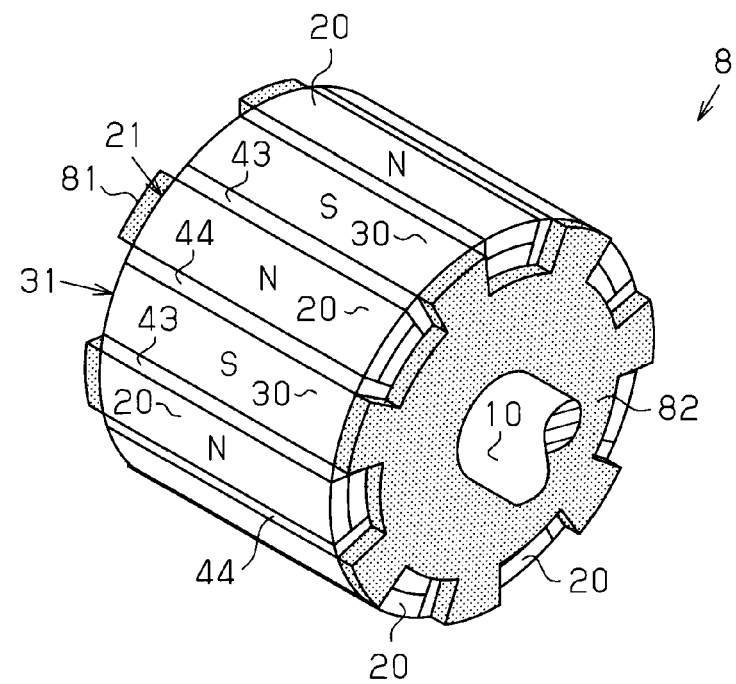
FIG. 16 is a perspective view taken from the second rotor core side of the rotor of FIG. 15.

As illustrated in FIG. 16, a second shaft side auxiliary magnet 82 is fixed to the second rotor core 31, in particular, the opposing surface 32c side of the second core base 32. The second shaft side auxiliary magnet 82 has the same external shape as that of the second rotor core 31 when viewed from the axial direction and covers the second rotor core 31. The second shaft side auxiliary magnet 82 is magnetized in the axial direction so that the side fixed to the second core base 32 is the same S pole as the second core base 32 and the other side is the N pole.

Next, the advantages of the fifth embodiment will be described.

(16) In the above embodiment, the first shaft side auxiliary magnet 81 is fixed to and covers the opposing surface 22c side of the first core base 22. Further, the first core base 22 side of the first shaft side auxiliary magnet 81 is magnetized to the same N pole as the first core base 22.

Figure 17:
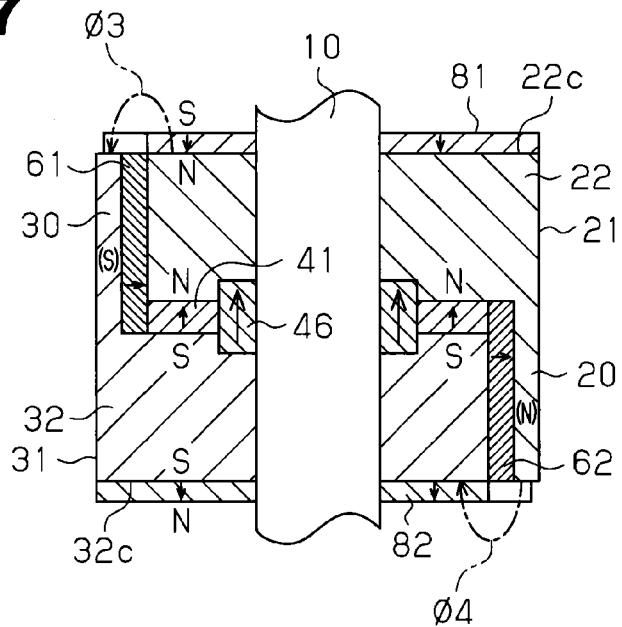
FIG. 17 is a cross-sectional view in the axial direction of the rotor of FIG. 15.

Accordingly, as illustrated in FIG. 17, the short-circuit flux $\phi 3$ that would be short-circuited from the opposing surface 22c of the first core base 22 to the second hook-like magnetic pole 30 can be suppressed.

(17) In the above embodiment, the second shaft side auxiliary magnet 82 is fixed to and covers the opposing surface 32c side of the second core base 32. Further, the second core base 32 side of the second shaft side auxiliary magnet 82 is magnetized to the same S pole as the second core base 32.

Accordingly, as illustrated in FIG. 17, the short-circuit flux $\phi 4$ that would be short-circuited from the first hook-like magnetic pole 20 to the back surface 32c of the second core base 32 can be suppressed.

(18) Further, the fifth embodiment has advantages (1), (2), and (4)-(6) of the first embodiment.

The above embodiments can be modified as below.

Although the inner auxiliary magnet 46 is provided in the first to fifth embodiments described above, the inner auxiliary magnet 46 can be omitted. In this case, the field magnet 41 reaches the rotation shaft 10. Thus, the annular recess parts H1 and H2 formed on the first and the second rotor cores 21 and 31 may be omitted.

Although the length in the axial direction of the inner auxiliary magnet 46 is longer than that of the field magnet 41 in the first to fifth embodiments described above, the lengths may be the same. In this case, the annular recess parts H1 and H2 formed on the first and the second rotor cores 21 and 31 may be omitted.

Although the outer auxiliary magnet 47 is provided in the first embodiment described above, this outer auxiliary magnet 47 can be omitted. In this case, the inner auxiliary magnet 46 can of course be also omitted.

In the first to fifth embodiments described above, the first and the second hook-like magnetic poles 20 and 30 are of the rectangular shape elongated in the axial direction when viewed from the radial direction. Instead, the first and the second hook-like magnetic poles 20 and 30 may be formed in the tapered shape that tapers toward the distal end. This case requires changes in the shapes of the first and the second inter-pole magnets 43 and 44 in accordance with the shapes of the first and the second hook-like magnetic poles 20 and 30. It is obvious that other shapes may also be used.

The first back auxiliary magnet 61 and the second back auxiliary magnet 62 are used in the third embodiment. However, either one of the two may be omitted.

In the fourth embodiment described above, two sets of the rotors 8 of the third embodiment are provided, and the first layer rotor 71 and the second layer rotor 71 are overlapped with each other in a stacked structure to form the single rotor 70. Instead, three sets of the rotors 8 of the third embodiment may be provided to form a three-layer structure.

In this case, in FIG. 13 for example, the third layer rotor stacked on the second rotor 72 is arranged so that the first rotor core 21 of the third stack rotor is abut against the second stack rotor 72, and the first and the second hook-like magnetic poles of the same polarity are overlapped in the axial direction. In this case, the first inter-pole magnet 43 of the same polarity is formed by one permanent magnet and the second inter-pole magnet 44 of the same polarity is formed by one permanent magnet. This decreases the number of parts and reduces costs.

Although the rotor 8 of the third embodiment is used to form the rotor 70 in the fourth embodiment, the rotor of the first to third embodiments and their modified examples may be used to form the rotor 70.

Although the first and the second inter-pole magnets 43 and 44 of the same polarity for the stacked rotors 71 and 72 are integrated to share one magnet in the fourth embodiment described above, it is obvious that separate first inter-pole magnets 43 and separate second inter-pole magnets 44 may be used.

In the first to fifth embodiments, the first rotor core 21 is formed by stacking the rotor core pieces PC1 of steel plates and the second rotor core 31 is formed by stacking the rotor core pieces PC2 of steel plates. Instead, they may be formed integrally forged or be formed from pressed powder magnetic core material. For example, magnetic powder such as iron powder and insulating material such as resin may be mixed and then thermally molded with a metal mold to form the first rotor core 21 and the second rotor core 31.

This case allows for higher flexibility in the design of the first rotor core 21 and the second rotor core 31, an extremely simplified manufacturing process, and smaller magnetic resistance of the first rotor core 21 and the second rotor core 31.

There are seven of the first and the second hook-like magnetic poles 20 and 30 in the first to fifth embodiments. However, the number is not limited and may be changed.

In the first to fourth embodiments, the first shaft side auxiliary magnet 81 and the second shaft side auxiliary magnet 82 as described in the fifth embodiment may be fixed to and cover the first and the second rotor cores 21 and 31.

Sixth Embodiment

A sixth embodiment of the present invention will now be described with reference to FIGS. 18 to 23.

Figure 18:
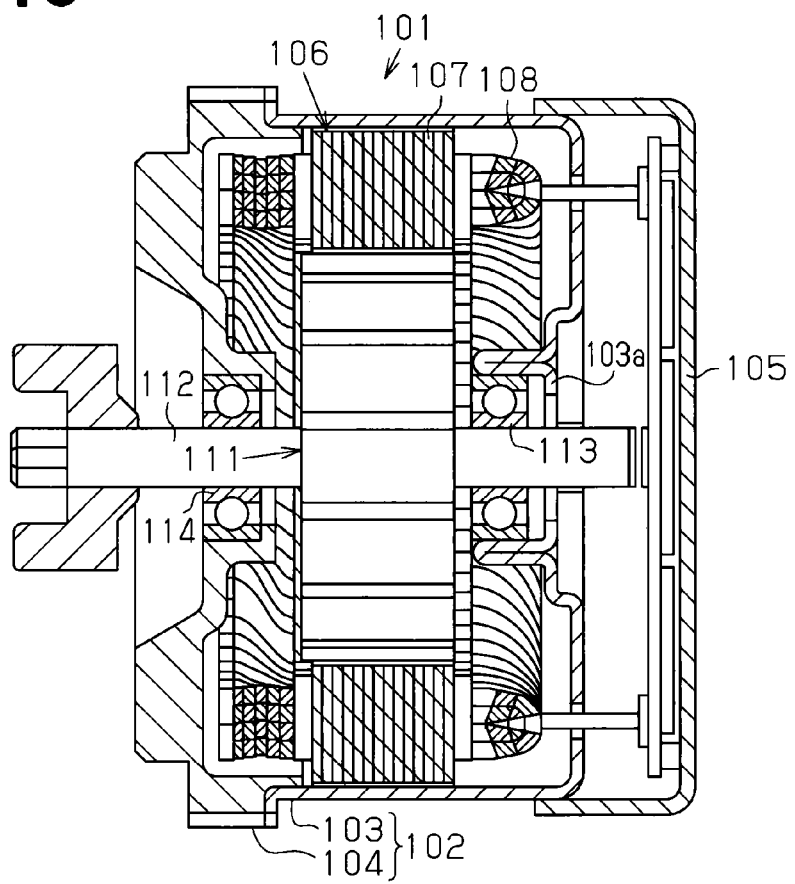
FIG. 18 is a cross-sectional view of a motor according to a sixth embodiment.

As illustrated in FIG. 18, a motor case 102 of a motor 101 includes a cylindrical case housing 103 having a closed end and a front end plate 104 closing the open end at the front side (the left side in FIG. 18) of the case housing 103. Further, a circuit accommodation box 105 that accommodates a power supply circuit such as a circuit board and the like is attached to the end of the rear side (the right side in FIG. 18) of the cylindrical housing 103. A stator 106 is fixed to the inner peripheral surface of the cylindrical housing 103. The stator 106 has an armature core 107 having a plurality of teeth extending inward in the radial direction and a segment conductor (SC) coil 108 wound around the teeth of the armature core 107. A rotor 111 of the motor 101 includes a rotation shaft 112 and is arranged in the stator 106. The rotation shaft 112 is a non-magnetic metal shaft and rotatably supported by bearings 113 and 114 that are supported by the bottom part 103*a* of the cylindrical housing 103 and the front end plate 104.

Figure 20:
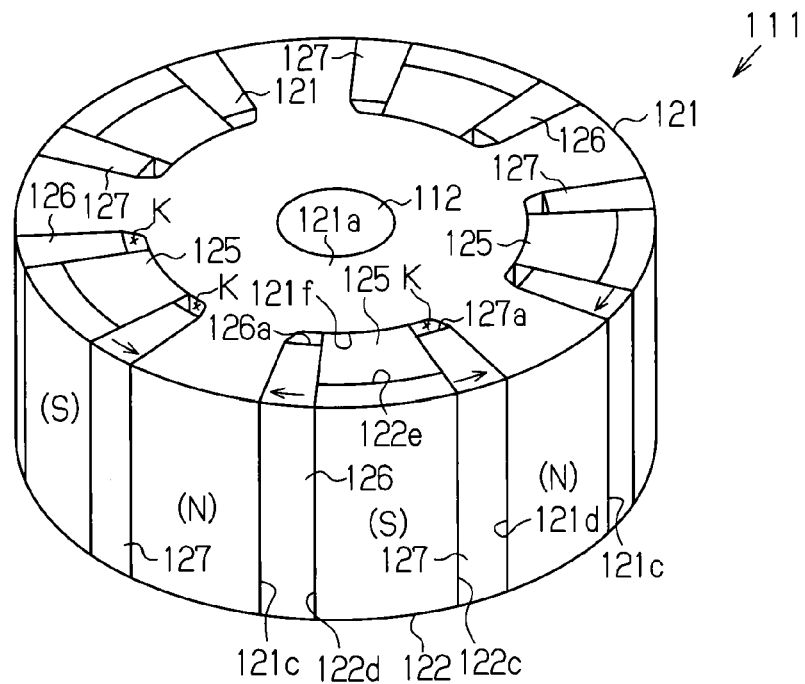
FIG. 20 is a perspective view of the rotor of FIG. 18.
Figure 21:
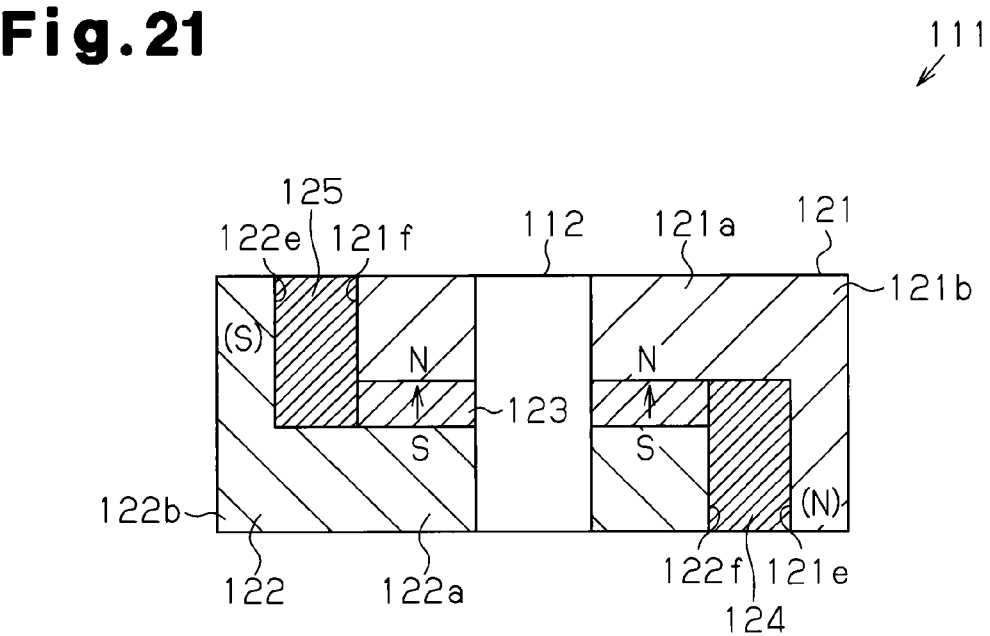
FIG. 21 is a cross-sectional view of the rotor of FIG. 18.

As illustrated in FIGS. 20 and 21, the rotor 111 includes first and second rotor cores 121 and 122, a field magnet 123 (see FIG. 21), first and second back auxiliary magnets 124 and 125, and an inter-pole magnet 126. The field magnet 123 is annular, for example. The arrows of the solid lines in FIGS. 20 and 21 represent the magnetization directions (from the S pole to the N pole) of the magnets 123, 124, 125, and 126.

As illustrated in FIGS. 20 and 21, the first rotor core 121 is formed so that, from the outer circumferential portion of a generally disk-shaped first core base 121*a*, a plurality (five in the present embodiment) of first hook-like magnetic poles 121*b* protrude outward in the radial direction at equal intervals and extend in the axial direction. Circumferential end surfaces 121*c* and 121*d* of the first hook-like magnetic pole 121*b* are planar surfaces extended in the radial direction (not inclined with respect to the radial direction when viewed from the axial direction), and the cross-section orthogonal to the axis of the first hook-like magnetic pole 121*b* is triangular. The angle in the circumferential direction of each first hook-like magnetic pole 121*b*, that is, the angle between the circumferential end surfaces 121*c* and 121*d* is set to be smaller than the angle of the gap between the first hook-like magnetic poles 121*b* that are adjacent to each other in the circumferential direction.

As illustrated in FIGS. 20 and 21, the second rotor core 122 has the same shape as the first rotor core 121 and is formed so that, on the outer circumferential portion of an approximately disk-shaped second core base 122*a*, a plurality of second hook-like magnetic poles 122*b* are protruded outward in the radial direction at equal intervals and extended in the axial direction. Circumferential end surfaces 122*c* and 122*d* of the second hook-like magnetic pole 122*b* are planar surfaces extended in the radial direction, and the cross-section orthogonal to the axis of the second hook-like magnetic pole 122*b* is triangular. The angle in the circumferential direction of each second hook-like magnetic pole 122*b*, that is, the angle between the circumferential end surfaces 122*c* and 122*d* is set to be smaller than the angle of the gap between the second hook-like magnetic poles 122*b* that are adjacent to each other in the circumferential direction. Further, the second rotor core 122 is fixed to the first rotor core 121 so that each second hook-like magnetic pole 122*b* is arranged between corresponding first hook-like magnetic poles 121*b* and that the field magnet 123 (see FIG. 21) is arranged (held) between the first core base 121*a* and the second core base 122*a* in the axial direction. In this case, one circumferential end surface 121*c* of the first hook-like magnetic pole 121*b* and the other circumferential end surface 122*d* of the second hook-like magnetic pole 122*b* are arranged in parallel in the axial direction. Therefore, each gap between the end surfaces 121*c* and 122*d* is formed to be substantially straight along the axial direction. Also, the other circumferential end surface 121*d* of the first hook-like magnetic pole 121*b* and one circumferential end surface 122*c* of the second hook-like magnetic pole 122*b* are arranged in parallel along the axial direction. Therefore, each gap between the end surfaces 121*d* and 122*c* is formed to be substantially straight along the axial direction.

As illustrated in FIG. 20, the field magnet 123 is designed so that its outer diameter is the same as that of the first and the second core bases 121a and 122a and is magnetized in the axial direction so as to cause the first hook-like magnetic pole 121b to function as the first magnetic pole (the N pole in the present invention) and cause the second hook-like magnetic pole 122b to function as the second magnetic pole (the S pole in the present invention). Accordingly, the rotor 111 of the present embodiment is the rotor of the so-called Lundell type structure using the field magnet 123. In the rotor 111, the first hook-like magnetic pole 121b serving as the N pole and the second hook-like magnetic pole 122b serving as the S pole are arranged alternatively in the circumferential direction and the number of magnetic poles is ten (five pairs of poles. Since the number of the pairs of poles is an odd number equal to or more than three, when viewed as a unit of rotor core, the hook-like magnetic poles of the same polarity do not occur at 180° opposite positions in the circumferential direction. This obtains a shape that is stable against magnetic vibration.

The first back auxiliary magnet 124 is arranged between a back surface 121e (a surface inside in the radial direction) of each first hook-like magnetic pole 121b and an outer circumferential surface 122f of the second core base 122a. The first back auxiliary magnet 124 has a triangular cross-section orthogonal to the axial direction, the side abutting against the back surface 121e of the first hook-like magnetic pole 121b is magnetized to the N pole that is the same polarity as the first hook-like magnetic pole 121b, and the side abutting against the outer circumferential surface 122f of the second core base 122a is magnetized to the S pole that is the same polarity as the second core base 122a.

Further, the second back auxiliary magnet 125 is arranged on the back surface 122e of each second hook-like magnetic pole 122b in the same manner as the first hook-like magnetic pole 121b. For example, the ferrite magnet can be used for the first back auxiliary magnet 124 and the second back auxiliary magnet 125. The second back auxiliary magnet 125 has a triangular cross-section orthogonal in the axial direction, the side abutting against the back surface 122e is magnetized to the S pole, and the side abutting against the outer circumferential surface 121f of the first core base 121a is magnetized to the N pole.

The lengths in the axial direction of the first back auxiliary magnet 124 and the second back auxiliary magnet 125 are set so that these magnets are overlapped with each other at a position in the axial direction of the rotor 111 where the field magnet 123 is arranged, in other words, so that the magnets are positioned from both sides of the rotor 111 to the position in the axial direction where the field magnet 123 is arranged.

As illustrated in FIG. 20, the inter-pole magnets 126 and 127 are arranged between the first hook-like magnetic pole 121b and the second hook-like magnetic pole 122b in the circumferential direction. In detail, the first inter-pole magnet 126 is fitted and fixed between a planar surface formed by one circumferential end surface 121c of the first hook-like magnetic pole 121b and the circumferential end surface of the first back auxiliary magnet 124 and another planar surface formed by the other circumferential end surface 122d of the second hook-like magnetic pole 122b and the circumferential end surface of the second back auxiliary magnet 125. A gap K having a length L in the radial direction is formed between an inner end surface 126a in the radial direction of the first inter-pole magnet 126 and the outer circumferential surfaces 121f and 122f of the first and the second core bases 121a and 122a.

Figure 19A:
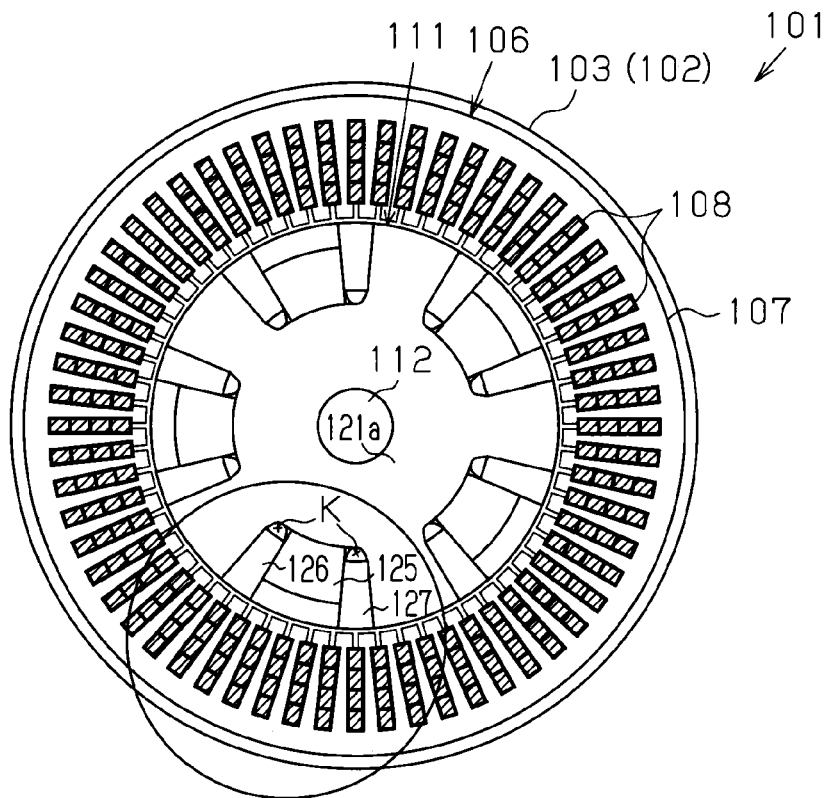
FIG. 19($a$) is a plan view of the motor of FIG. 18 and FIG. 19($b$) is an enlarged view of a main part of FIG. 19($a$).
Figure 19B:
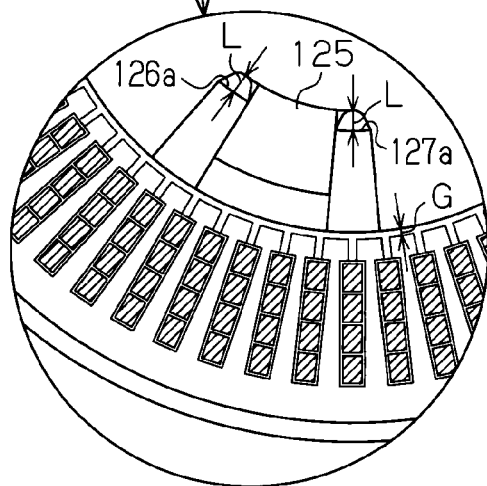

As illustrated in FIGS. 19(a) and 19(b), it is desirable that the gap K be formed so that its length L in the radial direction satisfies $0<L/G\leq4.5$, more preferably, $1.5\leq L/G$, and even further preferably, $1.5\leq L/G\leq 3.5$, where G represents the air gap in the radial direction between the inner peripheral surface of the stator 106 and the outer circumferential surface of the rotor 111.

Also, the second inter-pole magnet 127 has the same shape as the first inter-pole magnet 126 and is fitted and fixed between a planar surface formed by the other circumferential end surface 121f of the first hook-like magnetic pole 121b and the circumferential end surface of the first back auxiliary magnet 124 and another planar surface formed by the other circumferential end surface 122e of the second hook-like magnetic pole 122b and the circumferential end surface of the second back auxiliary magnet 125, and a gap K is formed between an inner end surface 127a in the radial direction and the outer circumferential surfaces 121f and 122f of the first and the second core bases 121a and 122a. The first and the second inter-pole magnets 126 and 127 are magnetized in the circumferential direction so as to face the first and the second hook-like magnetic poles 121b and 122b in the same polarity, respectively (so that the first hook-like magnetic pole 121b side is the N pole and the second hook-like magnetic pole 122b side is the S pole).

In the motor 101, when three-phase driving current is supplied to the segment conductor (SC) coil 108 via the power supply circuit within the circuit accommodation box 105, the magnetic field for rotating the rotor 111 is generated at the stator 106. This rotates and drives the rotor 111.

Next, the operation of the motor 1 will be described.

In the rotor 111 of the motor 101 of the present embodiment, the gap K having the length L in the radial direction is formed between the end surfaces 126a and 127a inward in the radial direction from the first and the second inter-pole magnets 126 and 127 and the outer circumferential surfaces 121f and 122f of the first and the second core bases 121a and 122a. Thus, the short-circuit fluxes from the inter-pole magnets 126 and 127 to the inside in the radial direction are reduced, and the magnetic fluxes of the inter-pole magnets 126 and 127 can be effectively used as the motor output.

Figure 22:
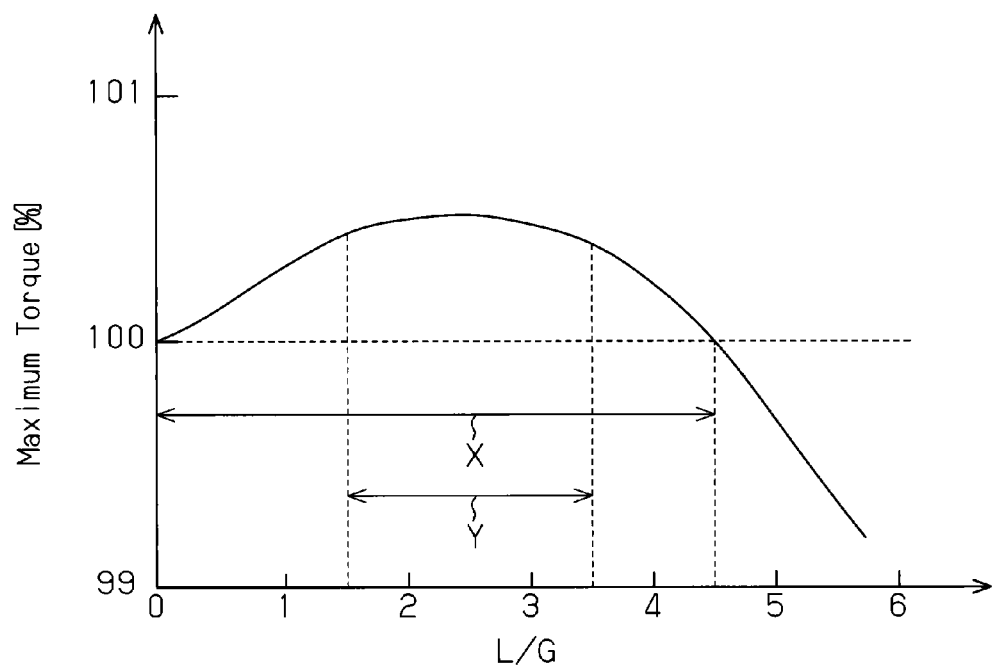
FIG. 22 is a graph illustrating the relationship between the ratio of a length L in the radial direction of a gap of the rotor of FIG. 18 to an air gap G between the rotor and the stator and the maximum torque.

Further, the gap K is formed so that the length L in the radial direction satisfies $0<L/G\leq4.5$, where G represents the air gap in the radial direction between the inner peripheral surface of the stator 106 and the outer circumferential surface of the rotor 111, so that the torque ranging X in FIG. 22 can be obtained to increase the motor output. Further, when the gap K is formed to satisfy $1.5\leq L/G\leq3.5$, a higher torque in range Y in FIG. 22 can be obtained to increase the motor output.

Figure 23:
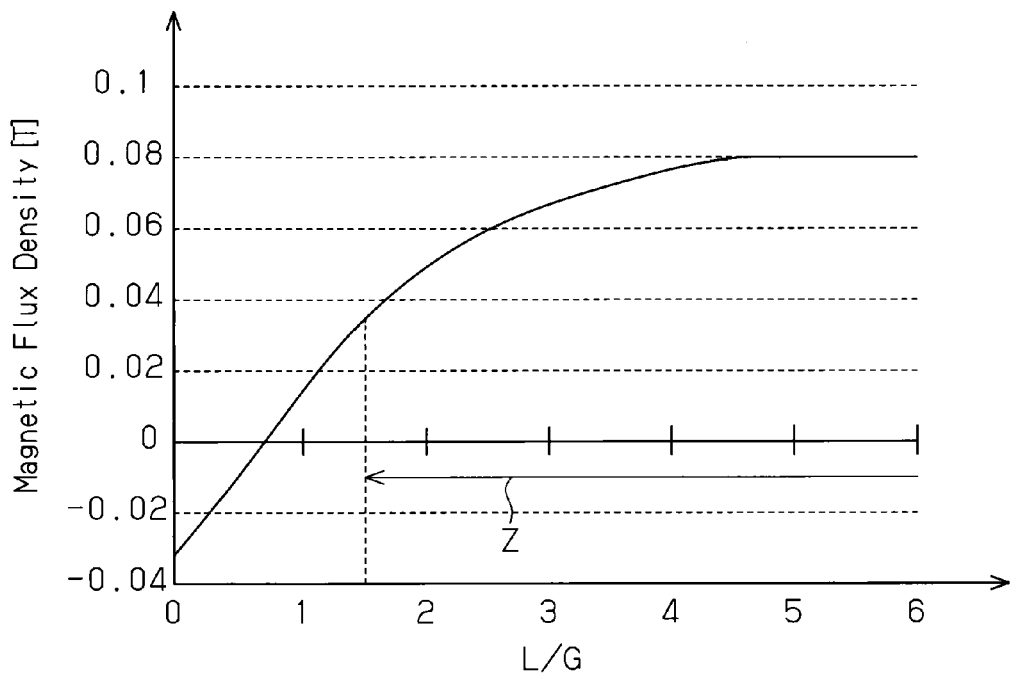
FIG. 23 is a graph illustrating the relationship between the ratio of a length L in the radial direction of a gap of the rotor of FIG. 18 to an air gap between the rotor and the stator and the magnetic flux density.

Here, for example, if the length L in the radial direction of the gap K were shorter, the magnetic fluxes of the inter-pole magnets 126 and 127 would short-circuit in the inner diameter side without extending between the stator 106 and the rotor 111, and the reverse magnetic field acts on the back auxiliary magnets 124 and 125. However, when the gap K is formed to satisfy, for example, $1.5\leq L/G$, the magnetic flux density in range Z, which is shown in FIG. 23, can be obtained. This prevents a reverse magnetic field from acting on the back auxiliary magnets 124 and 125 and prevents the magnetic flux density from decreasing.

The advantages of the sixth embodiment will now be described.

(19) The inter-pole magnets 126 and 127 are arranged with the gap K from the first and the second rotor cores 121 and 122 in the radial direction. This decreases the short-circuit fluxes extending inward in the radial direction of the inter-pole magnets 126 and 127, effectively uses the magnetic fluxes of the inter-pole magnets 126 and 127, and increases the motor output.

(20) The gap K is arranged so that the length L in the radial direction satisfies $0<L/G\leq 4.5$, where G represents the air gap between the stator 106 and the rotor 111 facing the rotor cores 121 and 122. Thus, the torque (output) of the motor can be increased as illustrated in FIG. 22.

(21) When the gap K is arranged so that the length L satisfies $1.5\leq L/G$, the reverse magnetic field acts on the back auxiliary magnets and prevents the magnetic flux density from decreasing.

(22) When the gap K is arranged so that the length L satisfies $1.5\leq L/G\leq 3.5$, the torque (output) of the motor can be maintained in a higher range as illustrated in FIG. 22.

The sixth embodiment of the present invention may be modified as described below.

Although not particularly mentioned in the above embodiment, a non-magnetic member may be arranged in the gap K. Also in this arrangement, because the member arranged in the gap K is non-magnetic, the short-circuit fluxes extending inward in the radial direction of the inter-pole magnets 126 and 127 can be reduced, and the magnetic fluxes of the inter-pole magnets 126 and 127 can be effectively used to increase the motor output.

Although one annular field magnet 123 is used as the field magnet in the above embodiment, permanent magnets divided into a plurality of pieces may be arranged around the rotation shaft 112 and between the first and the second core bases 121a and 122a in the axial direction.

Although not particularly mentioned in the above embodiment, the first and the second rotor cores 121 and 122 and the armature core 107 may be formed by stacked magnetic metal plates or by molding magnetic powder, for example.

Although the winding form of the coil to the teeth of the stator 106 is not particularly mentioned in the above embodiment, concentrated winding or distributed winding may be employed.

Seventh Embodiment

A seventh embodiment of the present invention will be described below with reference to FIGS. 24 to 28.

Figure 24:
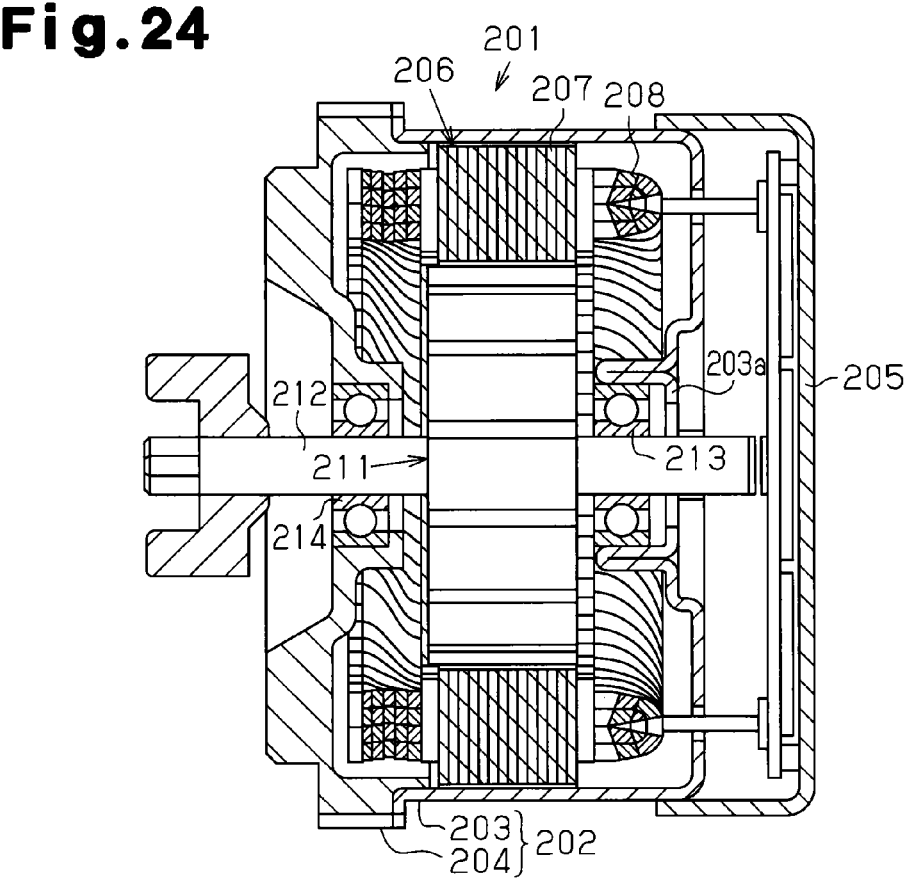
FIG. 24 is a cross-sectional view of a motor according to a seventh embodiment of the present invention.

In the seventh embodiment, a motor 201 illustrated in FIG. 24 has the same structure as the motor 101 of the sixth embodiment except for a rotor 211 and thus will not be described in detail.

Figure 25:
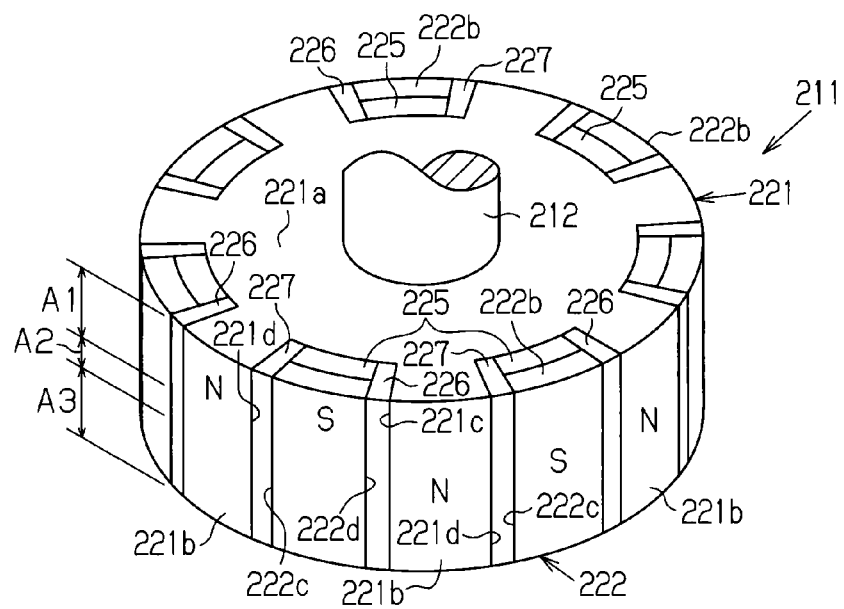
FIG. 25 is a perspective view of the rotor of FIG. 24.
Figure 26:
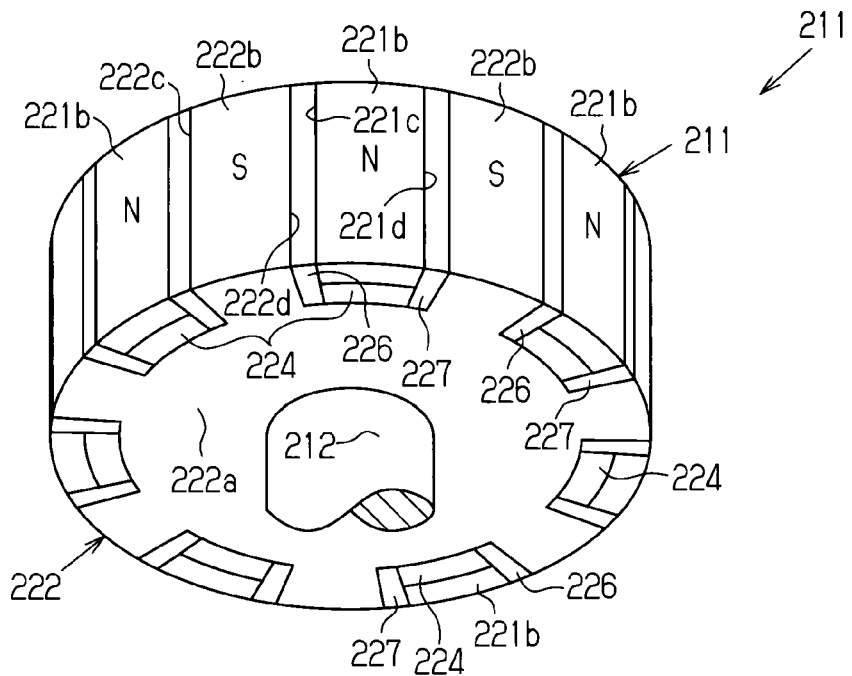
FIG. 26 is a perspective view of the rotor of FIG. 24.
Figure 27:
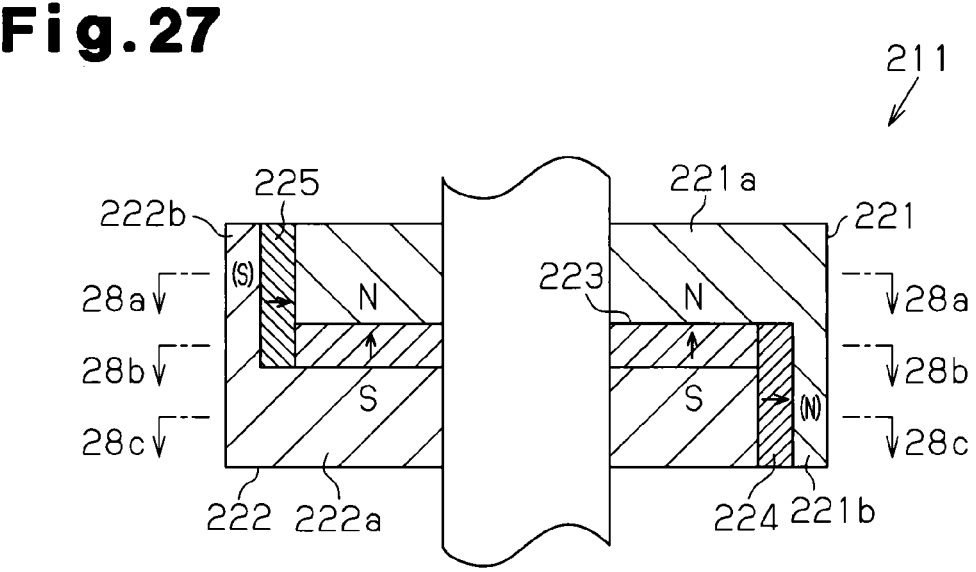
FIG. 27 is a cross-sectional view of the rotor of FIG. 24.

As illustrated in FIGS. 25 to 27, the rotor 211 includes first and second rotor cores 211 and 222, a field magnet 223 (see FIG. 27), first and second back auxiliary magnets 224 and 225 serving as the auxiliary magnet and back magnet, and first and second inter-pole magnets 226 and 227 serving as the auxiliary magnet and inter-pole magnet. The field magnet 223 is annular, for example.

The first rotor core 221 is formed so that, on the outer circumferential portion of a first core base 221a, which serves as a generally disk-shaped core base, first hook-like magnetic poles 221b, which serves as a plurality (seven in the present embodiment) of hook-like magnetic poles, protrude outward in the radial direction at equal intervals and extend in the axial direction. Circumferential end surfaces 221c and 221d of the first hook-like magnetic pole 221b are formed in a planar surface (not inclined to the radial direction when viewed from the axial direction) extended in the radial direction, and the first hook-like magnetic pole 221b has a triangular cross-section orthogonal to the axial direction. The width (angle) in the circumferential direction of each first hook-like magnetic pole 221b, that is, the width (angle) between the circumferential end surfaces 221c and 221d is set to be smaller than the width (angle) between the first hook-like magnetic poles 221b that are adjacent to each other in the circumferential direction.

The second rotor core 222 has the same shape as the first rotor core 221 and is formed so that, on the outer circumferential portion of a second core base 222a, which serves as generally disk-shaped core base, second hook-like magnetic poles 222b, which serves as a plurality (seven in the present embodiment) of hook-like magnetic poles, protrude outward in the radial direction at equal intervals and extend in the axial direction. Circumferential end surfaces 222c and 222d of the second hook-like magnetic pole 222b are formed in a planar surface (not inclined to the radial direction when viewed from the axial direction) extended in the radial direction, and the second hook-like magnetic pole 222b has a triangular cross-section orthogonal to the axial direction. The width (angle) in the circumferential direction of each second hook-like magnetic pole 222b, that is, the width (angle) between the circumferential end surfaces 222c and 222d is set to be smaller than the width (angle) between the second hook-like magnetic poles 222b that are adjacent to each other in the circumferential direction. Further, the second rotor core 222 is fixed to the first rotor core 221 so that each second hook-like magnetic pole 222b is arranged between corresponding first hook-like magnetic poles 221b (that is, in an alternative manner with respect to the first hook-like magnetic poles 221b in the circumferential direction). Further, as shown in FIG. 27, the field magnet 223 is arranged (held) between the opposing first core base 221a and second core base 222a in the axial direction.

The field magnet 223 is set to have the same outer diameter as the first and the second core bases 221a and 222a and is magnetized in the axial direction so as to cause the first hook-like magnetic poles 221b to function as the first magnetic pole (the N pole in the present embodiment) and cause the second hook-like magnetic poles 222b to function as the second magnetic pole (the S pole in the present embodiment).

Figure 28A:
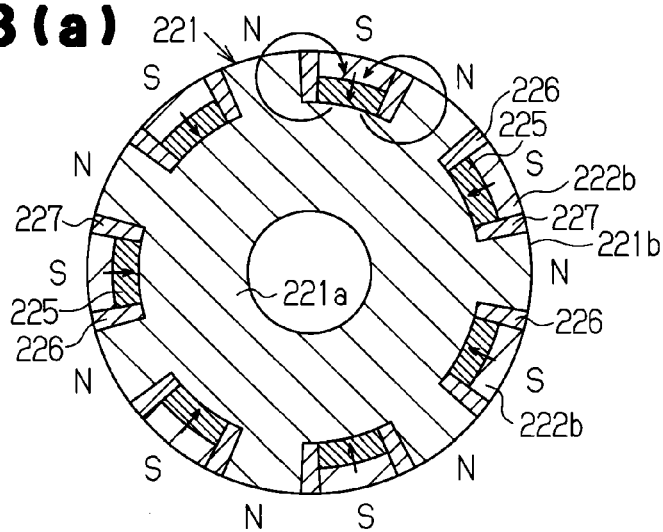
FIG. 28($a$) is a cross-sectional view taken along line 28$a$-28$a$ in FIG. 27, FIG. 28($b$) is a cross-sectional view taken along line 28$b$-28$b$ in FIG. 27, and FIG. 28($c$) is a cross-sectional view taken along line 28$c$-28$c$ in FIG. 27.
Figure 28B:
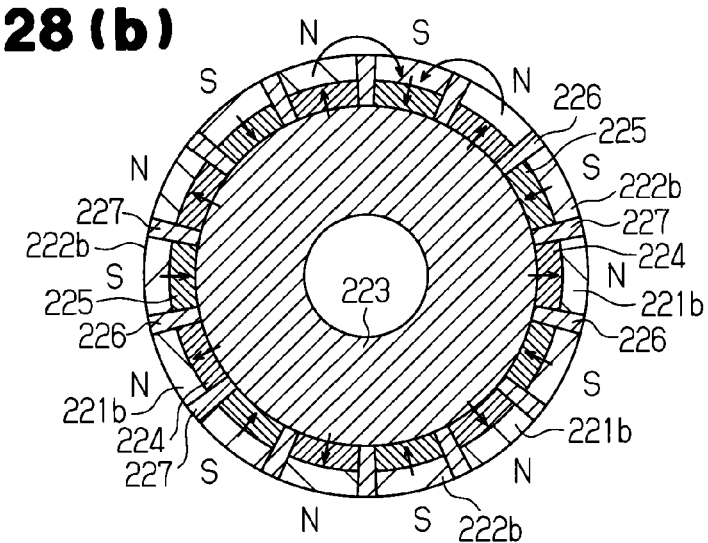
Figure 28C:
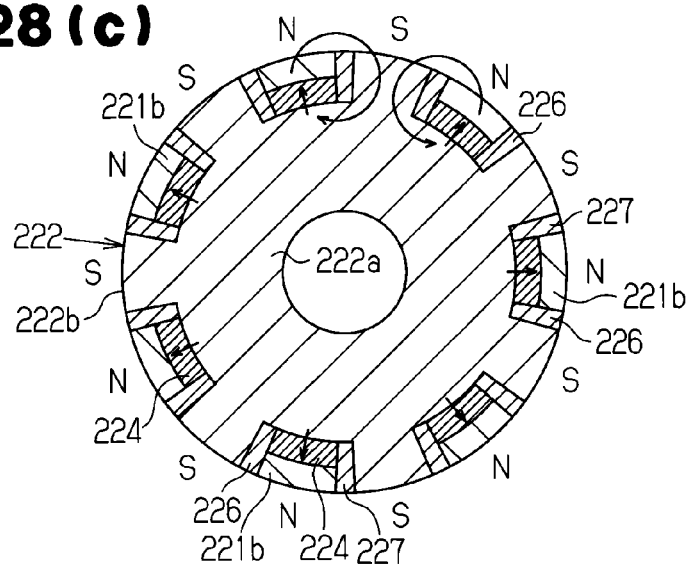

As illustrated in FIGS. 26, 27, and 28(c), the first back auxiliary magnet 224 is arranged between the back surface (the inner surface in the radial direction) of each first hook-like magnetic pole 221b and the outer circumferential surface of the second core base 222a. The first back auxiliary magnet 224 has a triangular cross-section orthogonal to the axial direction and is magnetized in the radial direction so that the side abutting against the back surface of the first hook-like magnetic pole 221b is the N pole that is the same as the first hook-like magnetic pole 221b and that the side abutting against the back surface of the second core base 222a is the S pole that is the same as the second core base 222a.

Also, as illustrated in FIGS. 25, 27, and 28(a), the second back auxiliary magnet 225 is arranged between the back surface (the inner surface in the radial direction) of each second hook-like magnetic pole 222b and the outer circumferential surface of the first core base 221a. The second back auxiliary magnet 225 has a triangular cross-section orthogonal to the axial direction and is magnetized in the radial direction so that the side abutting against the back surface of the second hook-like magnetic pole 222b is the S pole that is the same as the second hook-like magnetic pole 222b and that the side abutting against the back surface of the first core base 221a is the N pole that is the same as the first core base 221a.

As illustrated in FIG. 27, the first back auxiliary magnet 224 and the second back auxiliary magnet 225 are set to be overlapped in the axial direction with each other at a position in the axial direction where the field magnet 223 is arranged, that is, to be arranged at a position in the axial direction where the field magnet 223 is arranged.

In other words, in the range of A1 as shown in FIG. 25, in the rotor structure, the magnetic flux extends from the second back auxiliary magnet 225 along the arrow as shown in FIG. 28(a). In the range of A2 shown in FIG. 25, the structure similar to the typical rotor (in which the permanent magnets of the different poles are arranged alternatively in the circumferential direction) is formed by the first and the second back auxiliary magnets 224 and 225 as shown in FIG. 28(b). In the range of A3 shown in FIG. 25, in the rotor structure, the magnetic flux extends from the first back auxiliary magnet 224 along the arrow as shown in FIG. 28(c).

The first and the second inter-pole magnets 226 and 227 are arranged between the first hook-like magnetic pole 221b and the second hook-like magnetic pole 222b in the circumferential direction. In detail, the first inter-pole magnet 226 of the present embodiment is arranged between a planar surface formed by one circumferential end surface 221c of the first hook-like magnetic pole 221b and the circumferential end surface of the first back auxiliary magnet 224 and another planar surface formed by the other circumferential end surface 222d of the second hook-like magnetic pole 222b and the circumferential end surface of the second back auxiliary magnet 225 so as to fill the entire gap. Also, the second inter-pole magnet 227 of the present embodiment is arranged between a planar surface formed by the other circumferential end surface 221d of the first hook-like magnetic pole 221b and the circumferential end surface of the first back auxiliary magnet 224 and another planar surface formed by one circumferential end surface 222c of the second hook-like magnetic pole 222b and the circumferential end surface of the second back auxiliary magnet 225 so as to fill the entire gap. Further, the first and the second inter-pole magnets 226 and 227 are magnetized in the circumferential direction to be the same polarity as the first and the second hook-like magnetic poles 221b and 222b, respectively (so that the first hook-like magnetic pole 221b side is the N pole and the second hook-like magnetic pole 222b side is the S pole).

Further, at least one of the auxiliary magnets (the first and the second back auxiliary magnets 224 and 225 and the first and the second inter-pole magnets 226 and 227) and the field magnet 223 are formed by magnets having different characteristics.

In detail, the first and the second inter-pole magnets 226 and 227 of the present embodiment are formed by magnets of which coercive force and residual magnetic flux density (magnetomotive force) are greater than the field magnet 223. Specifically, the field magnet 223 is formed by a ferrite magnet. The first and the second inter-pole magnets 226 and 227 are formed by rare earth magnets, in particular, neodymium magnets.

The first and the second back auxiliary magnets 224 and 225 of the present embodiment are formed by ferrite magnets having the same coercive force and residual magnetic flux density as the field magnet 223.

Next, the operation of the motor 201 will be described.

The rotor 211 includes the auxiliary magnets (the first and the second back auxiliary magnets 224 and 225 and first and second inter-pole magnets 226 and 227) so that the leakage magnetic flux is reduced at respective positions. Thus, the magnetic flux of the field magnet 223 can be effectively used for the output of the motor 201. Furthermore, one of the auxiliary magnets and the field magnet 223 arranged between the core bases in the axial direction are formed by magnets having different characteristics. This allows for the enhancement of durability, the reduction of cost, and the increase of output.

Next, the advantages of the seventh embodiment will be described.

(23) The first and the second inter-pole magnets 226 and 227, which are provided outside the rotor 211 and are easily affected by the external magnetic field, are formed by the magnet (neodymium magnet) having the greater coercive force than the field magnet 223 (ferrite magnet) so that the early demagnetization of the first and the second inter-pole magnets 226 and 227 can be suppressed and the durability can be improved. The field magnet 223, which is arranged in the rotor 211 and is not affected by the external magnet field (the magnetic force causing demagnetization is not likely to reach it), is formed by a magnet (ferrite magnet) having a smaller coercive force than the first and the second inter-pole magnets 226 and 227 (neodymium magnet). Thus, the field magnet 223 is inexpensive than when it is formed by a magnet having the same coercive force as the first and the second inter-pole magnets 226 and 227. This allows for reduction in cost while increasing durability.

(24) The first and the second inter-pole magnets 226 and 227, of which magnetic path lengths based on their magnetic force are shorter (than the field magnet 223 and the like), are formed by magnets (neodymium magnets) having a greater residual magnetic flux density than the field magnet 223 (ferrite magnet) so that the magnet having the larger residual magnetic flux density can be effectively used and the output can be effectively increased. That is, if the field magnet 223 having the long magnetic path length based on its own magnetic force were formed by a magnet having greater residual magnetic flux density, the magnetic resistance and the leakage magnetic flux would increase, the magnet having larger residual magnetic flux density could not be effectively used, and the output could not be effectively increased. In contrast, in the present embodiment, the magnet having greater residual magnetic flux density can be effectively used to effectively increase output.

(25) The first and the second back auxiliary magnets 224 and 225 are formed by magnets (ferrite) having smaller coercive force than the first and the second inter-pole magnets 226 and 227 (neodymium magnet) so that the cost is lower compared to, for example, when the first and the second back auxiliary magnets 224 and 225 are formed by magnets (neodymium magnets) having the same coercive force as the first and the second inter-pole magnets 226 and 227.

The seventh embodiment may be modified as described below.

Although the field magnet 223 and the first and the second back auxiliary magnets 224 and 225 are formed by ferrite magnets having the same characteristics and the first and the second inter-pole magnets 226 and 227 are formed by neodymium magnets in the above embodiment, the magnets may be changed (in type or characteristics).

For example, the first and the second inter-pole magnets 226 and 227 of the above embodiment may be formed by a rare earth magnet other than neodymium magnet (for example, samarium cobalt magnets and the like). This also allows for the same advantages as the above embodiment to be obtained.

Further, the first and the second inter-pole magnets 226 and 227 of the above embodiment may be formed by SmFeN magnets, for example. This also allows for the same advantages as the above embodiment to be obtained. Further, the first and the second inter-pole magnets 226 and 227 reduce costs compared to when they are formed by neodymium magnets.

Further, the first and the second inter-pole magnets 226 and 227 of the above embodiment may be formed by sheet-like magnets. A sheet-like magnet refers to the so-called rubber magnet or magnet sheet in the sheet form, which may be stacked to increase thickness between the first hook-like magnetic pole 221*b* and the second hook-like magnetic pole 222*b*, or one sheet may be arranged between the first hook-like magnetic pole 221*b* and the second hook-like magnetic pole 222*b*, in particular, for the smaller motor 201. This allows for easier manufacturing and the reduction in cost compared to when manufacturing the dedicated inter-pole magnets (the first and the second inter-pole magnets 226 and 227) that are baked into a cube, for example.

Further, for example, the first and the second back auxiliary magnets 224 and 225 of the above embodiment may be formed by magnets having greater residual magnetic flux than the field magnet 223. Specifically, the first and the second back auxiliary magnets 224 and 225 may be formed by, for example, a ferrite magnet having a greater residual magnetic flux density (higher grade) than the field magnet 223 or may be formed by a rare earth magnet (such as neodymium magnet, samarium cobalt magnet, or SmFeN magnet). This allows for an increased output compared to when the first and the second back auxiliary magnets 224 and 225 are formed by magnets having the same residual magnetic flux density as the field magnet 223 (the above embodiment).

Further, for example, the first and the second back auxiliary magnets 224 and 225 may be formed by magnets having the same characteristics as the first and the second inter-pole magnets 226 and 227 (such as neodymium magnet, samarium cobalt magnet, or SmFeN magnet).

Further, for example, the first and the second inter-pole magnets 226 and 227 and the field magnet 223 may be formed by magnets having the same characteristics, and the first and the second back auxiliary magnets 224 and 225 may be formed by magnets having different characteristics.

Further, for example, the field magnet 223 of the above each embodiment may be formed by a magnet other than a ferrite magnet. For example, it may be formed by the neodymium magnet having smaller coercive force and residual magnetic flux density (being of lower grade) than the first and the second inter-pole magnets 226 and 227 (neodymium magnet).

Further, regardless of the combination of the above embodiments (the above embodiments and their modified examples), one of the magnets of the field magnet 223, the first and the second auxiliary magnets 224 and 225, and the first and the second inter-pole magnets 226 and 227 may be changed to a magnet having different characteristics in accordance with the purpose (for example, the balance of the desired cost and the output).

In the above embodiment, although the rotor 211 includes the back magnets (the first and the second back auxiliary magnets 224 and 225) and the inter-pole magnets (the first and the second inter-pole magnets 226 and 227) as the auxiliary magnets, there is no such limitation, and the rotor may be modified to include either one of the back magnet and the inter-pole magnet. It is obvious that, in this case, the auxiliary magnet (the back magnet or the inter-pole magnet) and the field magnet 223 are formed by magnets having different characteristics.

Eighth Embodiment

The eighth embodiment of the present invention will be described below with reference to FIGS. 29 to 32.

Figure 29:
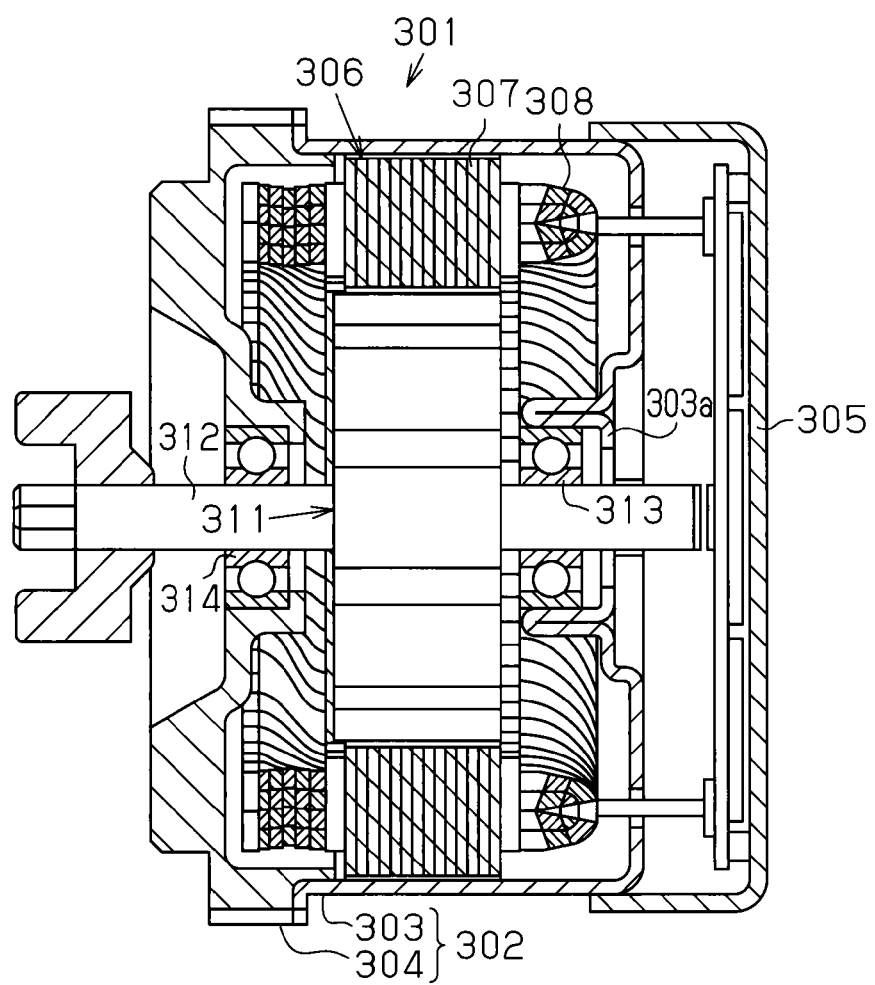
FIG. 29 is a cross-sectional view of a motor according to an eighth embodiment of the present invention.

In the eighth embodiment, a motor 301 illustrated in FIG. 29 has the same structure as the motor 101 of the sixth embodiment except for a rotor 311 and thus the motor will not be described in detail.

Figure 30A:
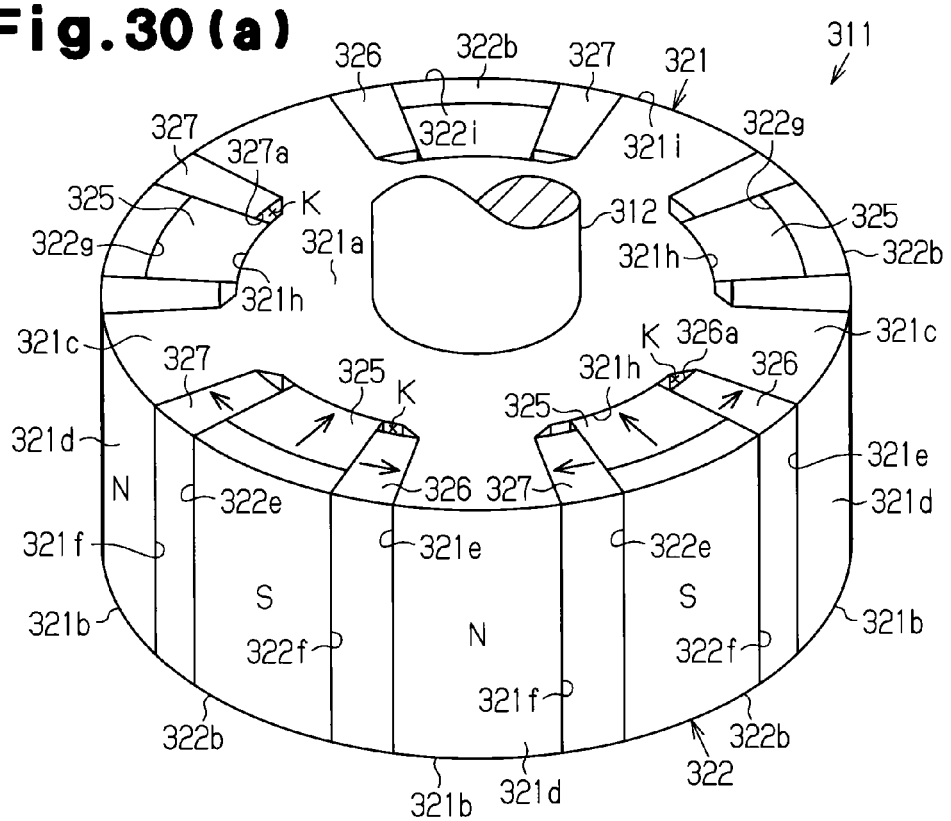
FIGS. 30($a$) and 30($b$) are perspective views of the rotor of FIG. 29.
Figure 30B:
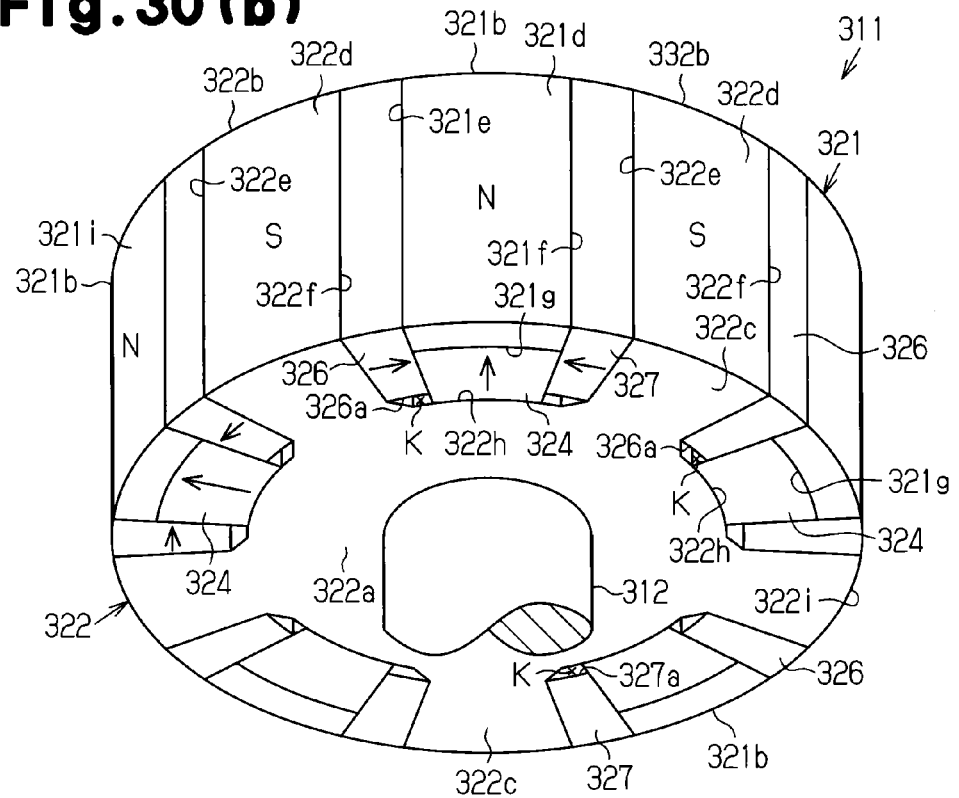
Figure 31:
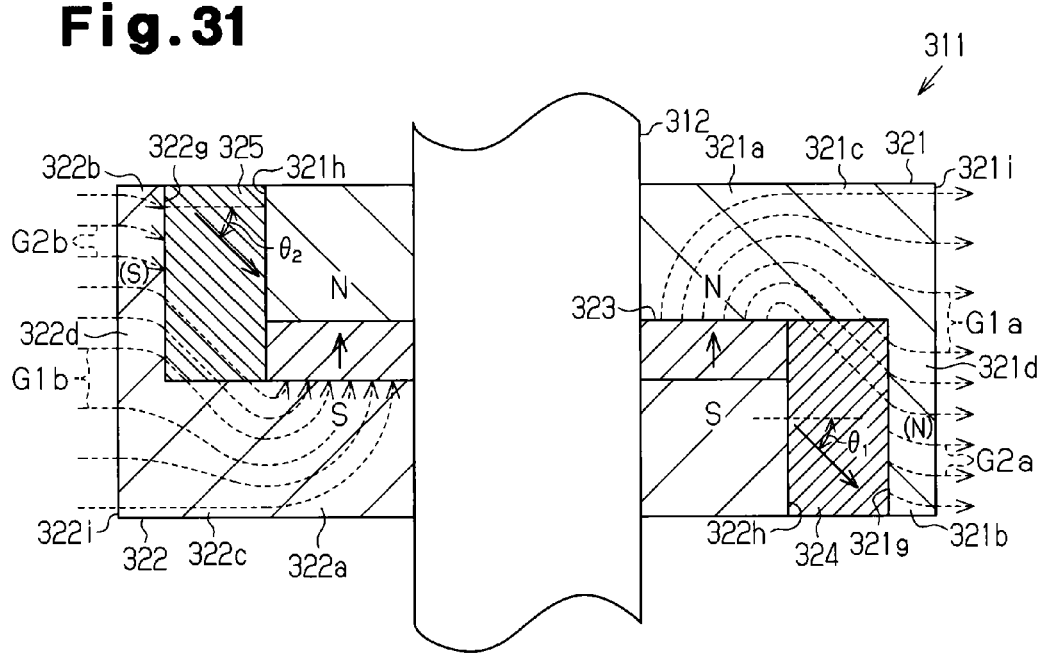
FIG. 31 is a cross-sectional view of the rotor of FIG. 29.

As illustrated in FIGS. 30 and 31, the rotor 311 includes first and second rotor cores 321 and 322, a field magnet 323 (see FIG. 31) serving as a field magnet, first and second back auxiliary magnets 324 and 325, and first and second inter-pole magnets 326 and 327. The field magnet 323 is annular, for example. The arrows of the solid line in FIGS. 30 and 31 indicate the magnetization direction (from the S pole to the N pole) of magnets 323, 324, 325, 326, and 327.

As illustrated in FIG. 30(*a*), in the first rotor core 321, a plurality (five in the present embodiment) of hook-like magnetic poles 321*b* are formed at equal intervals on the outer circumferential portion of a first core base 321*a* of the generally disk-shaped core base. The first hook-like magnetic pole 321*b* has a projection 321*c*, projecting outward in the radial direction from the first core base 321*a*, and a hook 321*d*, extending in the axial direction from the projection 321*c*. Circumferential end surfaces 321*e* and 321*f* of the first hook-like magnetic pole 321*b* are formed in a planar surface (not inclined to the radial direction when viewed from the axial direction) extended in the radial direction, and the projection 321*c* has a triangular cross-section orthogonal to the axial direction. In the end part outward in the radial direction of the projection 321*c*, the hook 321*d* is formed in the axial direction with a constant width in the circumferential direction. The angle in the circumferential direction of each first hook-like magnetic pole 321*b*, that is, the angle between the circumferential end surfaces 321*e* and 321*f* is set to be smaller than the angle between the first hook-like magnetic poles 321*b* that are adjacent to each other in the circumferential direction.

As illustrated in FIG. 30(*b*), the second rotor core 322 has the same shape as the first rotor core 321 and is formed so that a plurality of projections 322*c* of hook-like magnetic poles 322*b* are formed at equal intervals on the outer circumferential portion of a second core base 322*a* of the generally disk-shaped core base. The projection 322*c* has a triangular cross-section orthogonal to the axial direction, and a hook 322*d* is formed in the axial direction at the end part outward in the radial direction. Further, the second rotor core 322 is fixed to the first rotor core 321 so that each hook 322*d* of the second hook-like magnetic pole 322*b* is arranged between corresponding hooks 321*d* of the first hook-like magnetic poles 321*b*, and the field magnet 323 (see FIG. 31) is arranged (held) between the first core base 321*a* and second core base 322*a* in the axial direction.

As illustrated in FIG. 31, the field magnet 323 is set to have the same outer diameter as the first and the second core bases 321*a* and 322*a* and is magnetized in the axial direction so as to cause the first hook-like magnetic poles 321*b* to function as the first magnetic pole (the N pole in the present embodiment) and cause the second hook-like magnetic poles 322*b* to function as the second magnetic pole (the S pole in the present embodiment). Accordingly, the rotor 311 of the present embodiment is the rotor of the so-called Lundell type structure using the field magnet 323. For example, the neodymium magnet may be used for the field magnet 323.

The first back auxiliary magnet 324 is arranged between each back surface 321*g* (the inner surface in the radial direction) of the first hook-like magnetic pole 321*b* and an outer circumferential surface 322*h* of the second core base 322a. The first back auxiliary magnet 324 has a triangular cross-section orthogonal to the axial direction, the side abutting against the back surface 321g of the first hook-like magnetic pole 321b is magnetized to the N pole that is the same as the first hook-like magnetic pole 321b, and the side abutting against the peripheral surface 322h of the second core base 322a is magnetized to the S pole that is the same as the second core base 322a. The first back auxiliary magnet 324 is set so that the angle θ1 to the axial direction side with respect to the radial direction of its magnetization direction is 45° as a whole in an even manner. That is, it is arranged so that part of the magnetic flux flowing through the first hook-like magnetic pole 321b is able to obliquely bypass an interior the first back auxiliary magnet 324. Further, the magnetization direction of the first back auxiliary magnet 324 when viewed from the axial direction is along the radial direction.

Also, the second back auxiliary magnet 325 is arranged between each back surface 322g of the second hook-like magnetic pole 322b in the same manner as the first hook-like magnetic pole 321b. For example, the ferrite magnet may be used for the first back auxiliary magnet 324 and the second back auxiliary magnet 325. The second back auxiliary magnet 325 has a triangular cross-section orthogonal to the axial direction, the side abutting against the back surface 322g is magnetized to the S pole, and the side abutting against a back surface 321h of the first core base 321a is magnetized to the N pole. The magnetization direction of the second back auxiliary magnet 325 is set so that the angle θ2 to the axial direction side with respect to the radial direction is 45° as a whole in an even manner. That is, in the same manner as the above, part of the magnetic flux flowing through the second hook-like magnetic pole 322b is able to obliquely bypass an interior of the second back auxiliary magnet 325. Further, in the same manner as the above, the magnetization direction of the second back auxiliary magnet 325 when viewed from the axial direction is along the radial direction.

In the first back auxiliary magnet 324 and the second back auxiliary magnet 325, the length in the axial direction is set to be overlapped with each other at a position in the axial direction of the rotor 311 where the field magnet 323 is arranged, in other words, to be positioned from both sides of the rotor 311 to the position in the axial direction where the field magnet 323 is arranged. In the part including the first core base 321a in the axial direction of the rotor 311, the second hook-like magnetic pole 322b to which the second back auxiliary magnet 325 is arranged and the first hook-like magnetic pole 321b (projection 321c) are arranged alternatively in the circumferential direction. In the part including the field magnet 323 in the axial direction, the structure similar to the typical rotor (in which the permanent magnets of the different poles are arranged alternatively in the circumferential direction) is formed with the first and the second back auxiliary magnets 324 and 325. In the part including the second core base 322a in the axial direction, the first hook-like magnetic pole 321b to which the first back auxiliary magnet 324 is arranged and the second hook-like magnetic pole 322b (projection 322c) are arranged alternatively in the circumferential direction.

As illustrated in FIGS. 30(a) and 30(b), first and second inter-pole magnets 326 and 327 are arranged between the first hook-like magnetic pole 321b and the second hook-like magnetic pole 322b in the circumferential direction. In detail, the first inter-pole magnet 326 is fitted and fixed between a planar surface formed by one circumferential end surface 321e of the first hook-like magnetic pole 321b and the circumferential end surface of the first back auxiliary magnet 324 and another planar surface formed by the other circumferential end surface 322f of the second hook-like magnetic pole 322b and the circumferential end surface of the second back auxiliary magnet 325. A gap K is formed between an inner end surface 326a in the radial direction of the first inter-pole magnet 326 and outer circumferential surfaces 321h and 322h of the first and the second core bases 321a and 322a.

Also, the second inter-pole magnet 327 has the same shape as the first inter-pole magnet 326 and is fitted and fixed between a planar surface formed by the other circumferential end surface 321f of the first hook-like magnetic pole 321b and the circumferential end surface of the first back auxiliary magnet 324 and another planar surface formed with one circumferential end surface 322e of the second hook-like magnetic pole 322b and the circumferential end surface of the second back auxiliary magnet 325, and a gap K is formed between the inner end surface 327a in the radial direction and the outer circumferential surfaces 321h and 322h of the first and the second core bases 321a and 322a. The first and the second inter-pole magnets 326 and 327 are magnetized in the circumferential direction to face the first and the second hook-like magnetic poles 321b and 322b in the same polarity, respectively (so that the first hook-like magnetic pole 321b side is the N pole and the second hook-like magnetic pole 322b side is the S pole).

In the motor 301, when three-phase driving current is supplied to the segment conductor (SC) coil 308 via the power supply circuit within the circuit accommodation box 305, the magnetic field for rotating the rotor 311 is generated at the stator 306. This rotates and drives the rotor 311.

Next, the generation (operation) of the magnetic flux of the rotor 311 in the present embodiment and a comparative example will be described with reference to FIGS. 31 and 32. The arrows shown by broken lines in the rotors 311 and 331 of FIGS. 31 and 32 indicate the flow of the magnetic flux.

Figure 32:
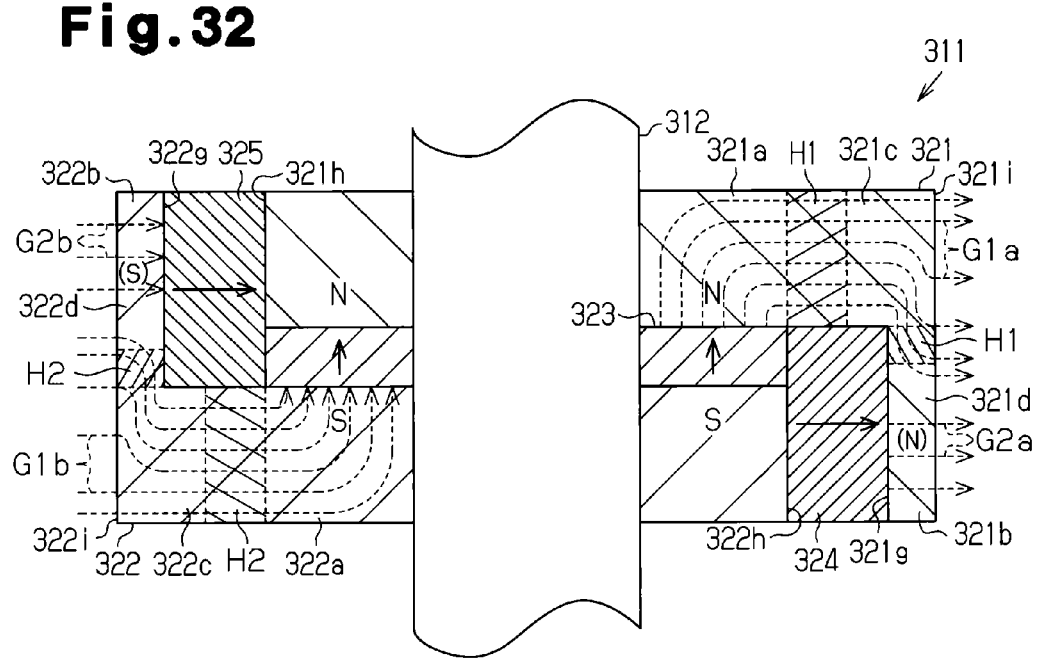
FIG. 32 is a cross-sectional view of a rotor of a comparative example.

FIG. 32 illustrates the rotor 331 as a comparative example in which the magnetization direction of the first and the second back auxiliary magnets 324 and 325 is in the radial direction. For the arrangement of the rotor 331, in the first hook-like magnetic pole 321b side magnetized to the N pole, part of a field magnetic flux G1a generated at the N pole side of the filed magnet 323 occurs from the first core base 321a toward the hook 321d through the projection 321c of the outer side in the radial direction (occurs to bypass the first back auxiliary magnet 324) and occurs from an outer circumferential surface 321i of the hook 321d (the first hook-like magnetic pole 321b) to the opposing stator 306 (see FIG. 29) along with a magnetic flux G2a of the first back auxiliary magnet 324. For the field magnetic flux G1a of such distribution, the cross-section area of the projection 321c is narrower than the first core base 321a, and the cross-section area of the hook 321d extended in the axial direction from the projection 321c is further narrower than the projection 321c (see FIG. 30(a)). Accordingly, due to the shape (cross-section area) of the first hook-like magnetic pole 321b, the magnetic flux density of the field magnetic flux G1a increases at part of the projection 321c and the hook 321d and thus the magnetic saturation (saturation region H1) occurs locally. Further, in the second hook-like magnetic pole 322b side magnetized to the S pole, part of the magnetic flux flowing from an outer circumferential surface 322i of the second hook-like magnetic pole 322b through the second rotor core 322 forms a field magnetic flux G1b occurring at the S pole side of the field magnet 323 and a field magnetic flux G2b occurring at the S pole side of the second back auxiliary magnet 325. In the S pole side, the magnetic saturation (saturation region H2) occurs at the projection 322c and the hook 322d of the second hook-like magnetic pole 322b, in the same manner as the N pole side.

The magnetic saturation reduces the amount of the magnetic flux of the field magnet fluxes G1a and G1b that would contribute to the output of the motor 301. This reduces the output of the motor 301. Further, the field magnet fluxes G1a and G1b are collected to the basal end parts of the hooks 321d and 322d. This results in an imbalance in the magnetic flux density on the outer circumferential surfaces 321i and 322i of the hook-like magnetic poles 321b and 322b and reduces the output of the motor 301.

In contrast, in the rotor 311 of the present embodiment as illustrated in FIG. 31, the magnetization direction of the first back auxiliary magnet 324 is inclined by the angle θ1 (45°) to the radial direction, and part of the field magnetic flux G1a flowing within the first hook-like magnetic pole 321b (projection 321c) is able to obliquely bypass the interior of the first back auxiliary magnet 324.

That is, part of the field magnetic flux G1a that would otherwise be forced to flow in the projection 321c flows widely divided in the axial direction toward the distal end of the hook 321d via the first back auxiliary magnet 324. Accordingly, the occurrence of the magnetic saturation described above can be suppressed and the effective magnetic flux increases, and the magnetic flux density on the outer surface 321i can be averaged. In the S pole side in the same manner as the N pole side, part of the field magnetic flux G1b can be bypassed to the projection 322c of the second hook-like magnetic pole 322b via the second back auxiliary magnet 325, the occurrence of the magnetic saturation can be suppressed to increase the effective magnetic flux, and also the magnetic flux density on the outer surface 322i can be averaged. In such a manner, increased output is achieved in the motor 301 of the present embodiment.

Next, the advantages of the eighth embodiment will be described.

(26) In the cross-section in the axial direction of the rotor 311, the magnetization directions of the first and the second back auxiliary magnets arranged on the back surfaces 321g and 322g of the first and the second hook-like magnetic poles 321b and 322b are inclined by the angles θ1 and θ2 to the radial direction, respectively, and part of each magnetic flux (field magnetic fluxes G1a and G1b) flowing within each of the hook-like magnetic poles 321b and 322b (the projections 321c and 322c) can be obliquely bypassed in the interiors of the first and the second back auxiliary magnets 324 and 325. Thus, part of the field magnetic fluxes G1a and G1b that would otherwise be forced to flow within each of the hook-like magnetic poles 321b and 322b can flow within the back auxiliary magnets 324 and 325 and therefore the flows of the field magnetic fluxes G1a and G1b are widely divided in the axial direction. Thus, the occurrence of the local magnetic saturation due to the shape of the hook-like magnetic poles 321b and 322b can be suppressed and the field magnetic fluxes G1a and G1b can occur widely on the outer circumferential surfaces 321i and 322i of the hook-like magnetic poles 321b and 322b. As a result, the magnetic flux effective for the output of the motor 301 increases. This allows for an increased output of the motor 301.

(27) The first and the second inter-pole magnets 326 and 327 that are magnetized to face to the first and the second hook-like magnetic poles 321b and 322b in the same polarity are arranged between the first hook-like magnetic pole 321b and the second hook-like magnetic pole 322b in the circumferential direction. This allows for the reduction of the leakage magnetic flux between the first hook-like magnetic pole 321b and the second hook-like magnetic pole 322b, which contributes to a higher output of the motor 301.

(28) The first and the second back auxiliary magnets 324 and 325 are arranged so that their magnetization directions incline in an even manner as a whole. This allows for easier magnetization to the back auxiliary magnets 324 and 325.

(29) The first and the second back auxiliary magnets 324 and 325 are arranged so that the magnetization directions when viewed from the axial direction are along the radial direction. This suppresses an imbalanced magnetic flux density in the circumferential direction and suppresses the occurrence of the magnetic saturation.

The eighth embodiment of the present invention may be modified as below.

Although the angles θ1 and θ2 of the magnetization directions of the first and the second back auxiliary magnets 324 and 325 to the radial direction are set to 45° in the above embodiment, there is no such limitation. For example, the angle θ1 may be properly changed within the range of "0°<θ1<90°".

Although the first and the second back auxiliary magnets 324 and 325 are set so that their entire magnetization directions are inclined with respect to the radial direction by the angles θ1 and θ2 in an even manner in the above embodiment, there is no such limitation. For example, without the entire magnetization direction being inclined, the magnetization direction of part of each of the first and the second back auxiliary magnets 324 and 325, for example, the projections 321c and 322c side of the hook-like magnetic poles 321b and 322b may be inclined, while the remaining part may be magnetized along the radial direction. Further, for example, without being inclined in an even manner, the magnetization direction may be changed sequentially according to the axial directional position so that the degree of inclination of the magnetization direction increases as it approaches the projections 321c and 322c of the hook-like magnetic poles 321b and 322b.

Although the angles θ1 and θ2 are the same in the above embodiment, the angles may be set to differ in a predetermined set of the hook-like magnetic poles 321b and 322b or in each of the hook-like magnetic poles 321b and 322b.

The above embodiment may be modified to omit the first and the second inter-pole magnets 326 and 327.

Although not specifically mentioned in the above embodiment, the rotor 311 and stator 306 may be formed by, for example, stacked magnetic metal plates or molded magnetic powder.

Ninth Embodiment

The ninth embodiment of the present invention will be described below with reference to FIGS. 33 to 38.

Figure 33:
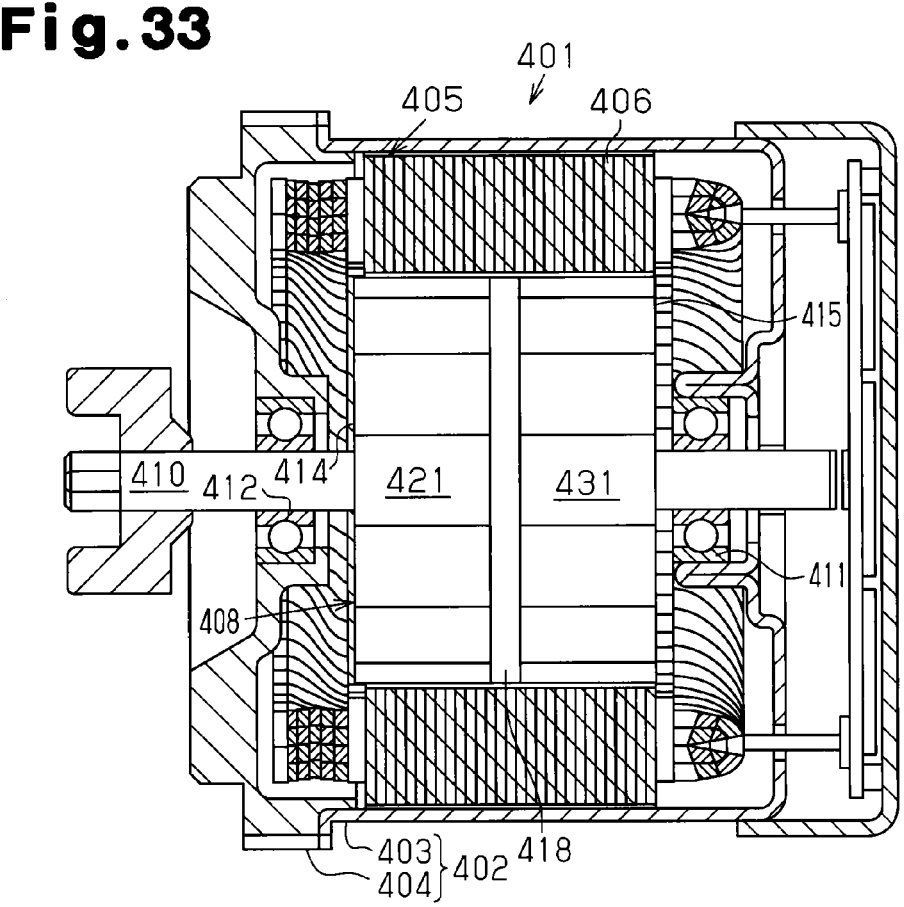
FIG. 33 is a cross-sectional view of a brushless motor according to a ninth embodiment of the present invention.

As illustrated in FIG. 33, a motor case 402 of a brushless motor 401 includes a cylindrical case housing 403 having a closed end and a front bracket 404 closing the open end at the front part of the case housing 403. A stator 405 is fixed to the inner peripheral surface of the case housing 403. A stator core 406 of the stator 405 includes a plurality of stacked stator core pieces (not shown) formed by steel plates.

As illustrated in FIG. 33, a rotor 408 is arranged in the stator 405. A rotation shaft 410 extends through and is fixed to the rotor 408. The rotation shaft 410 is a non-magnetic metal shaft in the present embodiment and is rotatably supported by bearings 411 and 412 arranged at the bottom part of the case housing 403 and the front bracket 404. The rotor 408 fixed to the rotation shaft 410 is of a consequent-pole type structure.

Figure 34:
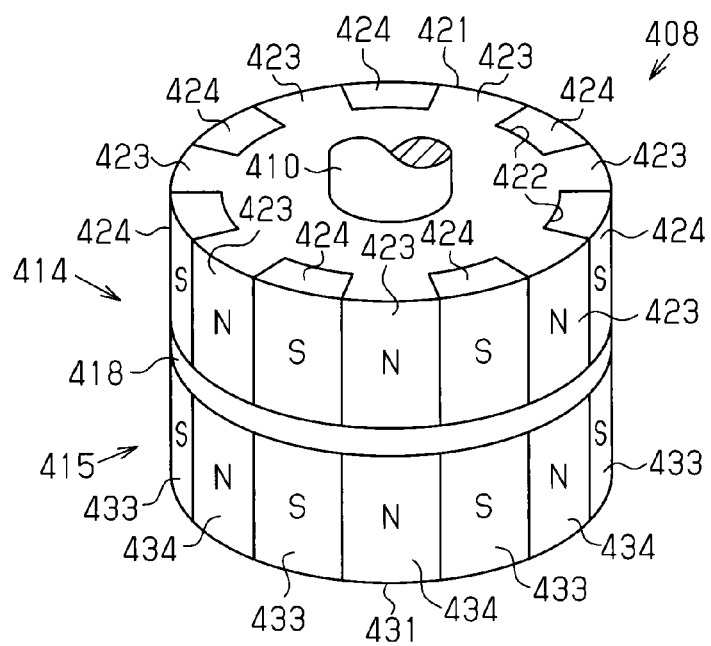
FIG. 34 is a perspective view of the rotor of FIG. 33.

As illustrated in FIG. 34, the rotor 408 includes a first rotor core 414 having a first component 414, a second component 415, a field magnet 416 (see FIGS. 35 and 37) arranged between the first component 414 and the second component 415, a first auxiliary magnet 417 arranged in the field magnet 416 (see FIGS. 35 and 37), and a second auxiliary magnet 418 provided outside the field magnet 416. The field magnet 416 is annular, for example.

Figure 35:
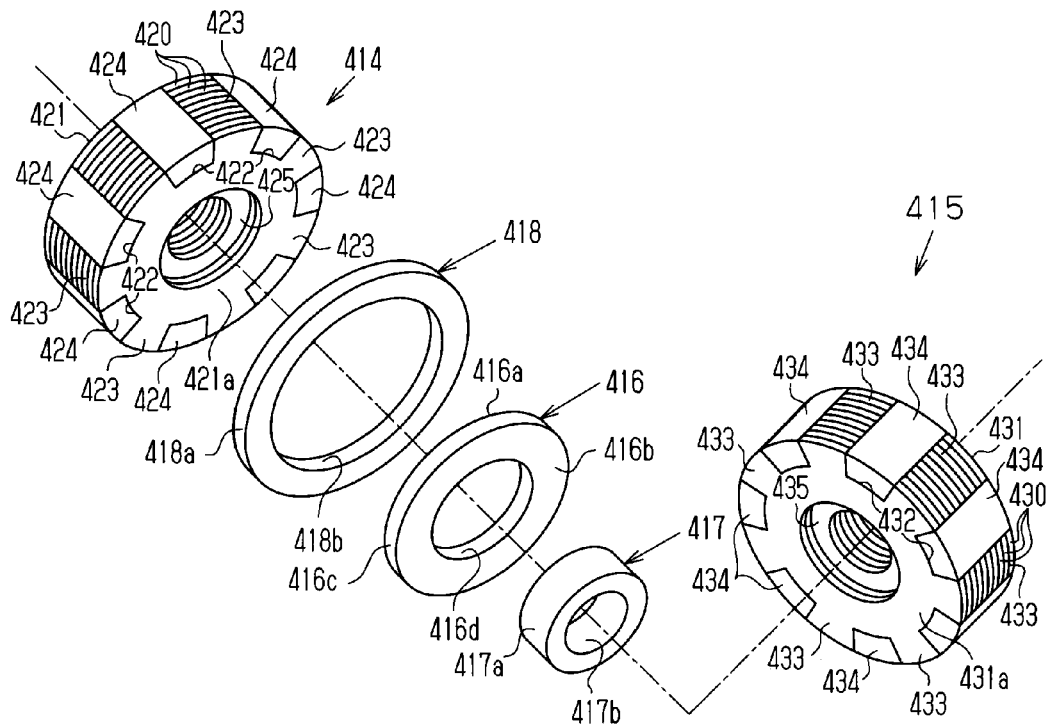
FIG. 35 is an exploded perspective view of the rotor core of FIG. 33.

As illustrated in FIG. 35, the first component 414 has a first rotor core 421 including a plurality of stacked rotor core pieces 420 formed by metal plates (not shown in FIGS. 33, 34, and 36) and fixed to the rotation shaft 410. The first rotor core 421 has a cylindrical shape and a plurality (seven in FIGS. 34 and 35) of triangular recesses 422 at equal angles. Due to the triangular recesses 422, a plurality (seven) of first protruded poles 423 are formed between the adjacent recesses 422.

Figure 36:
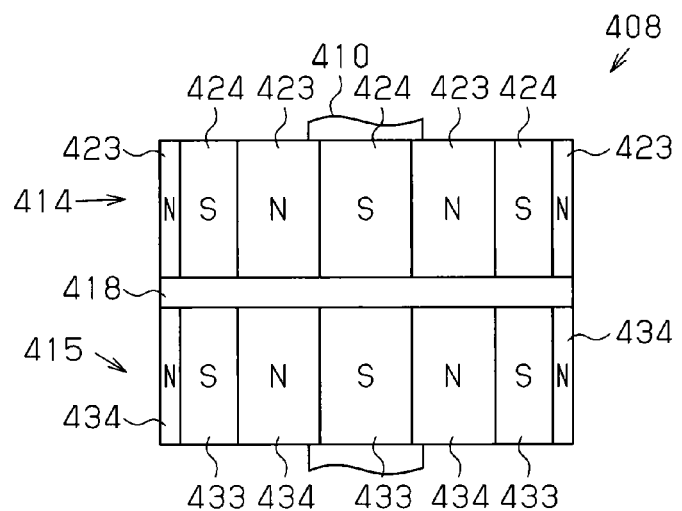
FIG. 36 is a front view of the rotor of FIG. 33.

A triangular first permanent magnet 424 (first magnet) is fitted and fixed to each recess 422 formed on the first rotor core 421. Each first permanent magnet 424 is formed by a ferrite magnet in the present embodiment and arranged so that the outer side in the radial direction of the magnetic pole is the S pole (first magnetic pole) and the inner side is the N pole (second magnetic pole). Accordingly, in the first protruded pole 423 formed between the first permanent magnets 424, the magnetic pole functions as the N pole (second magnetic pole). As a result, in the first component 414, the N pole and the S pole are arranged alternatively in the circumferential direction, as illustrated in FIGS. 34 and 36.

As illustrated in FIG. 35, the second component 415 has a second rotor core 431 including a plurality of stacked rotor core pieces 430 formed by a metal plates (not shown in FIGS. 33, 34, and 36) and fixed to the rotation shaft 410. The second rotor core 431 has a cylindrical shape and a plurality (seven in FIGS. 34 and 35) of triangular recesses 432 in the circumferential direction at equal angles. As a result of the triangular recesses 432, a plurality (seven) of second protruded poles 433 are formed between the adjacent recesses 432.

A triangular second permanent magnet 434 (second magnet) is fitted and fixed to each recess 432 formed on the second rotor core 431. Each second permanent magnet 434 is formed by the ferrite magnet in the present embodiment and arranged so that the outer side in the radial direction of the magnetic pole is the N pole (second magnetic pole) and the inner side is the S pole (first magnetic pole). Accordingly, in the second protruded pole 433 formed between the second permanent magnets 434, the magnetic pole functions as the S pole (first magnetic pole). As a result, in the second component 415, the N pole and the S pole are arranged alternatively in the circumferential direction, as illustrated in FIGS. 34 and 36.

Here, the relative position of the first component 414 and the second component 415 in the circumferential direction with respect to the rotation center of the rotation shaft 410 is arranged so that the magnetic pole of the first component 414 and the magnetic pole of the second component 415 match in the axial direction. That is, the first permanent magnet 424 of the first component 414 and the second protruded pole 433 of the second component 415 match in the axial direction, and the first protruded pole 423 of the first component 414 and the second permanent magnet 434 of the second component 415 match in the axial direction.

Figure 37:
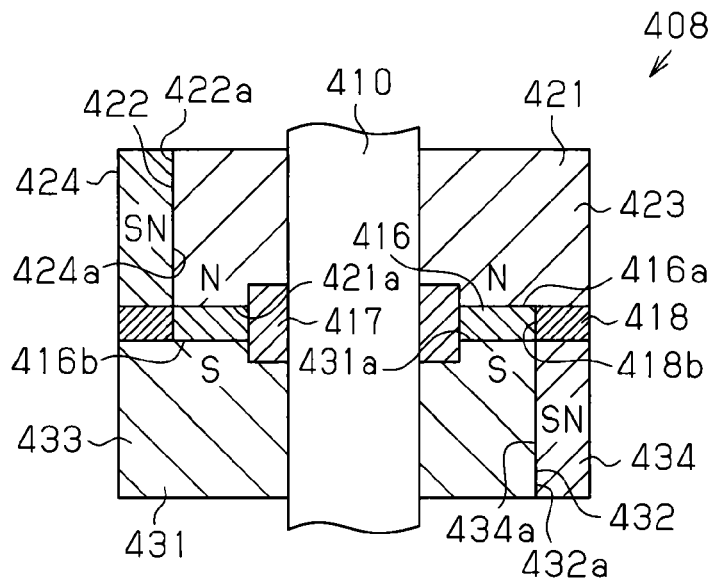
FIG. 37 is a cross-sectional view of the rotor core of FIG. 33.

As illustrated in FIGS. 35 and 37, the field magnet 416 is held between the first component 414 (the first rotor core 421) and the second component 415 (the second rotor core 431). In the field magnet 416, surfaces 416a and 416b of both sides in the axial direction abut in an annual manner against the center parts of the opposing surfaces 421a and 431a of the first and the second rotor cores 421 and 431. The outer circumferential surface 416c of the field magnet 416 is formed to correspond to bottom surfaces 422a and 432a of the recesses 422 and 432 of the first and the second rotor cores 421 and 431 and to be arc-shaped forming the same curved surface.

That is, between the first rotor core 421 and the second rotor core 431, the field magnet 416 is arranged inside the first permanent magnet 424 arranged on the first rotor core 421 and the second permanent magnet 434 arranged on the second rotor core 431 and closely arranged so that the surfaces 416a and 416b of both sides in the axial direction are orthogonal to inner side surfaces 424a and 434a of the first and the second magnets 424 and 434.

The field magnet 416 is magnetized in the axial direction so that the first component 414 (the first rotor core 421) side is the N pole and the second component 415 (the second rotor core 431) side is the S pole. Further, the field magnet 416 is formed by the rare earth magnet in the present embodiment to have higher residual magnetic flux density and smaller coercive force than the first and the second permanent magnets 424 and 434 formed by the ferrite magnets.

As illustrated in FIGS. 35 and 37, a cylindrical first auxiliary magnet 417 is arranged in the field magnet 416. In the first auxiliary magnet 417, an outer circumferential surface 417a is abut against an inner peripheral surface 416d of the field magnet 416, and an inner peripheral surface 417b is fixed to the rotation shaft 410. The first auxiliary magnet 417 is longer than the field magnet 416 in the axial direction and fitted and fixed to annular grooves 425 and 435 formed in the axis side of the opposing surfaces 421a and 431a of the first and the second cores 421 and 431. The first auxiliary magnet 417 is magnetized in the axial direction so that the first component 414 (the first rotor core 421) side is the N pole and the second component 415 (the second rotor core 431) side is the S pole. Further, the first auxiliary magnet 417 is formed by a ferrite magnet in the present invention to have lower residual magnetic flux density than the field magnet 416 formed by the rare earth magnet.

Figure 38:
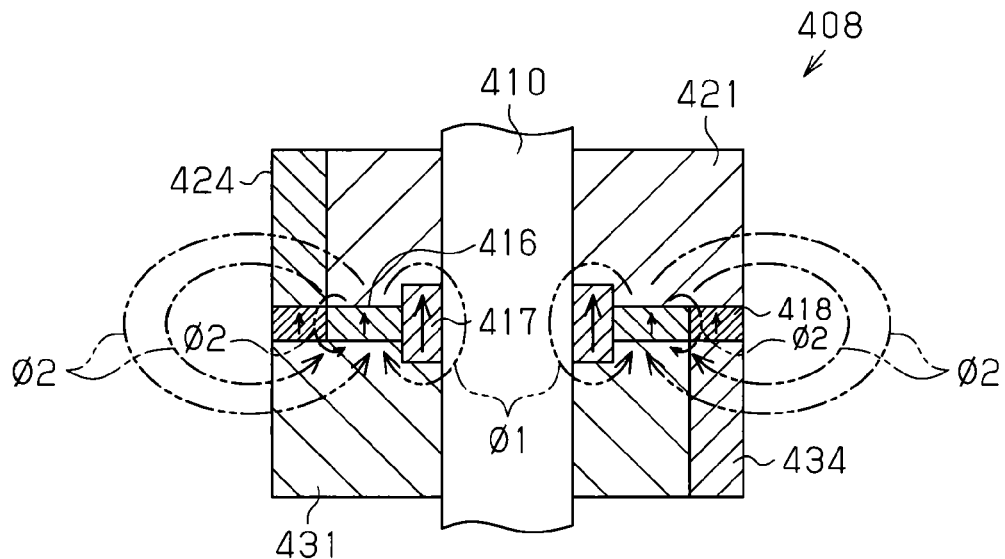
FIG. 38 is a cross-sectional view illustrating a short-circuit flux in the motor of FIG. 33.

Thus, as illustrated in FIG. 38, the short-circuit flux φ1 inward in the radial direction from the field magnet 416 is reduced by the first auxiliary magnet 417 so that the magnetic flux of the field magnet 416 can be effectively used to enhance the output.

Furthermore, the length in the axial direction of the first auxiliary magnet 417 inward in the radial side is longer than that of the field magnet 416 and the first auxiliary magnet 417 is arranged in the first and the second rotor cores 421 and 431 so that the short-circuit flux φ1 inward in the radial direction can be further reduced and thus the magnetic flux of the field magnet 416 can be effectively used for the output.

A ring-shaped second auxiliary magnet 418, which is formed to have the same length as the field magnet 416 in the axial direction, is arranged outside the field magnet 416. In the second auxiliary magnet 418, the outer circumferential surface 418a is formed to be flush with the outer circumferential surfaces of the first component 414 and the second component 415, and an inner peripheral surface 418b is abut against and fixed to an outer circumferential surface 416c of the field magnet 416. The length in the radial direction of the second auxiliary magnet 418 is the same as the length in the radial direction of the first and the second permanent magnets 424 and 434 fitted to the recesses 422 and 432 of the first and the second rotor cores 421 and 431. The second auxiliary magnet 418 is magnetized in the axial direction so that the first component 414 (the first rotor core 421) side is the N pole and the second component 415 (the second rotor core 431) side is the S pole. Further, the second auxiliary magnet 418 is formed by a ferrite magnet in the present invention to have lower residual magnetic flux density than the field magnet 416 formed by the rare earth magnet.

Thus, as illustrated in FIG. 38, the short-circuit flux $\phi2$ outward in the radial direction of the field magnet 416 is reduced by the second auxiliary magnet 418 so that the magnetic flux of the field magnet 416 can be effectively used to enhance the output.

Next, the advantages of the ninth embodiment will be described.

(30) In the above embodiment, a plurality of first permanent magnets 424 are arranged so that the S pole faces to the stator 405 side, and the first rotor core 421 in which the first protruded pole 423 functions as the N pole at the first permanent magnets 424 is arranged between the first permanent magnets 424. Further, in parallel in the axial direction to the first protruded pole 423 of the same polarity of the first rotor core 421, a plurality of second permanent magnets 434 are arranged so that the N pole faces to the stator 405 side, and the second rotor core 431 in which the second protruded pole 433 functions as the S pole at the second permanent magnets 434 is arranged between the second permanent magnets 424.

Further, between the first rotor core 421 and the second rotor core 431, the field magnet 416 is arranged inside the first permanent magnet 424 provided to the first rotor core 421 and the second permanent magnet 434 provided to the second rotor core 431 and closely arranged so that the both sides in the axial direction are orthogonal to the inner side surfaces of the first and the second magnets. Further, the field magnet 416 is magnetized in the axial direction to be the same polarity as the N magnetic pole of the first permanent magnet 424 and the S magnetic pole of the second permanent magnet 434.

Accordingly, the short-circuit fluxes $\phi1$ and $\phi2$ inward and outward in the radial direction of the field magnet 416 are reduced, and the magnetomotive forces of the first and the second protruded poles can be increased. As a result, the magnetic flux of the field magnet 416 can be effectively used to provide a motor with higher output and smaller torque ripple.

Furthermore, the field magnet 416 is simply arranged between the first rotor core 421 and the second rotor core 431. Thus, the rotor can be used for any motor that is compact and has a high output.

(31) In the above embodiment, inside the field magnet 416, provided is the first auxiliary magnet 417 in which the first rotor core 421 side is magnetized to the N pole and the second rotor core 431 side is magnetized to the S pole. Accordingly, the short-circuit flux $\phi1$ passing through the first rotor core 421 inward in the radial direction from the field magnet 416, the rotation shaft 410, and the second rotor core 431 is reduced by the first auxiliary magnet 417, so that the magnetomotive forces of the first and the second protruded poles can be increased. As a result, the magnetic flux of the field magnet 416 can be effectively used to provide a motor with higher output and smaller torque ripple.

Further, the length in the axial direction of the first auxiliary magnet 417 is longer than that of the field magnet 416, and the first auxiliary magnet 417 extends into the first and the second rotor cores 421 and 431. Accordingly, the short-circuit flux $\phi1$ inward in the radial direction can be further reduced and thus the magnetic flux of the field magnet 416 can be effectively used to provide a motor with higher output and smaller torque ripple.

Further, since the rotation shaft 410 includes the non-magnetic metal shaft, the short-circuit flux $\phi1$ inward in the radial side can be further reduced.

(32) In the above embodiment, the second auxiliary magnet 418 in which the first rotor core 421 side is magnetized to the N pole and the second rotor core 431 side is magnetized to the S pole is arranged outside the field magnet 416. Accordingly, the short-circuit flux $\phi2$ (the short-circuit flux in the axial direction that does not generate torque) extending through the first rotor core 421 outward in the radial direction of the field magnet 416, the first permanent magnet 424 (a space or the second permanent magnet), and the second rotor core 431 is reduced by the second auxiliary magnet 418 so that the magnetomotive force of the first and the second protruded poles can be increased respectively. As a result, the magnetic flux of the field magnet 416 can be effectively used to provide a motor with higher output and smaller torque ripple.

(33) In the above embodiment, the rotor 408 (the first and the second rotor cores 421 and 431) has fourteen magnetic poles. That is, the number of poles pairs in the rotor core 408 is an odd number.

Accordingly, the magnetic flux of the field magnet 416 flows to the first protruded pole 423 facing the adjacent first permanent magnet 424 at 180°. Thus, the leakage magnetic flux can be further reduced.

(34) In the above embodiment, the first and the second permanent magnets 424 and 434 are formed by ferrite magnets to employ magnets having lower residual magnetic flux density than the field magnet 416. That is, the field magnet 416 is provided to have higher residual magnetic flux density than the first and the second permanent magnets 424 and 434.

Accordingly, the first and the second permanent magnets 424 and 434 of higher residual magnetic flux density allows for greater magnetomotive force of the first and the second protruded poles functioning as the N pole and the S pole. As a result, the magnetic flux of the field magnet 416 can be effectively used to provide a motor with higher output and smaller torque ripple.

(35) In the above embodiment, the coercive force of the field magnet 416 is smaller than that of the first and second permanent magnets 424 and 434.

That is, the first and the second permanent magnets 424 and 434 are required to have higher coercive force so as not to reduce the magnetic flux of the stator 405. The field magnet 416 is distant from the stator 405 and accommodated within the first and the second rotor cores 421 and 431 and thus not affected by the magnetic flux of the stator 405.

Accordingly, the field magnet 416 can have smaller coercive force than the first and the second permanent magnets 424 and 434. This allows for the use of inexpensive magnets.

(36) In the above embodiment, the first and the second auxiliary magnets 417 and 418 are formed by ferrite magnets, and the used magnet is formed by material having a lower residual magnetic flux density than the field magnet 416 formed by rare earth magnet.

That is, when the first and the second auxiliary magnets 417 and 418 have higher residual magnetic flux density than the field magnet 416, leakage magnetic flux would occur inward in the radial side from the first and the second auxiliary magnets 417 and 418 and result in an adverse effect. Accordingly, for the first and the second auxiliary magnets 417 and 418, the use of a magnet of an inexpensive material with a lower residual magnetic flux density allows for the suppression of the leakage magnetic flux.

Tenth Embodiment

Next, a tenth embodiment of the present invention will be described with reference to FIGS. 39 to 41.

The present embodiment differs from the ninth embodiment in the rotor 408. Thus, for convenience of description, the part of the rotor, which is different, will be described in detail, and the other parts common to the ninth embodiment are denoted by the same numeral references and the detailed descriptions thereof will be omitted.

Figure 39:
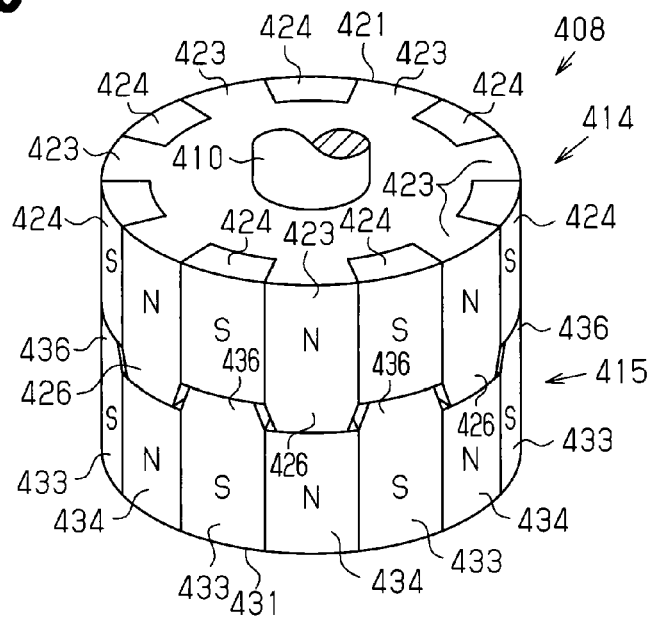
FIG. 39 is a perspective view of a rotor according to a tenth embodiment of the present invention.
Figure 40:
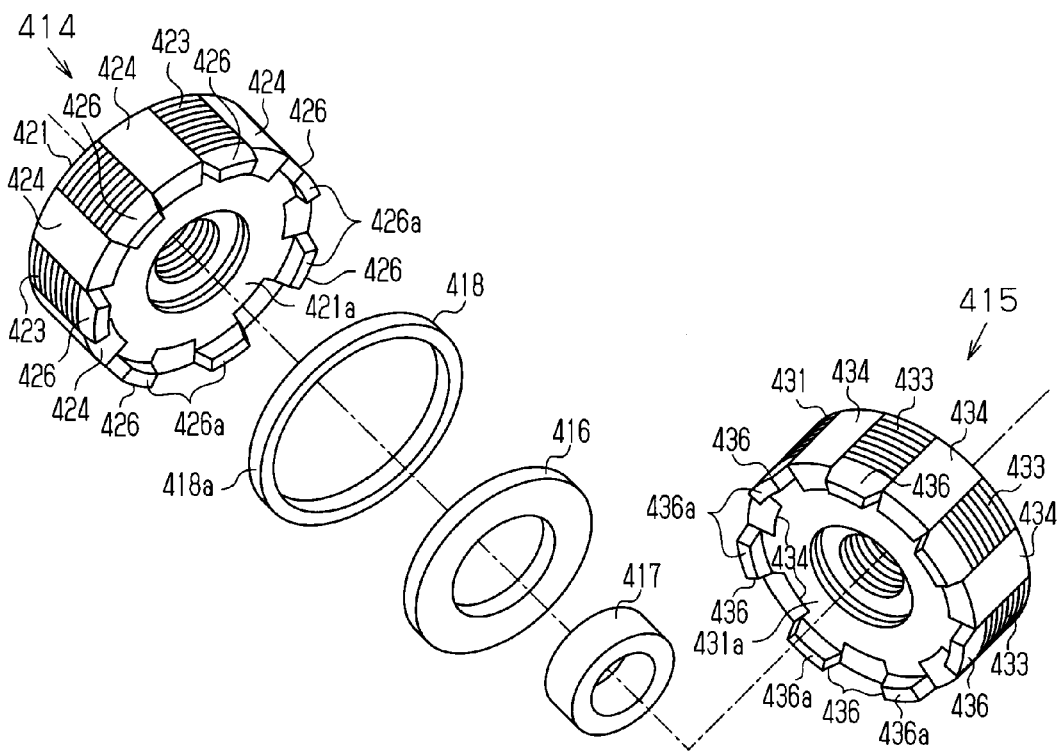
FIG. 40 is an exploded perspective view of the rotor core of FIG. 39.

As illustrated in FIGS. 39 and 40, as the first component 414, a first protrusion 426 protrudes toward the second rotor core 431 from an end opposing surface 421a of each first protruded pole 423 of the first rotor core 421. When viewed from the axial direction, each first protrusion 426 is protruded overlapping in the radial direction to the outer half of the opposing second permanent magnet 434 provided to the second rotor core 431.

Further, each first protrusion 426 has a tapered shape and, as illustrated in FIG. 39, obliquely protruded from both end parts toward the center side in the circumferential direction. Accordingly, each first protrusion 426 has a trapezoidal ridge-like shape, and its top side, that is, surface 426a is abut against the opposing second permanent magnet 434 of the same polarity provided to the second rotor core 431 and is spaced apart from the second protruded pole 433 of the different polarity of the second rotor core 431 adjacent to the second permanent magnet 434 of the same polarity.

For the second component 415, a second protrusion 436 is formed protruded to the first rotor core 421 side on an end opposing surface 431a of each second protruded pole 433 of the second rotor core 431. When viewed from the axial direction, each second protrusion 436 is protruded overlapping in the radial direction to the outer half of the opposing first permanent magnet 424 provided to the first rotor core 421.

Further, each second protrusion 436 has a tapered shape and, as illustrated in FIG. 39, obliquely protruded from both end parts toward the center side in the circumferential direction. Accordingly, each second protrusion 436 has a trapezoidal ridge-like shape, and its top side, that is, surface 436a is abut against the opposing first permanent magnet 424 of the same polarity provided to the first rotor core 421 and is spaced apart from the first protruded pole 423 of the different polarity of the first rotor core 421 adjacent to the first permanent magnet 424 of the same polarity.

Figure 41:
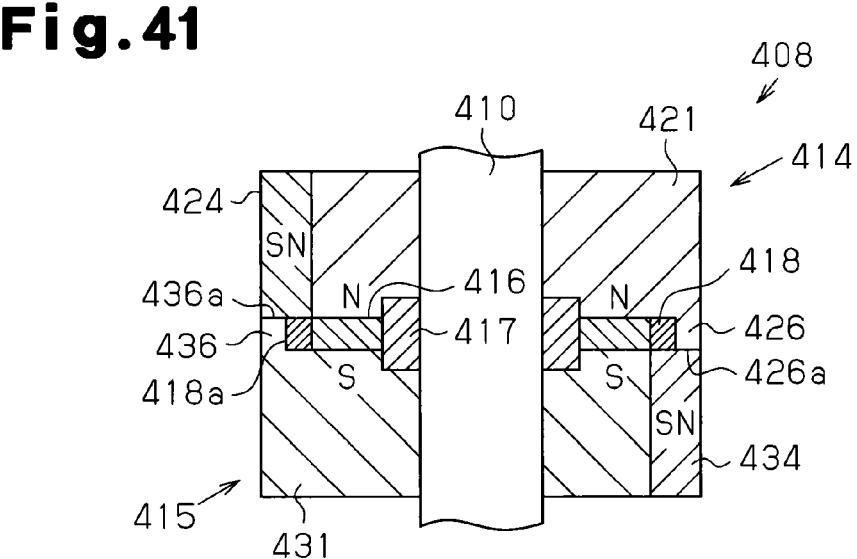
FIG. 41 is a cross-sectional view of the rotor core of FIG. 39.

As illustrated in FIG. 41, the second auxiliary magnet 418 is arranged between the field magnet 416 and the first and the second protrusions 426 and 436 provided alternatively in an annular manner. The outer diameter of the second auxiliary magnet 418 of the present embodiment is shorter than that of the second auxiliary magnet 418 of the ninth embodiment by the size for providing the first and the second protrusions 426 and 436. Thus, the outer circumferential surface 418a of the second auxiliary magnet 418 is inside the first and the second protrusions 426 and 436 and abut against the inner peripheral surfaces of the first and the second protrusions 426 and 436.

Next, the advantages of the tenth embodiment will be described below.

(37) In the above embodiment, at the distal end of each first protruded pole 423 of the first rotor core 421, the first protrusion 426 protrudes and abuts against the opposing second permanent magnet 434 of the second rotor core 431 of the same polarity.

Accordingly, there is no dead space between the distal end of each first protruded pole 423 of the first rotor core 421 and the opposing second permanent magnet 434 of the same polarity provided to the second rotor core 431 so that the outer circumferential surface of each first protrusion 426 can be effectively used as the torque generation surface. Further, the first protrusion 426 abuts against the second permanent magnet 434 of the same polarity. This allows for easier positioning of the second permanent magnet 434 in the axial direction.

Furthermore, each first protrusion 426 has the tapered shape and is spaced apart from the second protruded pole 433 of the different polarity of the second rotor core 431 adjacent to the second permanent magnet 434 of the same polarity to be abutted against. Thus, there is no short-circuiting of the magnetic flux between the first protrusion 426 and the second protruded pole 433 of the different pole.

(38) In the above embodiment, at the distal end of each second protruded pole 433 of the second rotor core 431, the second protrusion 436 protrudes and abuts against the opposing first permanent magnet 424 of the first rotor core 421 of the same polarity.

Accordingly, there is no dead space between the distal end of each second protruded pole 433 of the second rotor core 431 and the opposing first permanent magnet 424 of the same polarity provided to the first rotor core 421 so that the outer circumferential surface of each second protrusion 436 can be effectively used as the torque generation surface. Further, the second protrusion 436 is abut against the first permanent magnet 424 of the same polarity, which allows for easier positioning of the first permanent magnet 424 in the axial direction.

Furthermore, each second protrusion 436 has the tapered shape and is spaced apart from the first protruded pole 423 of the different polarity of the first rotor core 421 adjacent to the first permanent magnet 424 of the same polarity to be abutted against. Thus, there is no short-circuiting of the magnetic flux between the second protrusion 436 and the first protruded pole 423 of the different pole.

(39) Further, the tenth embodiment has advantages (30) to (36) of the ninth embodiment.

Eleventh Embodiment

Next, an eleventh embodiment of the present invention will be described with reference to FIGS. 42 to 44.

The present embodiment differs from the ninth embodiment in the rotor 408. Thus, for convenience of description, the part of the rotor, which is different, will be described in detail, and the other parts common to the ninth embodiment are denoted by the same numeral references and the detailed descriptions thereof will be omitted.

Figure 42:
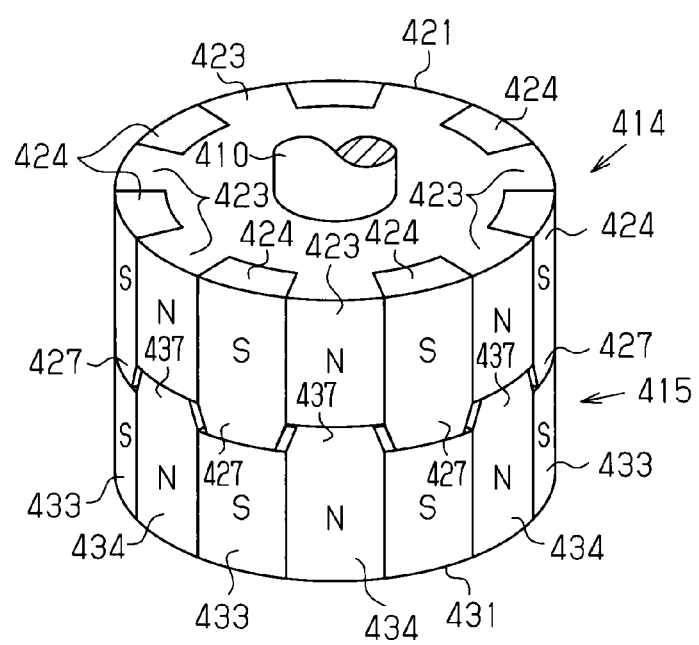
FIG. 42 is a perspective view of a rotor according to an eleventh embodiment of the present invention.
Figure 43:
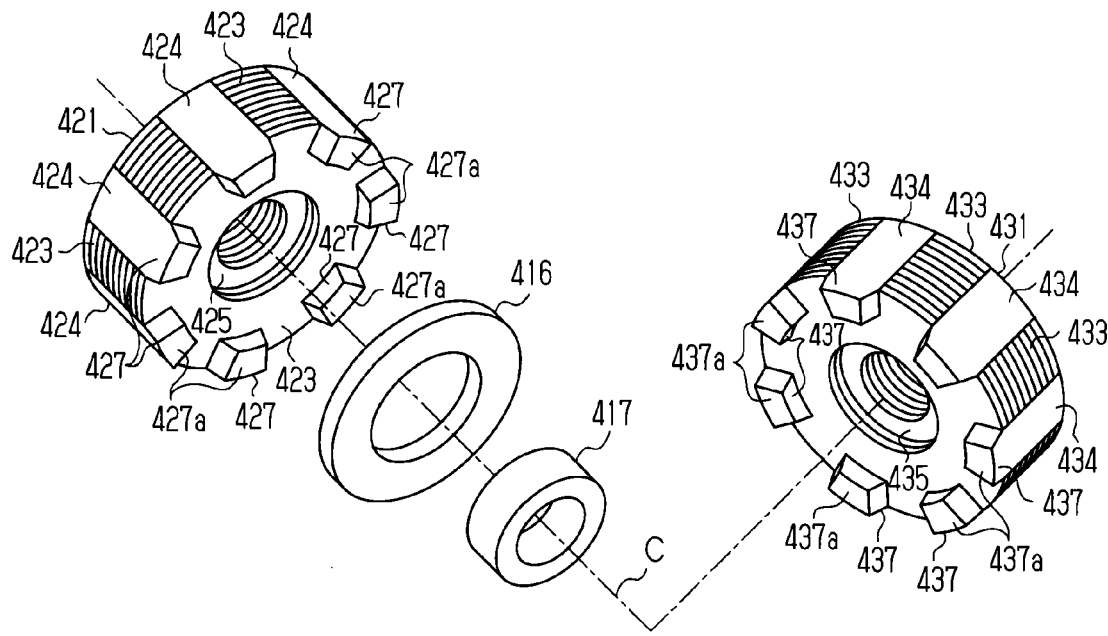
FIG. 43 is an exploded perspective view of the rotor core of FIG. 42.
Figure 44:
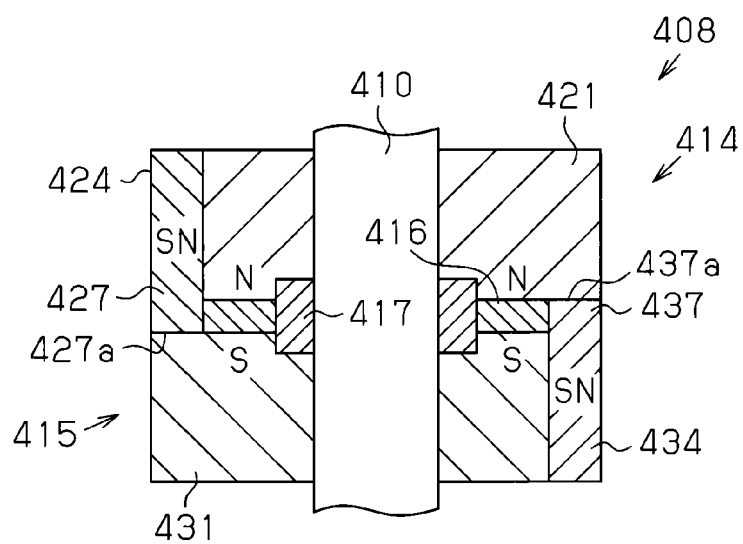
FIG. 44 is a cross-sectional view of the rotor core of FIG. 42.

As illustrated in FIGS. 42 and 43, as the first component 414, a first magnet protrusion 427 protrudes toward the second rotor core 431 on the second rotor core 431 side of each first permanent magnet 424 of the first rotor core 421. As illustrated in FIG. 44, each first magnet protrusion 427 protrudes and abuts against the opposing second protruded pole 433 of the same polarity formed on the second rotor core 431.

Further, each first magnet protrusion 427 has a tapered shape and, as illustrated in FIG. 42, is obliquely protruded from both end parts toward the center side in the circumferential direction. Accordingly, each first magnet protrusion 427 has a trapezoidal ridge-like shape, and its top side, that is, a surface 427a is abut against the opposing second protruded pole 433 of the same polarity provided to the second rotor core 431 and is spaced apart from the second permanent magnet 434 of the different polarity of the second rotor core 431 adjacent to the second protruded pole 433 of the same polarity.

As the second component 415, a second magnet protrusion 437 protrudes toward the first rotor core 421 side on the first rotor core 421 side of each second permanent magnet 434 of the second rotor core 431. As illustrated in FIG. 44, each second magnet protrusion 437 protrudes and abuts against the opposing first protruded pole 423 of the same polarity formed on the first rotor core 421.

Further, each second magnet protrusion 437 has a tapered shape and, as illustrated in FIG. 42, obliquely protrudes from both end parts toward the center side in the circumferential direction. Accordingly, each second magnet protrusion 437 has a trapezoidal ridge-like shape, and its top side, that is, surface 437a is abut against the opposing first protruded pole 423 of the same polarity provided to the first rotor core 421 and is spaced apart from the first permanent magnet 424 of the different polarity of the first rotor core 421 adjacent to the first protruded pole 423 of the same polarity.

Next, the advantages of the eleventh embodiment will be described below.

(40) In the above embodiment, at the distal end of each first permanent magnet 424 of the first rotor core 421, the first magnet protrusion 427 is protrudes and abuts against the opposing second protruded pole 433 of the same polarity in the second rotor core 431.

Accordingly, there is no dead space between the distal end of each first permanent magnet 424 of the first rotor core 421 and the opposing second protruded pole 433 of the same polarity provided to the second rotor core 431 so that the outer circumferential surface of each first magnet protrusion 427 can be effectively used as the torque generation surface. Further, the first magnet protrusion 427 abuts against the second protruded pole 433 of the same polarity. This allows for easier positioning of the first permanent magnet 424 in the axial direction.

Furthermore, each first magnet protrusion 427 has the tapered shape and is spaced apart from the second permanent magnet 434 of the different polarity in the second rotor core 431 adjacent to the second protruded pole 433 of the same polarity to be abutted against. Thus, there is no short-circuiting of the magnetic flux between the first magnet protrusion 427 and the second permanent magnet 434 of the different pole.

(41) In the above embodiment, at the distal end of each second permanent magnet 434 of the second rotor core 431, the second magnet protrusion 437 protrudes and abuts against the opposing first protruded pole 423 of the same polarity in the first rotor core 421.

Accordingly, there is no dead space between the distal end of each second permanent magnet 434 of the second rotor core 431 and the opposing first protruded pole 423 of the same polarity provided to the first rotor core 421 so that the outer circumferential surface of each second magnet protrusion 437 can be effectively used as the torque generation surface. Further, the second magnet protrusion 437 is abut against the first protruded pole 423 of the same polarity, which allows for easier positioning of the second permanent magnet 434 in the axial direction.

Furthermore, each second magnet protrusion 437 has a tapered shape and is spaced apart from the first permanent magnet 424 of the different polarity in the first rotor core 421 adjacent to the first protruded pole 423 of the same polarity that it is abut against. Thus, there is no short-circuiting of the magnetic flux between the second magnet protrusion 437 and the first permanent magnet 424 of the different pole.

(42) Further, the eleventh embodiment has advantages (30) to (36) of the ninth embodiment.

Twelfth Embodiment

Next, a twelfth embodiment of the present invention will be described with reference to FIG. 45.

The present embodiment differs from the ninth embodiment in the rotor 408. Thus, for convenience of description, the part of the rotor, which is different, will be described in detail, and the other parts common to the ninth embodiment are denoted by the same numeral references and the detailed descriptions thereof will be omitted.

Figure 45A:
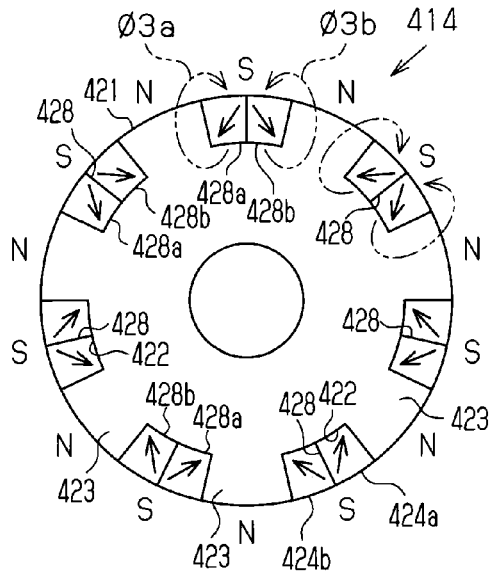
FIG. 45(*a*) is a side view of a first rotor core of a rotor according to a twelfth embodiment of the present invention, and FIG. 45(*b*) is a side view of a second rotor core.

As illustrated in FIG. 45(a), two first permanent magnets (first magnet) 428a and 428b of the same shape are fixed in each recess 422 formed in the first rotor core 421 of the first component 414. The two first permanent magnets 428a and 428b are magnetized to have the magnetizing orientation that is symmetrical with respect to an abutting plane 428 between the first permanent magnets 428a and 428b serving as the magnetic center.

Figure 45B:
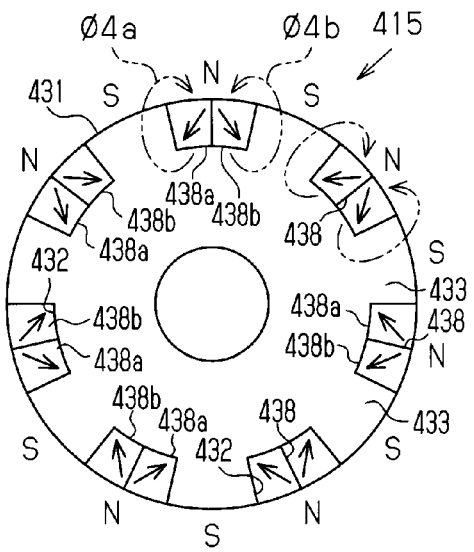

As illustrated in FIG. 45(b), two second permanent magnets (second magnet) 438a and 438b of the same shape are fixed into each recess 432 formed on the second rotor core 431 of the second component 415. The two second permanent magnets 438a and 438b are magnetized to have the magnetizing orientation that is symmetrical with respect to an abutting plane 438 between the second permanent magnets 438a and 438b serving as the magnetic center.

Next, the advantages of the twelfth embodiment will be described below.

(43) In the above embodiment, two first permanent magnets 428a and 428b of the same shape are fitted and fixed in each recess 422 formed in the first rotor core 421. Further, the two first permanent magnets 428a and 428b are magnetized symmetrically with respect to the abutting plane 428 between the first permanent magnets 428a and 428b serving as the magnetic center.

Accordingly, as illustrated in FIG. 45(a), the magnetic fluxes φ3a and φ3b of the first permanent magnets 428a and 428b are concentrated at the pole center (the position of the abutting plane 428). This allows for the enhancement of the output.

(44) In the above embodiment, two second permanent magnets 438a and 438b of the same shape are fitted and fixed in each recess 432 formed in the second rotor core 431. Further, the two second permanent magnets 438a and 438b are magnetized symmetrically with respect to the abutting plane 438 between the second permanent magnets 438a and 438b as the magnetic center.

Accordingly, as illustrated in FIG. 45(b), the magnetic fluxes φ4a and φ4b of the second permanent magnets 438a and 438b are concentrated at the pole center (the position of the abutting plane 438). This allows for the enhancement of the output.

(45) Further, the twelfth embodiment has advantages (30) to (36) of the ninth embodiment.

Thirteenth Embodiment

Next, a thirteenth embodiment of the present invention will be described with reference to FIGS. 46 and 47.

The present embodiment differs from the ninth embodiment in the rotor 408. Thus, for convenience of description, the part of the rotor, which is different, will be described in detail, and the other parts common to the ninth embodiment are denoted by the same numeral references and the detailed descriptions thereof will be omitted.

Figure 46:
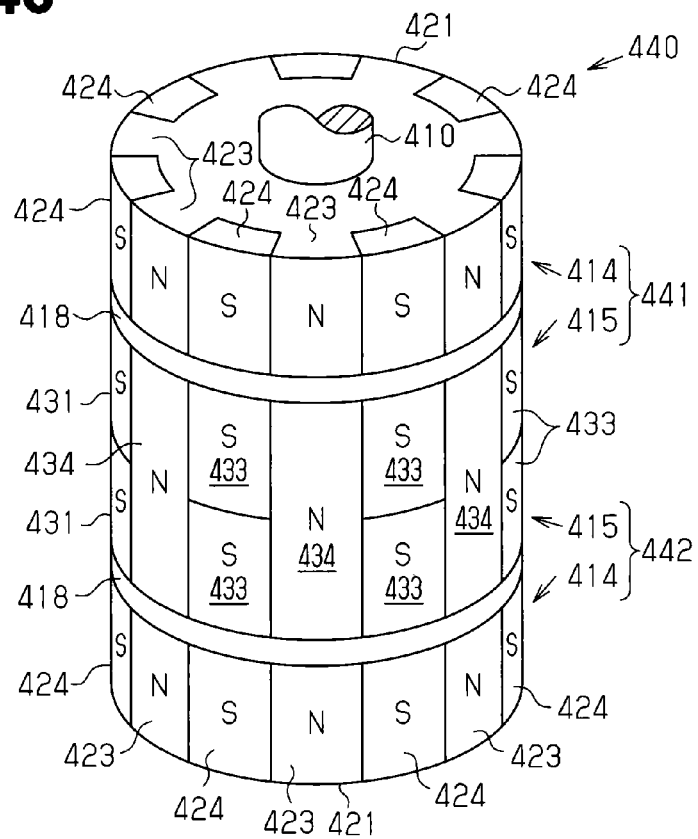
FIG. 46 is a perspective view of a rotor according to a thirteenth embodiment of the present invention.
Figure 47:
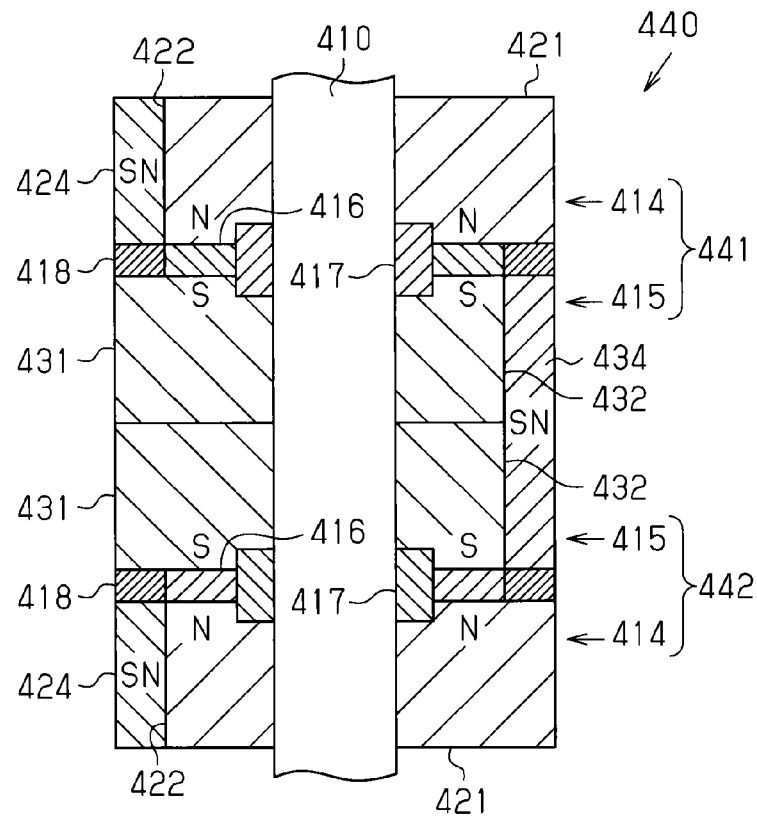
FIG. 47 is a cross-sectional view of the rotor core of FIG. 46.

As illustrated in FIGS. 46 and 47, in a rotor 440 of the present embodiment, two sets of the rotors 408 of the first embodiment are provided to have a stacked structure in which a first rotor 441 and a second rotor 442 are overlapped with each other and are fixed to the rotation shaft 410. In the present embodiment, the second component 415 of the first rotor 441 abuts against the second component 415 of the second rotor 442 and is arranged relative to each other so that the second permanent magnets 434 of the same polarity are overlapped with each other.

Further, in the present embodiment, the second permanent magnet 434 of the rotor 441 side and the second permanent magnet 434 of the rotor 442 side are integrated to form one piece of the second permanent magnets 434, and the one piece of the second permanent magnets 434 is fitted into the recess 432 of the rotor 442 side and the recess 432 of the rotor 441 side that are continuous in the axial direction. Thus, in the rotor 440 including the rotors 441 and 442, the second permanent magnet 434 of the same polarity for the rotor 441 and 442 is formed as one part. This decreases the number of parts and reduces costs.

Next, the advantages of the thirteenth embodiment will be described below.

(46) In the above embodiment, two rotors 441 and 442 are combined allowing the rotor to generate higher torque. Furthermore, the rotors 441 and 442 are of the same structure. This decreases the number of parts, simplifies manufacturing, and reduces costs.

(47) In the above embodiment, the second permanent magnet 434 for the overlapped rotors 441 and 442 of the same polarity is integrated to share one piece of second permanent magnets 434. This further decreases the number of parts and allows for reduction in cost.

Fourteenth Embodiment

Next, a fourteenth embodiment of the present invention will be described with reference to FIGS. 48 to 50.

The present embodiment differs from the ninth embodiment in the rotor 408. Thus, for convenience of description, the part of the rotor, which is different, will be described in detail, and the other parts common to the ninth embodiment are denoted by the same numeral references and the detailed descriptions thereof will be omitted.

Figure 48:
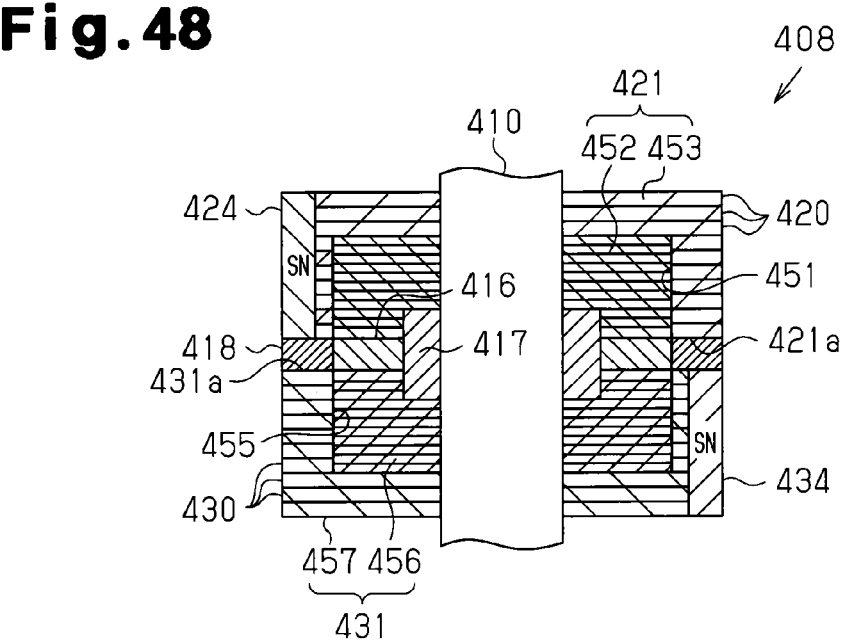
FIG. 48 is a perspective view of a rotor according to a fourteenth embodiment of the present invention.
Figure 49:
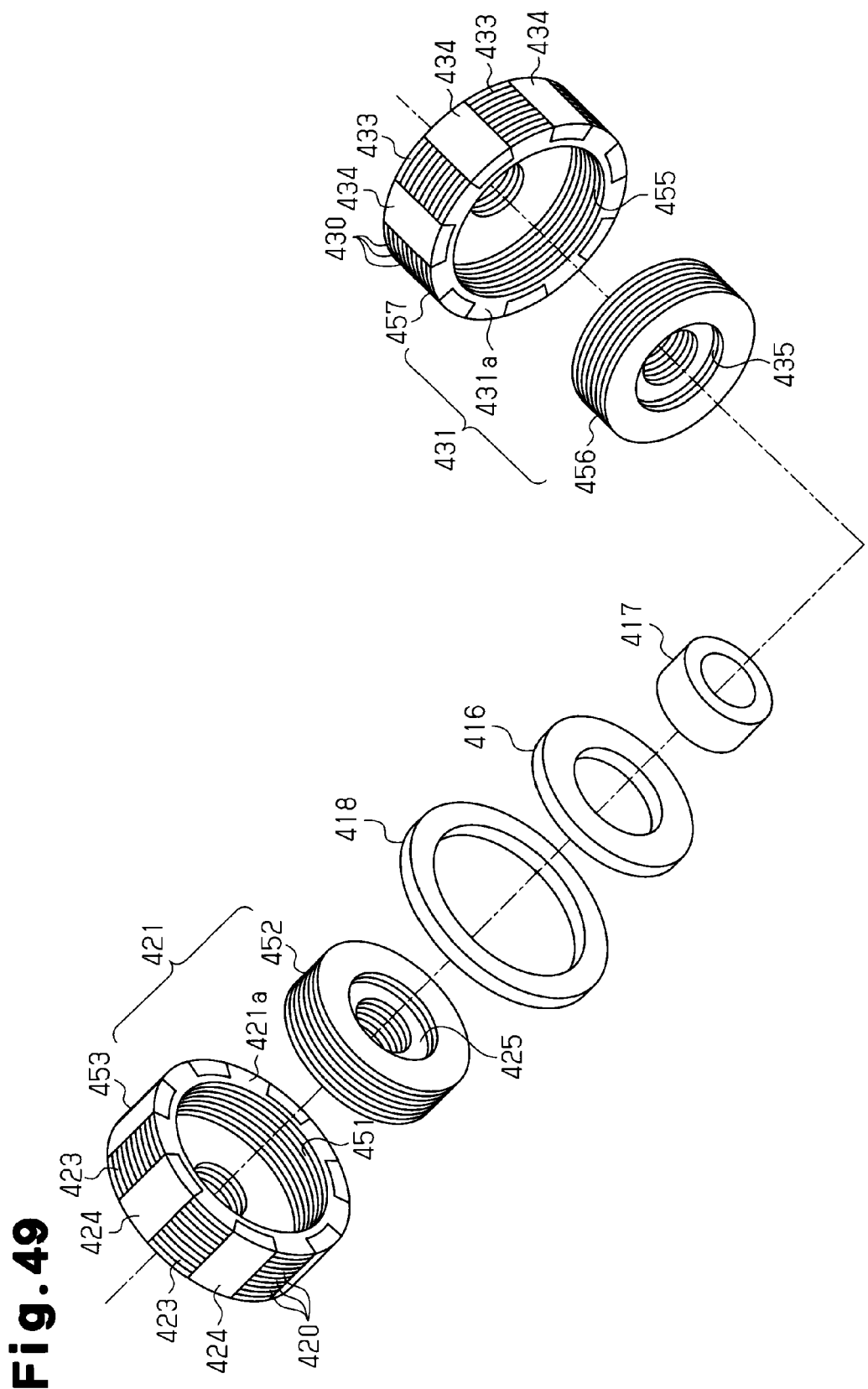
FIG. 49 is an exploded perspective view of the rotor core of FIG. 48.

As illustrated in FIGS. 48 and 49, the first rotor core 421 has a cylindrical fitting recess 451 in the opposing surface 421a of the first rotor core 421 and a low magnetic resistance portion 452 fitted into the fitting recess 451. Here, the first rotor core 421 includes a plurality of stacked rotor core pieces 420 formed by steel plates (not illustrated in FIG. 50). Thus, the shape after the fitting recess 451 is formed is referred to as a stacked steel plate portion 453 in relation to the low magnetic resistance portion 452. Further, the low magnetic resistance portion 452 is fitted into the fitting recess 451 of the stacked steel plate portions 453. This forms the first rotor core 421. Accordingly, the first rotor core 421 (layered steel plate portions 453) wraps (covers) the low magnetic resistance portion 452 in the axial direction.

The low magnetic resistance portion 452 has lower magnetic resistance than the stacked steel plate portions 453 wrapping the low magnetic resistance portion 452 and is formed to have a higher magnetic resistance in the axial direction at the end of the second rotor core 431 side of the first rotor core 421.

The second rotor core 431 has a cylindrical fitting recess 455 recessed in the opposing surface 431a of the second rotor core 431 and a low magnetic resistance portion 456 fitted into the fitting recess 455. Here, the second rotor core 431 includes a plurality of stacked rotor core pieces 430 formed by steel plates (not illustrated in FIG. 50). Thus, the shape after the fitting recess 455 is formed is referred to as a stacked steel plate portion 457 in relation to the low magnetic resistance portion 456. Further, the low magnetic resistance portion 456 is fitted into the fitting recess 455 of the stacked steel plate portion 457 and thus the second rotor core 431 is formed. Accordingly, the second rotor core 431 (layered steel plate portion 457) wraps (covers) the low magnetic resistance portion 456 in the axial direction.

The low magnetic resistance portion 456 has lower magnetic resistance than the stacked steel plate portion 457 wrapping the low magnetic resistance portion 456 and is formed to have the higher magnetic resistance in the axial direction at the end of the first rotor core 421 side of the second rotor core 431.

Next, the advantages of the fourteenth embodiment will be described below.

(48) In the above embodiment, in the first rotor core 421, the fitting recess 451 is recessed in the stacked steel plate portions 453, and the low magnetic resistance portion 452 that has smaller magnetic resistance than the stacked steel plate portions 453 is fitted into the fitting recess 451. Further, the stacked steel plate portions 453 wraps (covers) the low magnetic resistance portion 452 in the axial direction.

In the second rotor core 431, the fitting recess 455 is recessed in the stacked steel plate portion 457, and the low magnetic resistance portion 456 that has smaller magnetic resistance than the stacked steel plate portion 457 is fitted into the fitting recess 455. Further, the stacked steel plate portion 457 wraps (covers) the low magnetic resistance portion 456 in the axial direction.

Figure 50:
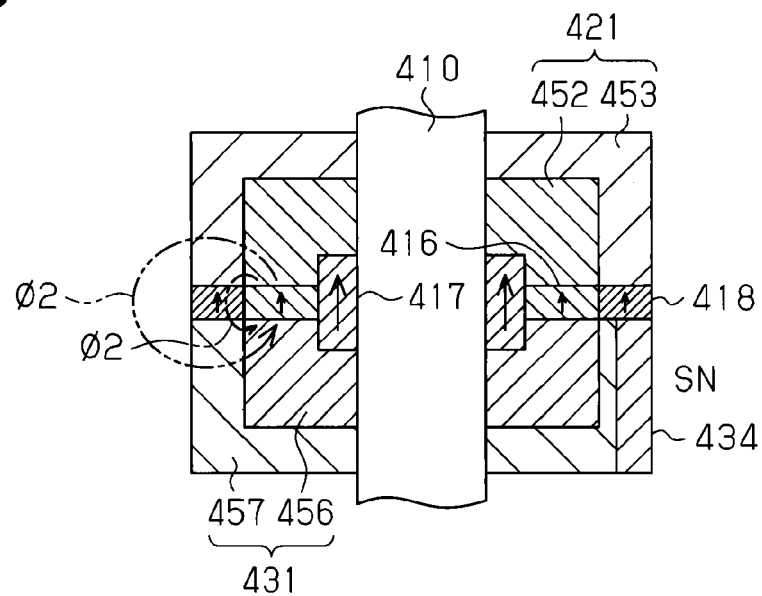
FIG. 50 is a cross-sectional view of the rotor core of FIG. 48.

Accordingly, as illustrated in FIG. 50, the stacked steel plate portions 453 and 457 of the first and the second rotor cores 421 and 431 are arranged so as to wrap the low magnetic resistance portions 452 and 456 in the axial direction so that the magnetic resistance in the axial direction at the end of the rotor 408 is increased. This allows for the reduction of the leakage magnetic flux toward the axial direction of the field magnet 416.

Further, the magnetic flux guided to the first and the second protruded poles 423 and 433 by the first and the second permanent magnets 424 and 434 do not have a force to guide to the first and the second protruded poles 423 and 433 in the radial direction. Thus, a leakage magnetic flux leaked in the axial direction is likely to occur at the end in the axial direction of the rotor 408. In the present embodiment, however, the magnetic resistance in the axial direction at the end of the rotor 408 is increased by the stacked steel plate portions 453 and 457 so that the leakage magnetic flux in the axial direction can be suppressed.

The ninth to fourteenth embodiments may be modified as described below.

Although the first auxiliary magnet 417 is provided in the ninth to fourteenth embodiments described above, the first auxiliary magnet 417 may be omitted. In this case, the field magnet 416 reaches the rotation shaft 410 and thus the annular grooves 425 and 435 formed in the first and the second rotor cores 421 and 431 are omitted.

Although the length of the first auxiliary magnet 417 is longer than that of the field magnet 416 in the ninth to fourteenth embodiments described above, they may have the same length. In this case, the annular grooves 425 and 435 formed in the first and the second rotor cores 421 and 431 will be omitted.

Although the second auxiliary magnet 418 is provided in the ninth, tenth, and twelfth to fourteenth embodiments described above, the second auxiliary magnet 418 may be omitted. It is also obvious that the first auxiliary magnet 417 may be omitted.

Although the second auxiliary magnet 418 is not provided in the eleventh embodiment described above, the second auxiliary magnet 418 may be provided. In this case, it is necessary to increase the inner diameter (the length from the center axis C of the rotation shaft 410 to the inner peripheral surface) of the first magnet protrusion 427 and the second magnet protrusion 437 or make decrease the outer diameter of the field magnet 416.

Although each of the first protrusion 426 and the second protrusion 436 is protruded to overlap the outer half of the opposing second and first permanent magnets 434 and 424 when viewed from the axial direction in the tenth embodiment described above, they may overlap the second and first permanent magnets 434 and 424 entirely in the radial direction when viewed from the axial direction.

In the tenth embodiment described above, the first protrusion 426 and the second protrusion 436 abut against the opposing first and second permanent magnets 424 and 434, respectively. However, without abutting against the first and the second permanent magnets 424 and 434, the protrusions of the first protrusion 426 and the second protrusion 436 may be protruded by at least ½ of the length of the field magnet 416 in the axial direction.

Although the first protrusion 426 and the second protrusion 436 are provided in the tenth embodiment described above, either one may be omitted.

In the eleventh embodiment described above, the first magnet protrusion 427 and the second magnet protrusion 437 abut against the opposing first and second protruded poles 423 and 433, respectively. However, without being abut against the first and the second protruded poles 423 and 433, the protrusion of the first magnet protrusion 427 and the second magnet protrusion 437 may be protruded by at least ½ of the length of the field magnet 416 in the axial direction.

Although the first magnet protrusion 427 and the second magnet protrusion 437 are provided in the eleventh embodiment described above, either one may be omitted.

The tenth embodiment and the eleventh embodiment described above may be combined. That is, the first and the second protrusions 426 and 436 and the first and the second magnet protrusions 427 and 437 may be ½ of the length of the field magnet 416 in the axial direction and, at the intermediate position of the first and the second rotor cores 421 and 431, the first and the second protrusions 426 and 436 may abut against the first and the second magnet protrusions 427 and 437.

In the thirteenth embodiment described above, two sets of the rotors 408 of the ninth embodiment are provided, and the first rotor 441 and the second rotor 442 are overlapped in a stacked structure to make one rotor 440. In this regard, three sets of the rotors 408 may be provided to implement a three-layer structure.

In this case, for example in FIG. 46, the third-layer rotor stacked with the second rotor 442 is arranged so that the first component 414 (the first rotor core 421) is abut against the second rotor 442 side and the first permanent magnets 424 of the same polarity are overlapped with each other. In this case, the first permanent magnets 424 overlapped with each other may be formed by one piece of permanent magnets. Accordingly, the number of parts can be decreased thereby reducing costs.

In the thirteenth embodiment described above, the rotor 440 is formed by the rotor 408 of the ninth embodiment. However, the rotors described in the above embodiments and their modified examples other than the ninth embodiment may be used.

Although the second permanent magnet 434 in the same polarity for the stacked rotors 441 and 442 is integrated to share one piece of second permanent magnets 434 in the thirteenth embodiment described above, it is obvious that separate second permanent magnets 434 may be used.

Figure 51:
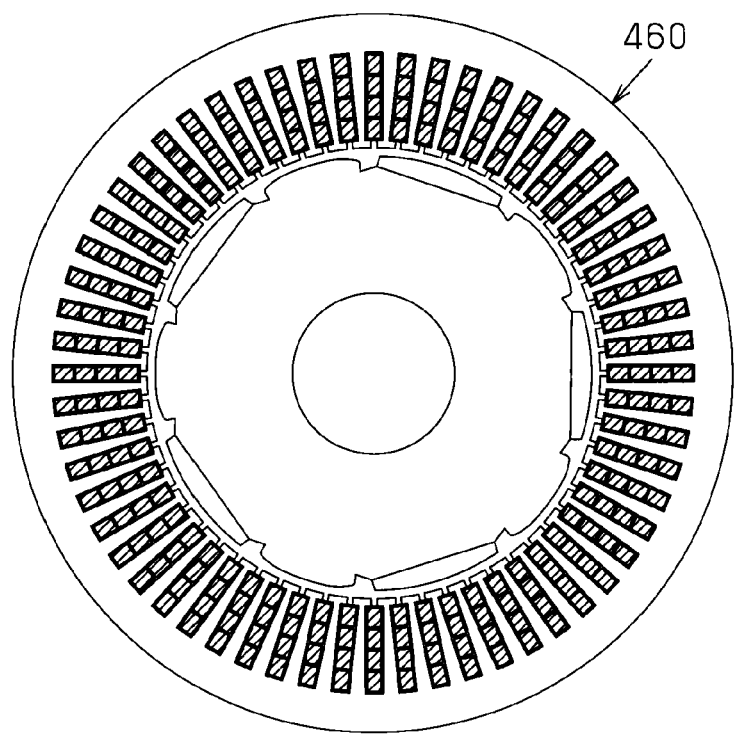
FIG. 51 is a cross-sectional view illustrating another example of a stator.
Figure 52:
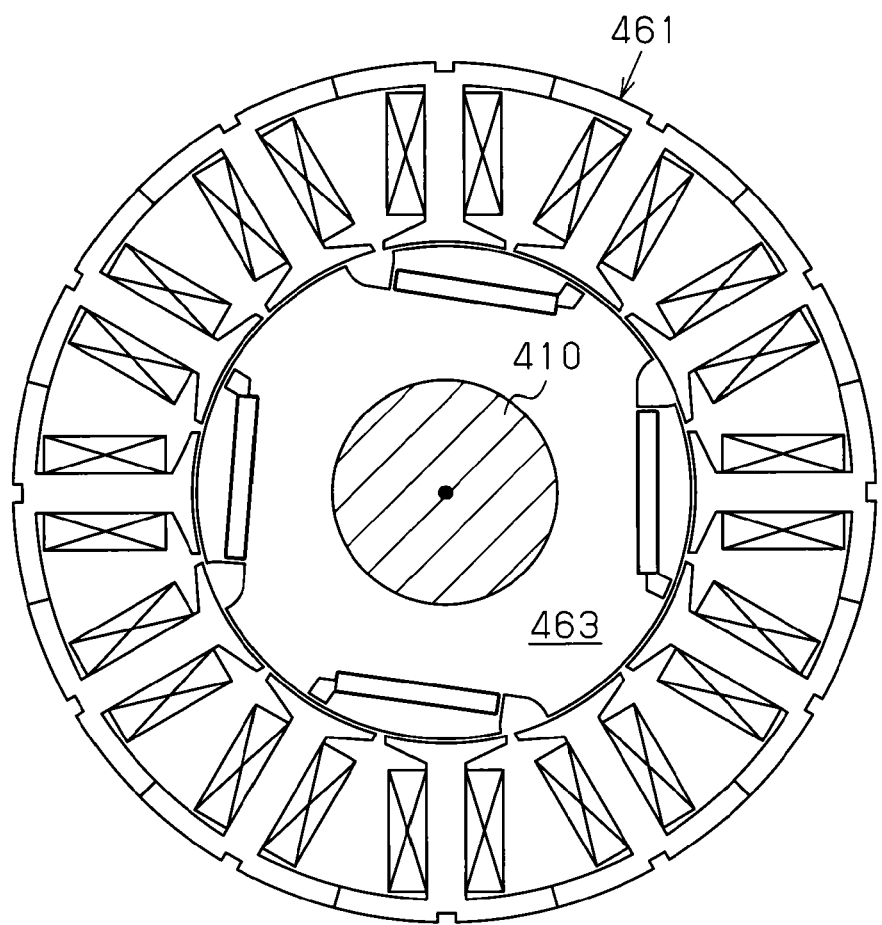
FIG. 52 is a cross-sectional view illustrating yet another example of a stator.

Although the stator 405 has not been specified in particular in the ninth to fourteenth embodiments described above, the rotor in each of the above embodiments can be adapted to various stators, for example, the stator 460 with the SC coil of the distributed winding as illustrated in FIG. 51 or the stator 461 of the concentrated winding as illustrated in FIG. 52, and thus may be applied to any motor that is compact and has high output.

Although embodied in an SPM (Surface Permanent magnet Motor) type rotor in the ninth to fourteenth embodiments described above, the rotor 408 may be embodied in an IPM (Interior Permanent magnet Motor) rotor 463 as illustrated in FIG. 52, and thus may be applied to any motor that is compact and has high output.

In the fourteenth embodiment described above, the stacked steel plate portions 453 and 457 wrap (cover) the low magnetic resistance portions 452 and 456 in the axial direction. In this regard, the stacked steel plate portions 453 and 457 may be formed in a cylindrical shape to expose the rotor 408 end side of the low magnetic resistance portions 452 and 456. This also obtains the advantages of the ninth embodiment.

In the fourteenth embodiment described above, the first protrusion 426 and the second protrusion 436 of the tenth embodiment described above may be provided and, alternatively, the first magnet protrusion 427 and the second magnet protrusion 437 of the eleventh embodiment described above may be provided.

In the ninth to fourteenth embodiments described above, the first rotor core 421 and the second rotor core 431 are formed by stacking the rotor core pieces 420 and 430 that are formed by steel plates. However, they may be formed from powder magnetic core material. For example, the magnetic powder such as iron powder and the insulating material such as resin are mixed and heat press-molded by a metal mold to manufacture the first rotor core 421 and the second rotor core 431.

This case allows for higher flexibility in the design of the first rotor core 421 and the second rotor core 431, extremely simpler manufacturing process and smaller magnetic resistance of the first rotor core 421 and the second rotor core 431.

Although the number of magnetic poles is fourteen in the ninth to fourteenth embodiments described above, the number of magnetic poles is not limited and may be changed as required. The number of pairs of the magnetic poles may be an even number instead of an odd number.

Although the first magnetic pole is the S pole and the second magnetic pole is the N pole in the ninth to fourteenth embodiments described above. Contrarily, the first magnetic pole may be the N pole and the second magnetic pole may the S pole.

The invention claimed is:

1. A rotor comprising:
   a first rotor core including a first core base and a plurality of first hook-like magnetic pole parts arranged at equal intervals on an outer circumferential portion of the first core base and extended from the outer circumferential portion in an axial direction;
   a second rotor core including a second core base and a plurality of second hook-like magnetic pole parts arranged at equal intervals on an outer circumferential portion of the second core base and extended from the outer circumferential portion in the axial direction, wherein each of the second hook-like magnetic pole parts is arranged between adjacent ones of the first hook-like magnetic pole parts in a circumferential direction;
   a field magnet magnetized along the axial direction and arranged between the first rotor core and the second rotor core, wherein the field magnet causes the first hook-like magnetic pole parts to function as a first magnetic pole and causes the second hook-like magnetic pole parts to function as a second magnetic pole;
   an inter-pole magnet arranged between a respective one of each of the first hook-like magnetic pole parts and a respective one of each of the second hook-like magnetic pole parts, wherein each inter-pole magnet is magnetized so that portions facing the respective first and second hook-like magnetic pole parts have the same polarity as the respective first and second hook-like magnetic pole parts; and
   a back magnet arranged on a back surface of each of the first and second hook-like magnetic pole parts, wherein each back magnet includes magnetic poles arranged along a radial direction so that portions facing the back surfaces of the first and the second hook-like magnetic pole parts have the same polarity as the first and the second hook-like magnetic pole parts, respectively, wherein,
   a magnetic flux that is output from each hook-like magnetic pole part comprises magnetic fluxes output from the respective inter-pole magnets, the respective back magnet, and the field magnet, and
   each back magnet is fitted between adjacent ones of the respective inter-pole magnets in the circumferential direction.

2. The rotor according to claim 1, wherein the field magnet is annular, the rotor further comprises an annular auxiliary magnet arranged in at least one of an inner side in a radial direction and an outer side in the radial direction of the field magnet, and the auxiliary magnet includes magnetic poles that are in the same arrangement as the magnetic poles of the field magnet.

3. The rotor according to claim 1, further comprising an annular auxiliary magnet arranged at an outer side in a radial direction of the field magnet, wherein the auxiliary magnet includes magnetic poles arranged along the radial direction so that portions facing the first and second hook-like magnetic pole parts have the same polarity as the first and the second hook-like magnetic pole parts, respectively.

4. The rotor according to claim 1, wherein each back magnet has a larger magnetomotive force than each inter-pole magnet.

5. The rotor according to claim 1, wherein each inter-pole magnet has a smaller magnetomotive force than the field magnet.

6. The rotor according to claim 1, wherein the first and the second hook-like magnetic pole parts are formed by bending plate members.

7. The rotor according to claim 1, wherein the first and the second rotor cores are formed by molded powder magnet cores.

8. The rotor according to claim 1, further comprising auxiliary magnets arranged on surfaces of the first and the second rotor cores facing opposite directions.

9. The rotor according to claim 1, wherein the first and the second hook-like magnetic pole parts are generally rectangular and elongated in the axial direction when viewed from a radial direction.

10. A rotor assembly comprising two or three sets of the rotor according to claim 1.

11. The rotor assembly according to claim 10, wherein the first and the second hook-like magnetic pole parts of each of the rotors are generally rectangular and elongated in the axial direction when viewed from a radial direction, and an inter-pole magnet arranged between respective ones of the first and the second hook-like magnetic pole parts is shared as an inter-pole magnet by all of the rotors.

12. The rotor according to claim 1, wherein each inter-pole magnet is arranged to form a gap in a radial direction between the inter-pole magnet and the first and second rotor cores.

13. The rotor according to claim 12, wherein a length L in a radial direction of the gap is set to satisfy $0<L/G\leq 4.5$, where G represents a size of an air gap from the first and the second rotor cores to a stator opposing the first and second rotor cores in the radial direction.

14. The rotor according to claim 12, wherein a length L in a radial direction of the gap is set to satisfy $1.5\leq L/G$, where G represents a size of an air gap from the first and second rotor cores to a stator opposing the first and second rotor cores in the radial direction.

15. The rotor according to claim 13, wherein a length L in a radial direction of the gap is set to satisfy $1.5\leq L/G\leq 3.5$.

16. The rotor according to claim 12, further comprising a non-magnetic member arranged in the gap.

17. A motor comprising the rotor according to claim 1.

18. A rotor comprising:
   a first rotor core including a generally disk-shaped first core base and a plurality of first hook-like magnetic pole parts arranged at equal intervals on an outer circumferential portion of the first core base and protruding from the outer circumferential portion outward in a radial direction and extending in an axial direction;
   a second rotor core including a generally-disk shaped second core base and a plurality of second hook-like magnetic pole parts arranged at equal intervals on an outer circumferential portion of the second core base and protruding from the outer circumferential portion outward in the radial direction and extending in the axial direction, wherein the first hook-like magnetic pole parts and the second hook-like magnetic pole parts are alternatively arranged in a circumferential direction in a state in which the first core base and the second core base are opposed in the axial direction;
   a field magnet magnetized along the axial direction and arranged between the first core base and the second core base in the axial direction, wherein the field magnet causes the first hook-like magnetic pole parts to function as a first magnetic pole and causes the second hook-like magnetic pole parts to function as a second magnetic pole;

an inter-pole magnet arranged in a location between a respective one of each of the first hook-like magnetic pole parts and a respective one of each of the second hook-like magnetic pole parts in the circumferential direction and a back magnet arranged in a location inward in the radial direction from the first and the second hook-like magnetic pole parts, wherein, a magnetic flux that is output from one of the first and second hook-like magnetic pole parts comprises magnetic fluxes output from the respective inter-pole magnets, the back magnet, and the field magnet, the field magnet and at least one of the inter-pole magnets and the back magnet are formed by magnets of different characteristics, and the back magnet is fitted between adjacent ones of the inter-pole magnets in the circumferential direction.

19. The rotor according to claim 18, wherein each inter-pole magnet is formed by a magnet having a larger coercive force than the field magnet.

20. The rotor according to claim 18, wherein each inter-pole magnet is formed by a magnet having a larger residual magnetic flux density than the field magnet.

21. The rotor according to claim 18, wherein the field magnet is formed by a ferrite magnet.

22. The rotor according to claim 18, wherein the field magnet is formed by a rare earth magnet.

23. The rotor according to claim 22, wherein each inter-pole magnet is formed by a neodymium magnet.

24. The rotor according to claim 18, wherein each inter-pole magnet is formed by an SmFeN magnet.

25. The rotor according to claim 18, wherein each inter-pole magnet is in a form of a sheet.

26. The rotor according to claim 18, wherein the back magnet is formed by a magnet having a smaller coercive force than each inter-pole magnet.

27. The rotor according to claim 18, wherein the back magnet is formed by a magnet having a larger residual magnetic flux density than the field magnet.

28. A rotor comprising:
a first rotor core including a generally disk-shaped first core base and a plurality of first hook-like magnetic pole parts arranged at equal intervals on an outer circumferential portion of the first core base and protruding from the outer circumferential portion outward in a radial direction and extending in an axial direction;
a second rotor core including a generally disk-shaped second core base and a plurality of second hook-like magnetic pole parts arranged at equal intervals on an outer circumferential portion of the second core base and protruding from the outer circumferential portion outward in the radial direction and extending in the axial direction, wherein each of the second hook-like magnetic pole parts is arranged between adjacent ones of the first hook-like magnetic pole parts in a circumferential direction;
a field magnet magnetized along the axial direction and arranged between the first core base and the second core base, wherein the field magnet causes the first hook-like magnetic pole parts to function as a first magnetic pole and causes the second hook-like magnetic pole parts to function as a second magnetic pole;
an inter-pole magnet arranged between a respective one of each of the first hook-like magnetic pole parts and a respective one of each of the second hook-like magnetic pole parts in the circumferential direction, wherein each inter-pole magnet is magnetized at portions facing the respective first and second hook-like magnetic pole parts to have a polarity that is the same as the respective first and second hook-like magnetic pole parts; and
a back magnet, arranged on a back surface of each of the first and second hook-like magnetic pole parts and magnetized so that a polarity of the respective back magnet at a part outward in the radial direction has the same polarity as a corresponding one of the first and second hook-like magnetic pole parts, wherein,
a magnetic flux that is output from each of the hook-like magnetic pole parts comprises magnetic fluxes output from the respective inter-pole magnets, the respective back magnet, and the field magnet,
the magnetization direction of at least part of the respective back magnet in an axial cross-section is inclined relative to the radial direction thereby allowing for part of the magnetic flux flowing in each of the hook-like magnetic pole parts to obliquely bypass an interior of the respective back magnet, and
each back magnet is fitted between adjacent ones of the inter-pole magnets in the circumferential direction.

29. The rotor according to claim 28, wherein the magnetization direction of each entire back magnet is evenly inclined relative to the radial direction in the axial cross-section.

30. The rotor according to claim 28, wherein the magnetization direction of each back magnet when viewed from the axial direction extends along the radial direction.

* * * * *